(12) United States Patent
Wakasa et al.

(10) Patent No.: US 8,095,555 B2
(45) Date of Patent: Jan. 10, 2012

(54) INFORMATION PROCESSING APPARATUS AND METHOD AND INFORMATION SYSTEM

(75) Inventors: Shigeki Wakasa, Kanagawa (JP); Isao Soma, Saitama (JP); Yasuharu Ishikawa, Kanagawa (JP); Hiroshi Nakayama, Chiba (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/183,496

(22) Filed: Jul. 31, 2008

(65) Prior Publication Data

US 2009/0043783 A1 Feb. 12, 2009

(30) Foreign Application Priority Data

Aug. 8, 2007 (JP) ................................. 2007-206229

(51) Int. Cl.
*G06F 17/30* (2006.01)
(52) U.S. Cl. ...................................................... 707/770
(58) Field of Classification Search .................. 707/705, 707/758, 769, 770
See application file for complete search history.

(56) References Cited

U.S. PATENT DOCUMENTS

| | | | |
|---|---|---|---|
| 2004/0233868 A1* | 11/2004 | Farnham ....................... | 370/329 |
| 2006/0258289 A1* | 11/2006 | Dua .............................. | 455/41.3 |
| 2006/0270395 A1* | 11/2006 | Dhawan et al. ............... | 455/418 |
| 2008/0248740 A1* | 10/2008 | Lazovsky et al. ............. | 455/3.01 |
| 2009/0069915 A1* | 3/2009 | Khedouri et al. .............. | 700/94 |
| 2009/0157792 A1* | 6/2009 | Fiatal ............................ | 709/201 |
| 2009/0282102 A1* | 11/2009 | Geurts et al. .................. | 709/204 |

OTHER PUBLICATIONS

U.S. Appl. No. 12/182,418, filed Jul. 30, 2008, Wakasa, et al.

* cited by examiner

*Primary Examiner* — Angela Lie
(74) *Attorney, Agent, or Firm* — Oblon, Spivak, McClelland, Maier & Neustadt, L.L.P.

(57) ABSTRACT

Disclosed herein is an information processing apparatus as a terminal apparatus with respect to a server which provides content data, including: a management data acquisition section; a display control section; a selection operation acceptance section; a requesting section; and a content data acquisition section.

11 Claims, 39 Drawing Sheets

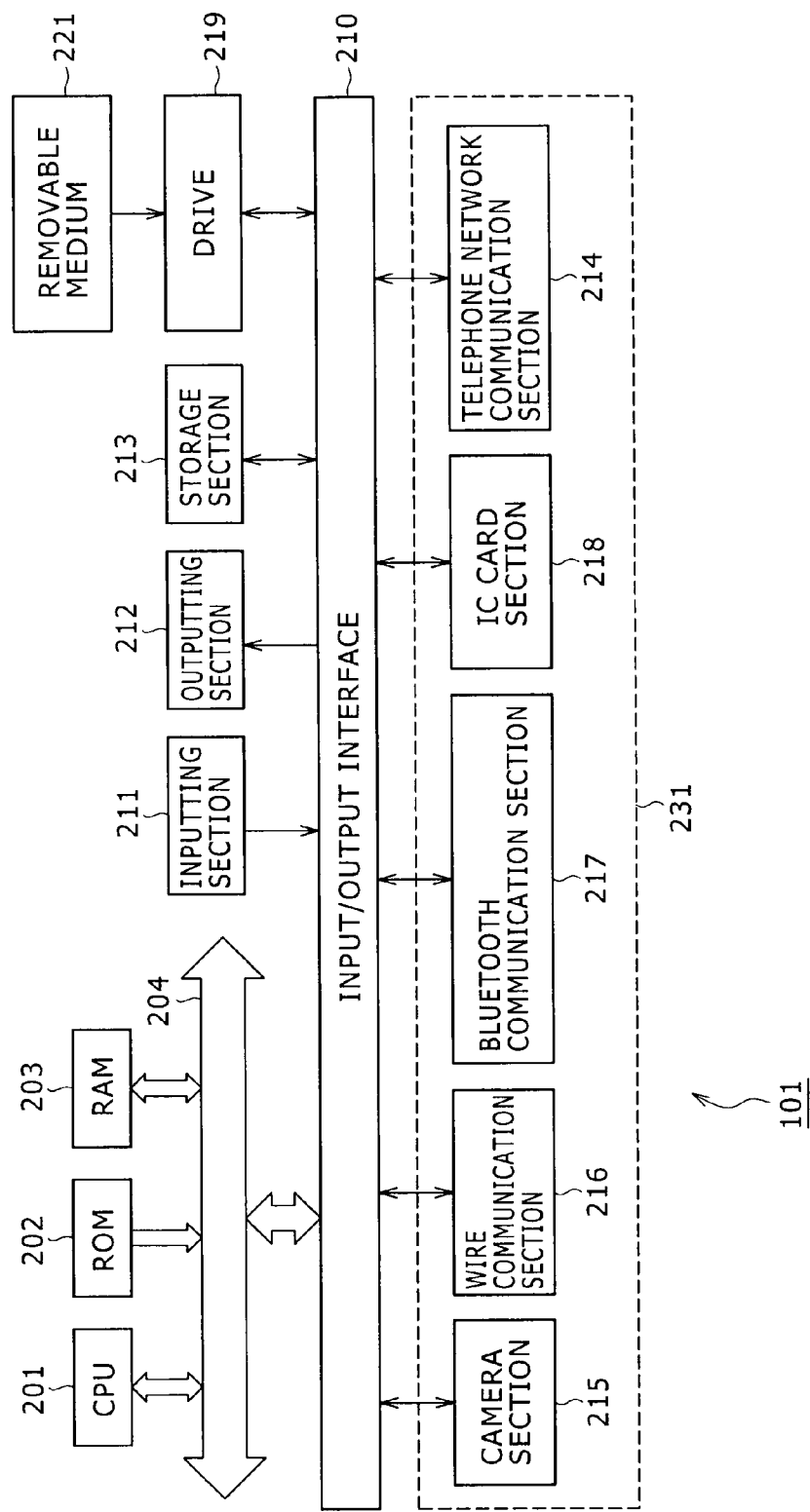

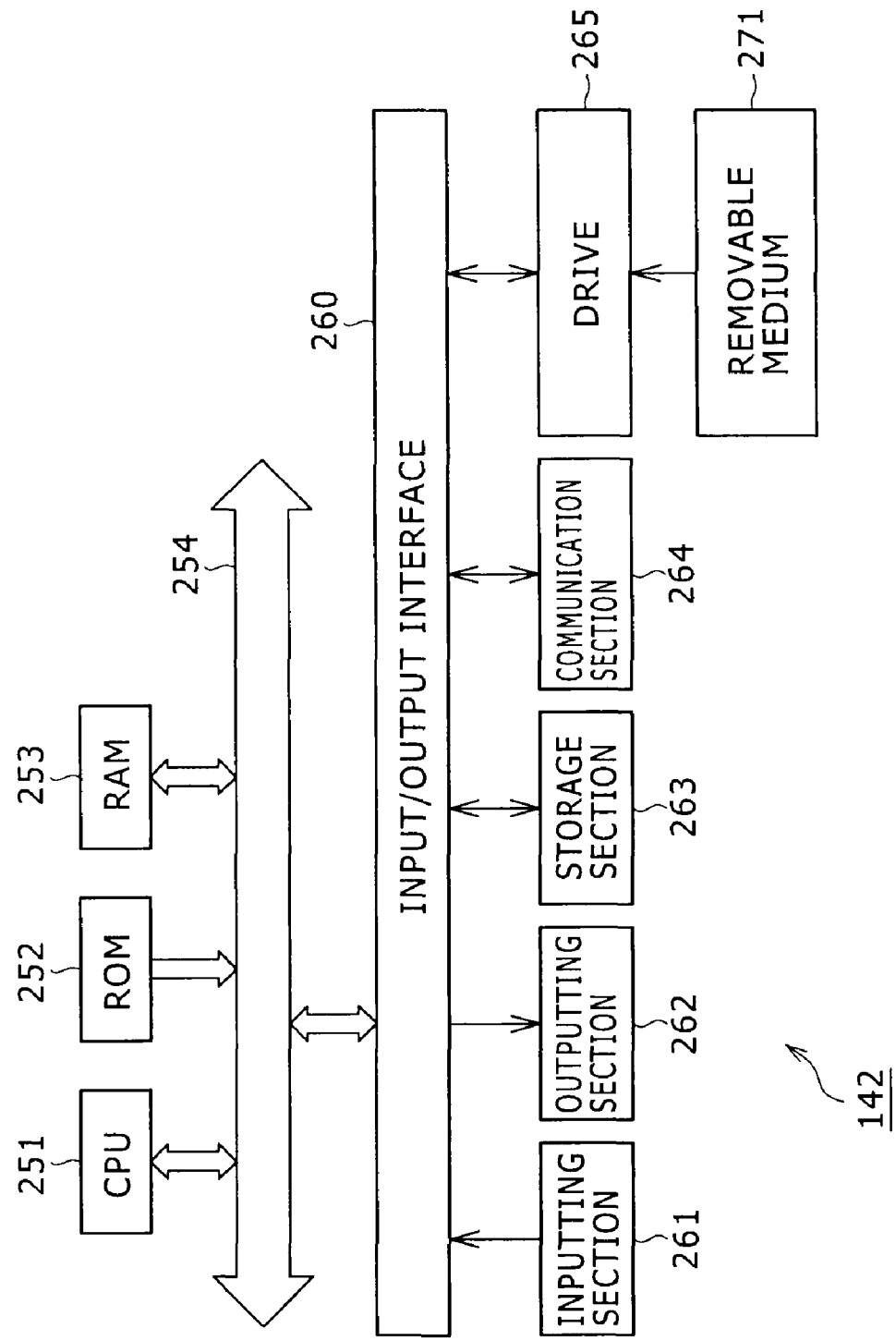

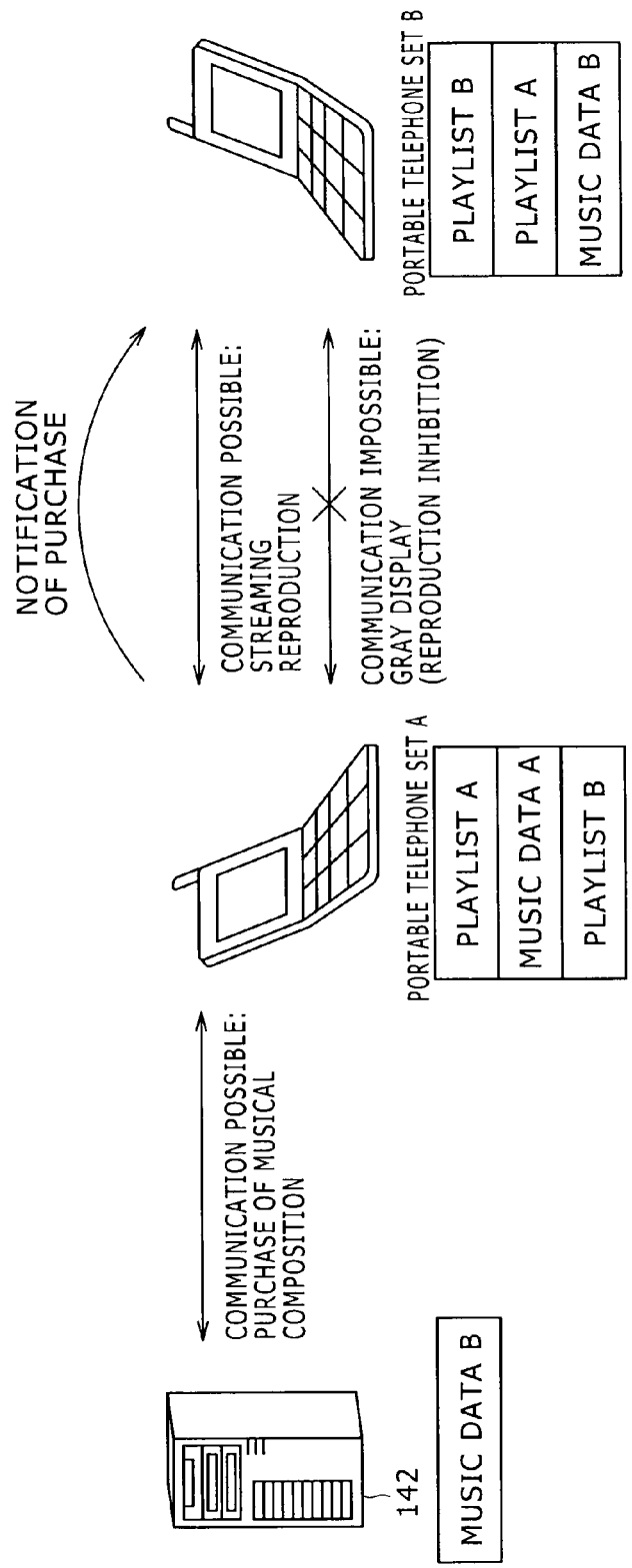

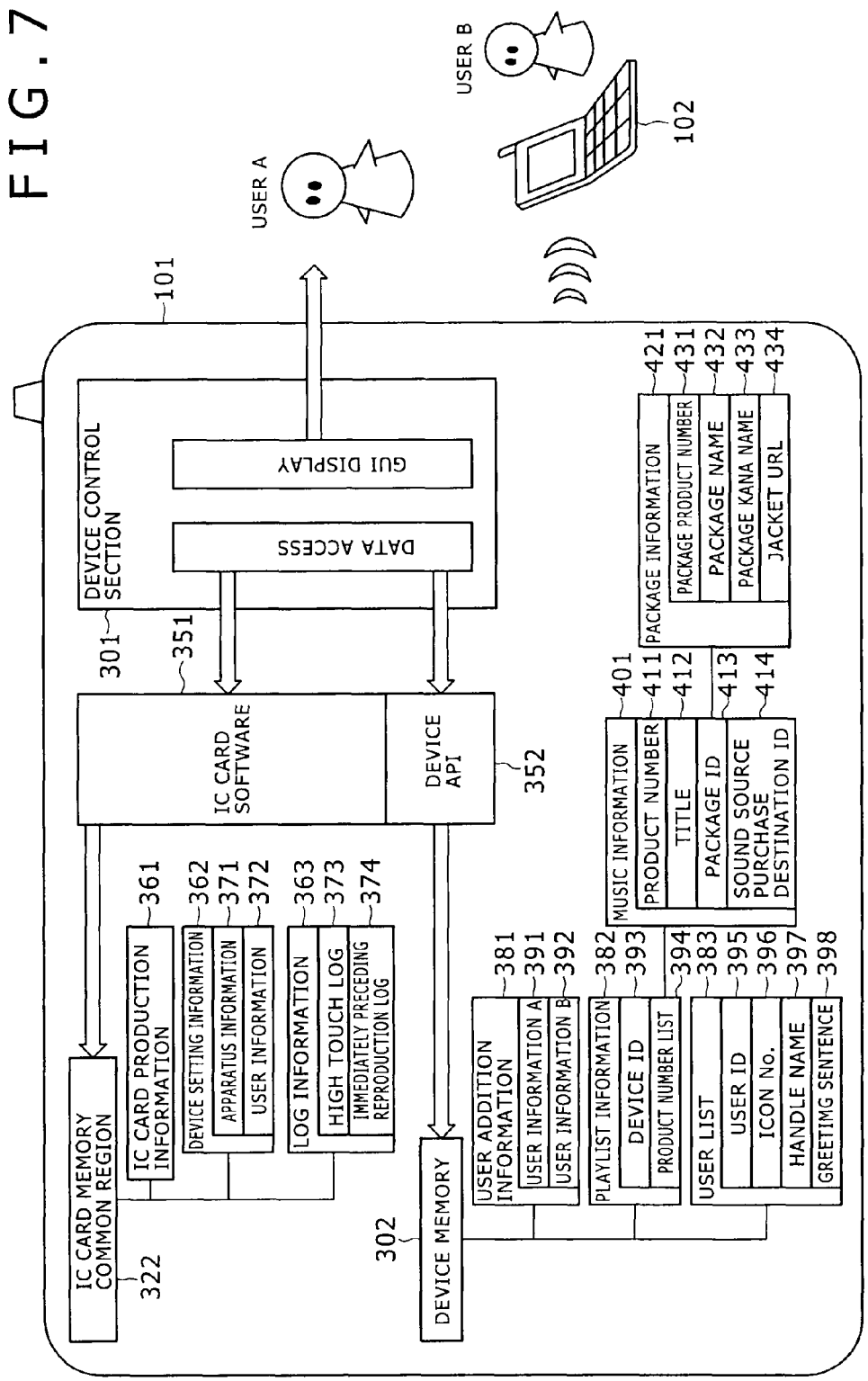

FIG. 8

| BLOCK | DATA ITEM | SUBSTANCE | CODE | SIGNIFICANCE (EXAMPLE) |
|---|---|---|---|---|
| APPARATUS INFORMATION Random 12Block | | | | Max 192byte |
| USER INFORMATION Random 6Block | INFORMATION DISCLOSURE LEVEL | INFORMATION DISCLOSURE LEVEL | BCD 1byte | HIGHER-ORDER 1 DIGIT (PLAYLIST EXCHANGE DIVISION) 0: NOT TO BE EXCHANGED, 1: TO BE EXCHANGED<br>LOWER-ORDER 1 DIGIT (USER INFORMATION DISCLOSURE DIVISION) 0: NOT TO BE DISCLOSED, 1: TO BE DISCLOSED UP TO APPARATUS INFORMATION 2: TO BE DISCLOSED UP TO USER INFORMATION 3: TO BE DISCLOSED UP TO USER ADDITION INFORMATION A 4: TO BE DISCLOSED UP TO USER ADDITION INFORMATION B, ..., ETC. ...<br>INFORMATION DESIGNATED BY GUI OPERATION OF USER |
| | DISCLOSURE ICON | ICON NUMBER | BCD 1byte | 00: STANDARD, 01 - 98: DEFAULT SET 99: USER PRODUCTION IMAGE |
| | HANDLE NAME | HANDLE NAME | 30byte | HANDLE NAME WHICH CAN BE DESIGNATED ARBITRARILY BY USER |
| | GREETING SENTENCE | GREETING SENTENCE | 64byte | GREETING SENTENCE WHICH CAN BE DESIGNATED ARBITRARILY BY USER |

FIG. 9

| CATEGORY | DATA ITEM | SUBSTANCE | CODE | SIGNIFICANCE (EXAMPLE) |
|---|---|---|---|---|
| USER ADDITION INFORMATION | USER INFORMATION A | SEX | HALF-WIDTH NUMERAL | 1: MALE, 2: FEMALE, 3: OTHER |
| | | BLOOD TYPE | HALF-WIDTH ENGLISH LETTER | A, B, O, AB |
| | | BIRTHDAY | HALF-WIDTH NUMERAL | YYYYMMDD |
| | | CONSTELLATION | HALF-WIDTH NUMERAL | 01 -12 |
| | USER INFORMATION B | FULL NAME | CHARACTER | |
| | | KANA NAME | CHARACTER | |
| | | TELEPHONE NUMBER | HALF-WIDTH NUMERAL | |
| | | MAIL ADDRESS | HALF-WIDTH ALPHANUMERIC LETTER | |
| | | TELEPHONE NUMBER | HALF-WIDTH NUMERAL | |
| | | CODE | HALF-WIDTH ALPHANUMERIC LETTER | |
| | | HALF-WIDTH NUMERAL | HALF-WIDTH ALPHANUMERIC LETTER | |

FIG.10

| CATEGORY | DATA ITEM | SUBSTANCE | CODE | SIGNIFICANCE |
|---|---|---|---|---|
| PLAYLIST INFORMATION | DEVICE ID | DEVICE ID | ASCII 16byte | 16-DIGIT ALPHANUMERIC LETTERS BY ASCII CONVERSION OF 8bytes OF APPARATUS ID OF DEVICE |
| | PRODUCT NUMBER LIST | PRODUCT NUMBER | | LIST OF PRODUCT NUMBERS FOR UNIQUELY SPECIFYING MUSICAL COMPOSITION REPEATED BY NUMBER OF TIMES EQUAL TO NUMBER OF ELEMENTS OF LIST |

FIG. 11

| CATEGORY | DATA ITEM | SUBSTANCE | CODE | SIGNIFICANCE |
|---|---|---|---|---|
| MUSICAL COMPOSITION INFORMATION | PRODUCT NUMBER | PRODUCT NUMBER | | |
| | MUSICAL COMPOSITION TITLE | MUSICAL COMPOSITION TITLE | | |
| | KANA TITLE | KANA TITLE | | |
| | ARTIST NAME | ARTIST NAME | | |
| | ARTIST KANA NAME | ARTIST KANA NAME | | |
| | GENRE NAME | GENRE NAME | | |
| | MUSICAL COMPOSITION TIME | MUSICAL COMPOSITION TIME | | |
| | SOUND SOURCE PURCHASE DESTINATION URL | SOUND SOURCE PURCHASE DESTINATION URL | | |
| | EXTENDED URL | EXTENDED URL | | URL OF MUSICAL COMPOSITION EXPLANATION PARTICULAR ASS ETC. REGARDING MUSICAL COMPOSITION INFORMATION |
| | PACKAGE ID | PACKAGE ID | | PRODUCT NUMBER FOR BUNDLING MUSICAL COMPOSITIONS |
| | REPRODUCTION TIME NUMBER | PRODUCTION TIME NUMBER | | |

FIG.12

| CATEGORY | DATA ITEM | SUBSTANCE | CODE | SIGNIFICANCE |
|---|---|---|---|---|
| PACKAGE INFORMATION | PACKAGE ID | PRODUCT NUMBER | | |
| | PACKAGE NAME | PACKAGE NAME | | |
| | PACKAGE KANA NAME | PACKAGE KANA | | |
| | STARTING DAY OF SALES | STARTING DATE OF SALES | | |
| | JACKET URL | JACKET URL | | |

FIG. 20
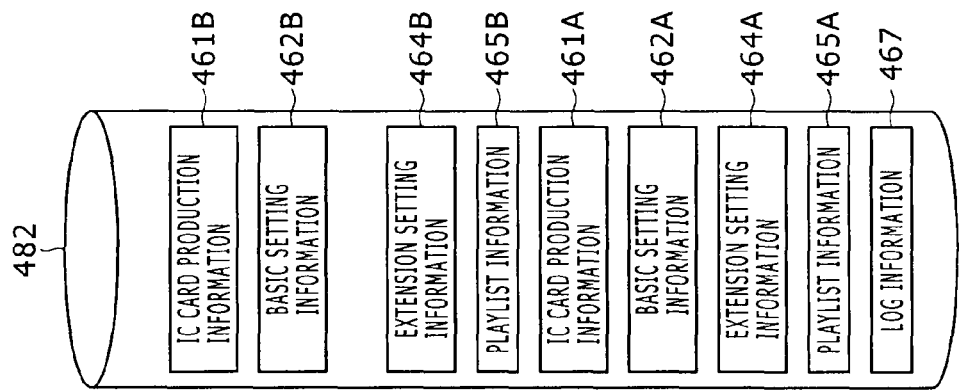
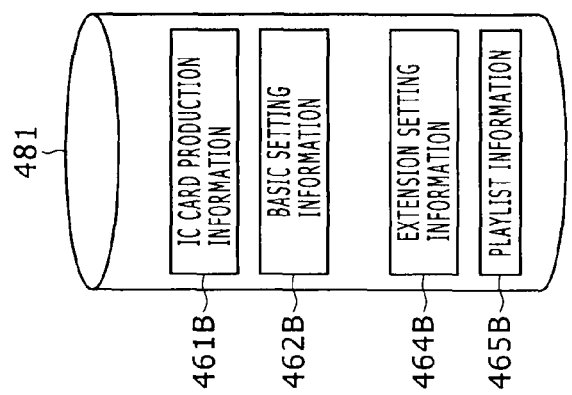

```
<USER ID>

<USER ATTRIBUTE>

ICON NUMBER

HANDLE NAME

GREETING SENTENCE

</USER ATTRIBUTE>

<ADDITION INFORMATION/>

<PLAYLIST/>

<PRODUCTION INFORMATION/>

</USER ID>
```

FIG. 34
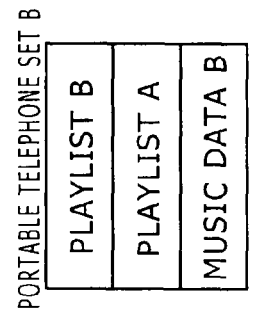
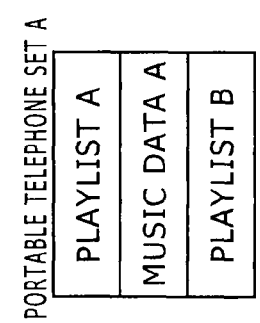
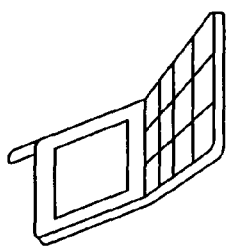
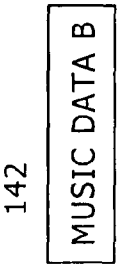
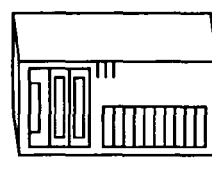

FIG. 36

| CATEGORY | DATA ITEM | | SUBSTANCE | CODE | SIGNIFICANCE (EXAMPLE) |
|---|---|---|---|---|---|
| USER ADDITION INFORMATION | USER INFORMATION A | | SEX | HALF-WIDTH NUMERAL | 1: MALE, 2: FEMALE, 3: OTHER |
| | | | BLOOD TYPE | HALF-WIDTH ENGLISH LETTER | A, B, O, AB |
| | | | BIRTHDAY | HALF-WIDTH NUMERAL | YYYYMMDD |
| | | | CONSTELLATION | HALF-WIDTH NUMERAL | 0 - 12 |
| | USER INFORMATION B | | FULL NAME | CHARACTER | |
| | | | KANA NAME | CHARACTER | |
| | | | TELEPHONE NUMBER | HALF-WIDTH NUMERAL | |
| | | | MAIL ADDRESS | HALF-WIDTH ALPHANUMERIC LETTER | |
| | | | TELEPHONE NUMBER | HALF-WIDTH NUMERAL | |
| | | | URL | HALF-WIDTH ALPHANUMERIC LETTER | |
| | | | RSS | HALF-WIDTH ALPHANUMERIC LETTER | |
| | AFFILIATE | | AFFILIATE TRADER | BINARY | FOR SERVICE DIVISION OF AFFILIATE AND COUPON |
| | | | AFFILIATE ID | BINARY | |
| | | | URL | HALF-WIDTH ALPHANUMERIC LETTER | URL FOR OBJECT COMMODITY SEARCH |

FIG.37

| CATEGORY | DATA ITEM | SUBSTANCE | CODE | SIGNIFICANCE |
|---|---|---|---|---|
| MUSICAL COMPOSITION INFORMATION | PRODUCT NUMBER | PRODUCT NUMBER | | |
| | MUSICAL COMPOSITION TITLE | MUSICAL COMPOSITION TITLE | | |
| | KANA TITLE | KANA TITLE | | |
| | ARTIST NAME | ARTIST NAME | | |
| | ARTIST KANA NAME | ARTIST KANA NAME | | |
| | GENRE NAME | GENRE NAME | | |
| | MUSICAL COMPOSITION TITLE | MUSICAL COMPOSITION TITLE | | |
| | SOUND SOURCE PURCHASE DESTINATION URL | SOUND SOURCE PURCHASE DESTINATION URL | | ALSO INTRODUCER AFFILIATE ID INCLUDED |
| | EXTENDED URL | EXTENDED URL | | URL OF MUSICAL COMPOSITION EXPLANATION PARTICULAR RSS ETC. REGARDING MUSICAL COMPOSITION INFORMATION |
| | PACKAGE ID | PACKAGE ID | | PRODUCT NUMBER FOR BUNDLING MUSICAL COMPOSITIONS |
| | REPRODUCTION TIME NUMBER | REPRODUCTION TIME NUMBER | | |

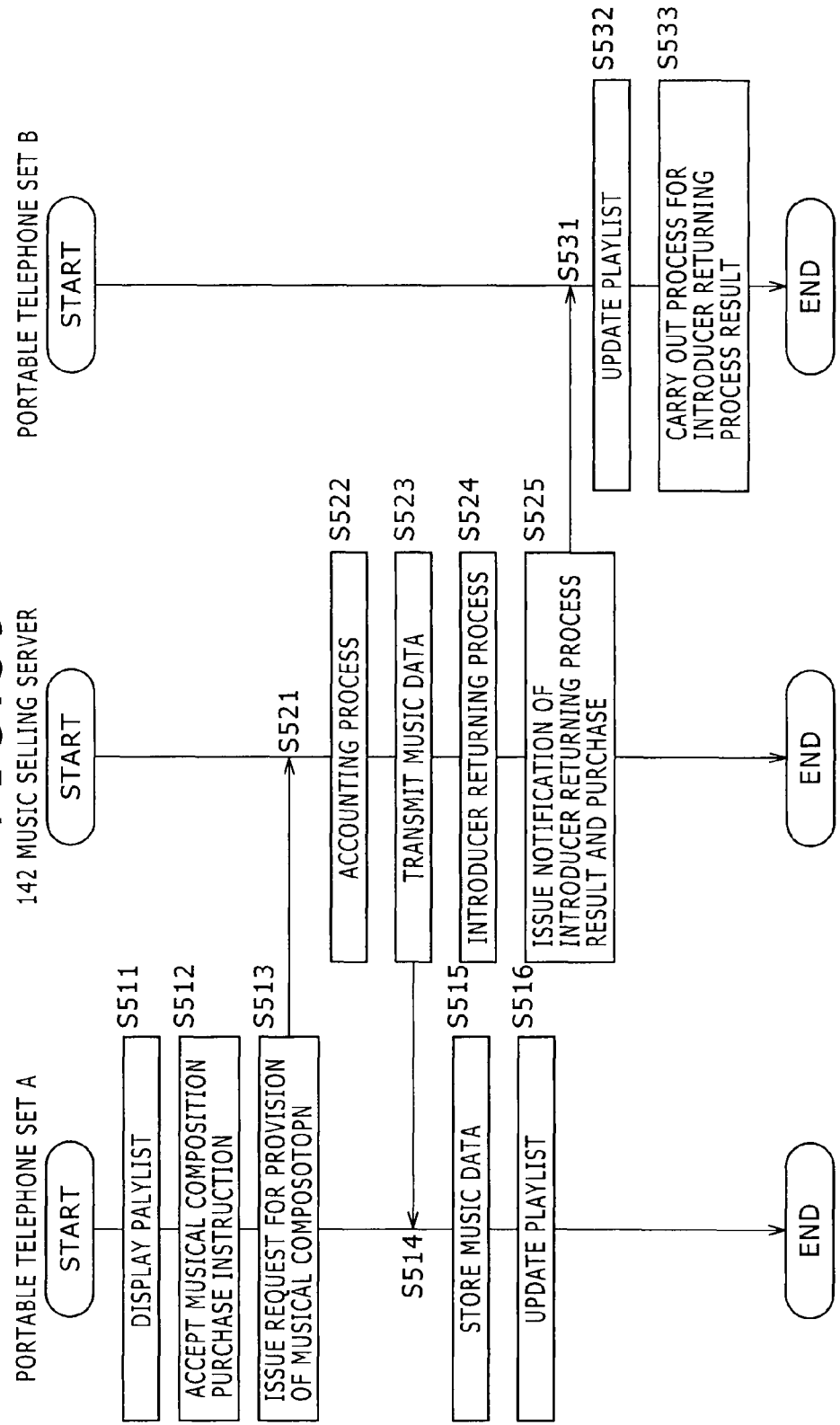

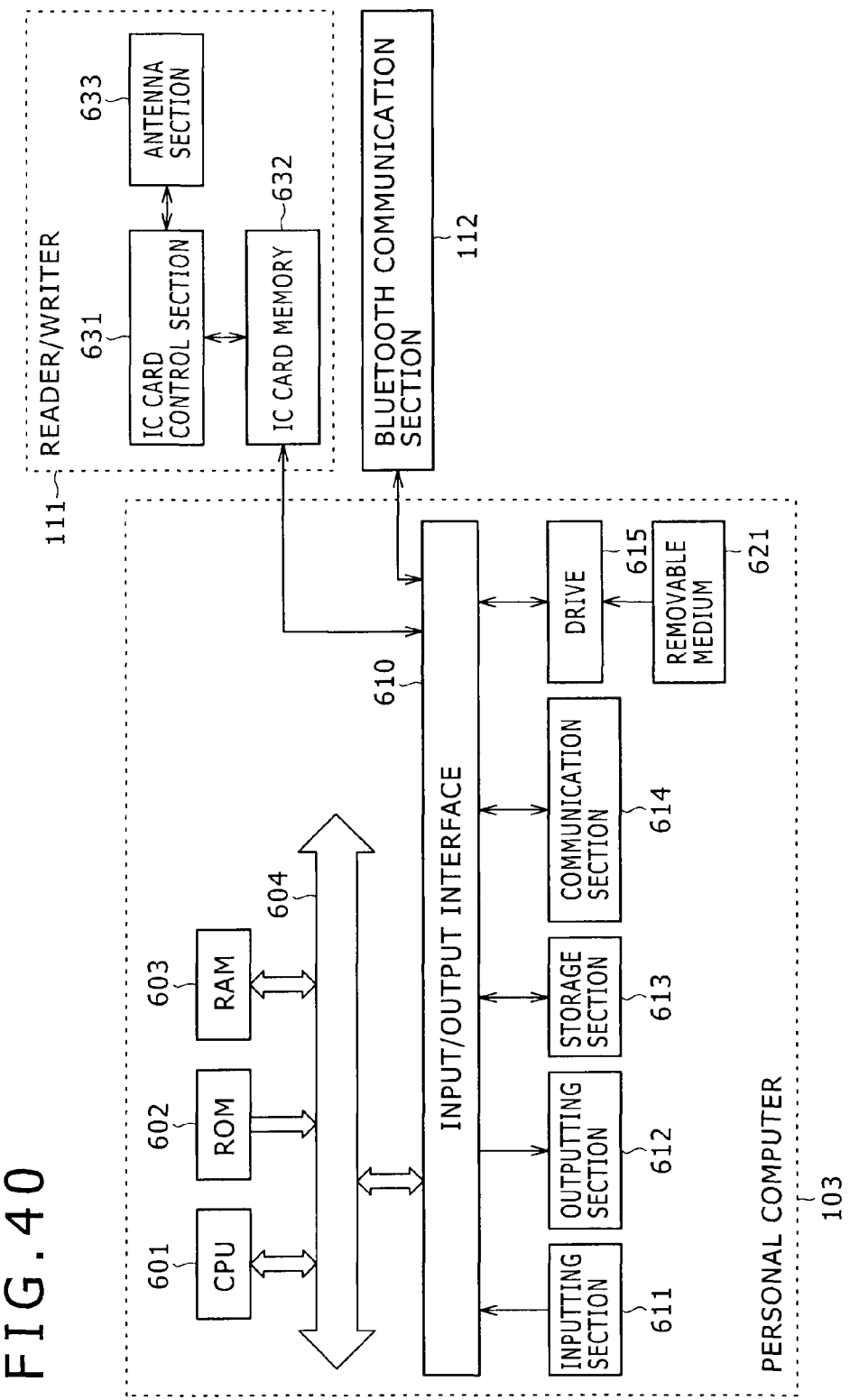

INFORMATION PROCESSING APPARATUS AND METHOD AND INFORMATION SYSTEM

CROSS REFERENCES TO RELATED APPLICATIONS

The present invention contains subject matter related to Japanese Patent Application JP 2007-206229 filed in the Japan Patent Office on Aug. 8, 2007, the entire contents of which being incorporated herein by reference.

BACKGROUND OF THE INVENTION

1. Field of the Invention

This invention relates to an information processing apparatus and method and an information processing system, and more particularly to an information processing apparatus and method and an information processing system by which provision of appropriate information can be accepted.

2. Description of the Related Art

In the past, a method of providing information from a server or the like to a terminal apparatus through a network is available. For example, a method of distributing information from a server to a terminal apparatus registered in advance in the server is available. However, according to this method, there is the possibility that the server may provide information also to a terminal apparatus which does not demand the information.

Thus, a method has been proposed which implements appropriate provision of information, that is, provision of information only to a terminal apparatus which demands the information as disclosed, for example, in Japanese Patent Laid-Open No. 2001-215975 (hereinafter referred to as Patent Document 1). According to the method of Patent Document 1, each terminal apparatus issues a request for desired information to a server, and the server provides the requested information to the terminal apparatus of the source of the request.

More particularly, in Patent Document 1, a digital portable telephone set 3 downloads a musical composition name list file from a laptop personal computer 2 in response to an operation of the user and displays a musical composition name list on a display section 21 in accordance with the musical composition name list file. Then, the digital portable telephone set 3 downloads a music file selected from within the displayed musical composition name list by the user from the laptop personal computer 2 or a music file server 6 and then reproduces the music file to output sound through a headphone 7.

SUMMARY OF THE INVENTION

However, although the convenience of a server enhances as the amount of information to be provided by the server increases, a user of a terminal apparatus has to select demanded information from the large amount of information. As such amount of information increases, the selection operation becomes more complicated, resulting in the possibility that it may become difficult to select appropriate information.

For example, where it is tried to download music data which is sound data of a musical composition from a server, the user of a terminal apparatus may select a desired musical composition from among several ten thousands musical compositions registered in the server. For example, it may seem a possible solution to the problem just described to form a list of musical compositions which can be provided by the server so as to facilitate a search thereof by categorizing the musical compositions or arranging the musical composition in order in the list depending upon the genre, artist name or the like. However, where an object musical composition is not determined in advance, the selection has to be carried out likewise from among a large number of musical compositions, and there is the possibility that the selection operation may be complicated. Where musical compositions are categorized, the user is likely to select a musical composition basically from within a category which conforms to the liking of the user. In other words, one-sidedness is likely to occur with the category of musical compositions which the user selects. If musical compositions of only limited categories are acquired, then there is the possibility that the user may loose interest, resulting in decline of the desire of the user for utilization of the service. However, a method which appropriately leads a user so as to select a category which is not selected normally is not available.

In recent years, communication apparatus of the portable type such as portable telephone sets and PDAs (Personal Digital Assistants) have been popularized thanks to development of information processing technologies. Most of such portable communication apparatus are small in size and low in operability. Therefore, such selection operation as described above is more difficult with the portable communication apparatus.

Further, it is difficult for a user of a terminal apparatus to grasp all of a large amount of information registered in a server. Therefore, also information demanded by the user may possibly be overlooked by the user although the information is registered in the server. For example, even if music data of a musical composition conforming to the liking of the user is registered in the server, if the user does not notice of the presence of the musical composition, then the user will not intend to download the musical composition from the server. Such loss of utilization opportunities of the service should preferably be decreased.

To this end, for example, a method which provides part of information registered in a server is available. For example, a method is available wherein a server which provides music data onerously, that is, sells music data provides music data, which is part of a musical composition to be sold, gratuitously as audition data. Before music data is to be purchased, the user of a terminal apparatus can audition the audition data to determine whether or not the music data should be purchased. Since this makes it possible for the user to appropriately select information to be acquired, the desire for service utilization can be enhanced.

However, where the number of musical compositions provided by the user is very great, also the number of audition data is great as much. Accordingly, the user of a terminal apparatus has to select a musical composition to be auditioned from among the large number of musical compositions, and there is the possibility that the selection operation may be complicated.

Also a method is available wherein users who have accepted a provision of each piece of information from a server register their feelings of the piece of information such that a user who wants to accept a provision of the information can determine based on the registered feelings whether or not the provision of the piece of information should be accepted. However, the feelings registered by a third party who has no relation to the user at all and whose liking is unknown to the user may not always be helpful to the user. If information whose provision is accepted based on the registered feelings has no utilization value to the user, then there is the possibility that the service utilization desire of the user may decline.

Further, although a method of acquiring information of a musical composition provided by a user from a different apparatus as in the method disclosed in Patent Document 1 seems applicable, if a laptop personal computer and a portable telephone set are used by the same user, then the information amount of a musical composition to be provided does not increase. Thus, utilization of the service in this instance is same as that where one terminal apparatus is utilized. Further, where the users of the laptop personal computer and the digital portable telephone set are different from each other, if radio communication such as Bluetooth communication is utilized, then knowledge is requisite for establishment of communication. Thus, there is the possibility that, to a user who does not have knowledge of communication techniques, the operation for the establishment of communication may be cumbersome. Further, where a large number of apparatus exist within a communication range, there is the possibility that, to a user who does not have knowledge of communication techniques, it may be difficult to grasp whether or not communication with an object apparatus is established correctly.

Therefore, it is demanded to provide an information processing apparatus and method and an information processing system by which provision of appropriate information can be accepted readily.

According to an embodiment of the present invention, there is provided an information processing apparatus as a terminal apparatus with respect to a server which provides content data, including management data acquisition means for controlling a first communication section, which carries out proximity radio communication by which the information processing apparatus transmits and receives information to and from a different terminal apparatus positioned in the proximity of the information processing apparatus, to acquire management data to be utilized for management of the content data from the different terminal apparatus by the proximity radio communication, the management data including at least identification information of the content data, display control means for controlling a display section to display the management data acquired by the management data acquisition means as image information, selection operation acceptance means for accepting a selection operation for selecting the content data by selecting the management data displayed on the display section under the control of the display control means, requesting means for controlling a second communication section, which communicates with the server through a public telephone network, to issue a request for the content data selected by the selection operation accepted by the selection operation acceptance means to the server, and content data acquisition means for controlling the second communication section to acquire the content data supplied thereto in response to the request by the requesting means.

The information processing apparatus may be configured such that the management data include information indicative of a connection destination of the server which provides the content data, and the requesting means accesses the connection destination based on the management data to issue the request for the content data.

The information processing apparatus may further include storage means for storing the management data in advance, and management data supplying means for reading out the management data stored in the storage means and controlling the first communication section to supply the read out management data by the proximity radio communication to the different terminal apparatus positioned in the proximity of the information processing apparatus.

The information processing apparatus may be configured such that the content data are music data which are sound data of a musical composition, and the management data include musical composition information which is information relating to the musical composition.

The information processing apparatus may further include notification means for issuing a notification that content data corresponding to the management data acquired by the management data acquisition means are acquired from the server by the content data acquisition means to the different terminal apparatus which is a providing source of the management data.

The information processing apparatus may be configured such that the management data include information of the different terminal apparatus which is a providing source of the management data, and the requesting means issues the request for the content data and provides information of the different terminal apparatus which is a providing source of the management data to the server.

The information processing apparatus may further include a third communication section configured to carry out proximity radio communication by a communication method different from that of the proximity radio communication, requesting means for controlling the third communication section to issue a request for content data selected by the selection operation accepted by the selection operation acceptance means to the different apparatus, content data acquisition means for controlling the third communication section to acquire the content data supplied in response to the request by the requesting means, and decision means for deciding whether or not the different apparatus exists in a communication range of the proximity radio communication by the third communication section, the requesting means issuing, when it is decided by the decision means that the different apparatus does not exists in the communication range and the selection operation of content data is accepted by the selection operation acceptance means, a request for the selected content data to the server.

According to another embodiment of the present invention, there is provided an information processing method for an information processing apparatus as a terminal apparatus with respect to a server which provides content data, including the steps of controlling a first communication section, which carries out proximity radio communication by which the information processing apparatus transmits and receives information to and from a different terminal apparatus positioned in the proximity of the information processing apparatus, to acquire management data to be utilized for management of the content data from the different terminal apparatus by the proximity radio communication, the management data including at least identification information of the content data, controlling a display section to display the acquired management data as image information, accepting a selection operation for selecting the content data by selecting the management data displayed on the display section, controlling a second communication section, which communicates with the server through a public telephone network, to issue a request for the content data selected by the selection operation to the server, and controlling the second communication section to acquire the content data supplied in response to the request.

According to a further embodiment of the present invention, there is provided an information processing system including a server, and first and second terminal apparatus to which content data are provided from the server, the first terminal apparatus including management data acquisition means for controlling a first communication section, which carries out proximity radio communication by which the first information processing apparatus transmits and receives information to and from the second terminal apparatus which is a different terminal apparatus positioned in the proximity of the first terminal apparatus, to acquire management data to be utilized for management of the content data from the second terminal apparatus by the proximity radio communication, the management data including at least identification information of the content data, display control means for controlling a display section to display the management data acquired by the management data acquisition means as image information, selection operation acceptance means for accepting a selection operation for selecting the content data by selecting the management data displayed on the display section under the control of the display control means, requesting means for controlling a second communication section, which communicates with the server through a public telephone network, to issue a request for the content data selected by the selection operation accepted by the selection operation acceptance means to the server, and content data acquisition means for controlling the second communication section to acquire the content data supplied thereto in response to the request by the requesting means, the second terminal apparatus including management data storage means for storing the management data, and management data supplying means for reading out the management data stored in the management data storage means and controlling a third communication section, which carries out proximity radio communication by which the second terminal apparatus transmits and receives information to and from the first terminal apparatus which is positioned in the proximity of the second terminal apparatus, to supply the read out management data by the proximity radio communication to the first terminal apparatus positioned, the server including content data storage means for storing the content data, request acceptance means for controlling a fourth communication section, which communicates with the first terminal apparatus through the public telephone network, to accept a request for content data from the first terminal apparatus, and content data supplying means for reading out the requested content data from the storage means based on the request accepted by the request acceptance means and controlling the fourth communication section to supply the read out content data to the first terminal apparatus which is a requesting source of the request.

In the information processing apparatus and the information processing system, the first communication section which carries out proximity radio communication by which the information processing apparatus transmits and receives information to and from the different terminal apparatus positioned in the proximity of the information processing apparatus is controlled to acquire management data to be utilized for management of the content data, which include at least identification information of the content data, from the different terminal apparatus by the proximity radio communication. Then, the acquired management data is displayed as image information on the display section. Then, a selection operation for selecting the content data by selecting the management data displayed on the display section is accepted. Then, the second communication section which communicates with the server through a public telephone network is controlled to issue a request for the content data selected by the selection operation accepted by the selection operation. Then, the second communication section is controlled to acquire the content data supplied thereto in response to the request.

In the information processing system, the first communication section which carries out proximity radio communication by which the first information processing apparatus transmits and receives information to and from the second terminal apparatus which is a different terminal apparatus positioned in the proximity of the first terminal apparatus is controlled to acquire management data to be utilized for management of the content data, which include at least identification information of the content data, from the second terminal apparatus by the proximity radio communication. The acquired management data is displayed as image information on the display section. Then, a selection operation for selecting the content data by selecting the management data displayed on the display section is accepted. Then, the second communication section which communicates with the server through a public telephone network is controlled to issue a request for the content data selected by the selection operation to the server. Then, the content data supplied thereto in response to the request are acquired. In the second terminal apparatus, the management data are stored, and the stored management data are read out. The third communication section which carries out proximity radio communication by which the second terminal apparatus transmits and receives information to and from the first terminal apparatus which is positioned in the proximity of the second terminal apparatus is controlled to supply the read out management data by the proximity radio communication to the first terminal apparatus. In the server, the content data are stored, and the fourth communication section which communicates with the first terminal apparatus through the public telephone network is controlled to accept a request for content data from the first terminal apparatus. Then, the requested content data are read out based on the request, and the fourth communication section is controlled to supply the read out content data to the first terminal apparatus which is a requesting source of the request.

With the information processing apparatus and method and the information processing system, a provision of information can be accepted, and particularly, an appropriate provision of information can be accepted readily.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing an example of an internal configuration of a portable telephone set shown in FIG. 1;

FIG. 3 is a block diagram showing an example of an internal configuration of a music selling server shown in FIG. 1;

FIG. 5 is a schematic view illustrating an example of a manner of purchase and sharing of music data;

FIG. 7 is a diagrammatic view illustrating an example of a configuration of data which the portable telephone set has;

FIG. 8 is a view illustrating an example of device setting information;

FIG. 9 is a view illustrating an example of user addition information;

FIG. 10 is a view illustrating an example of playlist information;

FIG. 11 is a view illustrating an example of musical composition information;

FIG. 12 is a view illustrating an example of package information;

FIGS. 19 and 20 are diagrammatic views illustrating a manner of data stored in different portable telephone sets used in the network system;

FIG. 25 is a view illustrating an example of a configuration of management information;

FIG. 34 is a schematic view illustrating another example of a manner of purchase and sharing of music data;

FIG. 36 is a view illustrating another example of user addition information;

FIG. 37 is a view illustrating another example of music composition information;

FIG. 39 is a flow chart illustrating another example of a flow of processes regarding purchase of music data; and FIG. 40 is a block diagram showing an example of a configuration of a personal computer to the present invention is applied.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 4A:
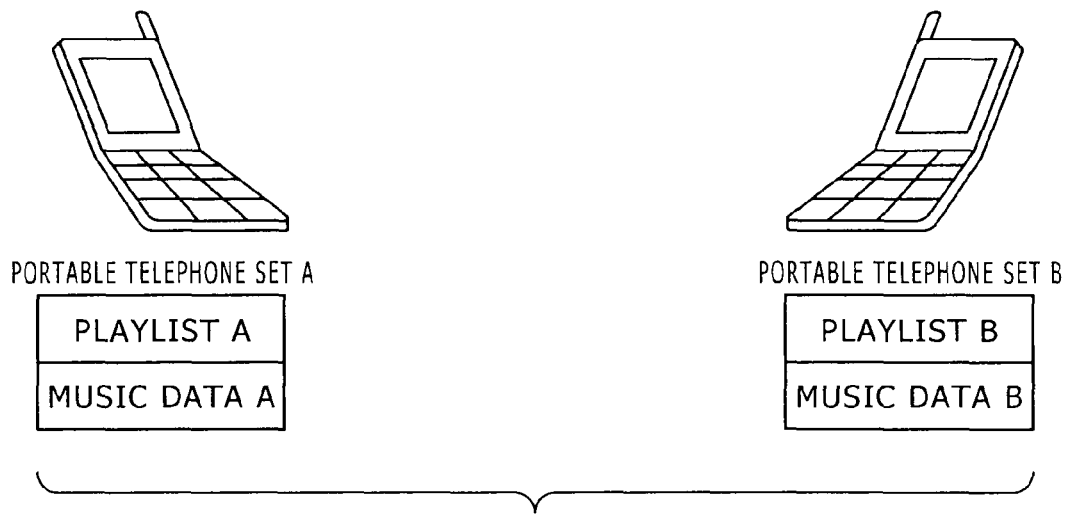
FIGS. 4A and 4B are schematic views illustrating an example of a manner of exchange of playlists.
Figure 4B:
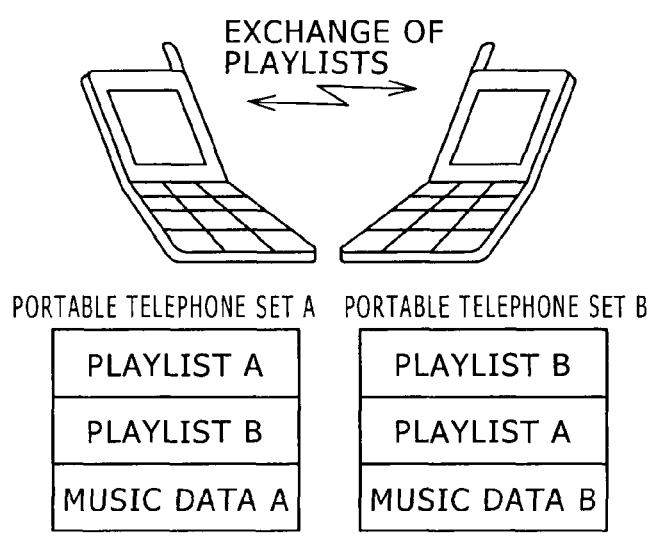

According to an embodiment of the present invention, there is provided an information processing apparatus (for example, a portable telephone set 101 of FIG. 1) as a terminal apparatus with respect to a server (for example, a music selling server 142 of FIG. 1) which provides content data (for example, music data B of FIGS. 4A and 4B), including management data acquisition means (for example, a playlist exchange A control section 311 of FIG. 6 which executes a process at step S279 of FIG. 22) for controlling a first communication section (for example, an IC card section 218 of FIG. 2), which carries out proximity radio communication by which the information processing apparatus transmits and receives information to and from a different terminal apparatus (for example, a portable telephone set B with respect to a portable telephone set A of FIGS. 4A and 4B) positioned in the proximity of the information processing apparatus, to acquire management data (for example, a playlist B of FIGS. 4A and 4B) to be utilized for management of the content data from the different terminal apparatus by the proximity radio communication, the management data including at least identification information of the content data, display control means (for example, a display control section 313 of FIG. 6 which executes a process at step S401 of FIG. 26) for controlling a display section (for example, an outputting section 212 of FIG. 2) to display the management data acquired by the management data acquisition means as image information, selection operation acceptance means (for example, the display control section 313 of FIG. 6 which executes a process at step S402 of FIG. 26) for accepting a selection operation for selecting the content data by selecting the management data displayed on the display section under the control of the display control means, requesting means (for example, a purchase process control section 315 of FIG. 6 which executes a process at step S403 of FIG. 26) for controlling a second communication section (for example, a telephone network communication section 214 of FIG. 2), which communicates with the server through a public telephone network (for example, a network 131 of FIG. 1), to issue a request for the content data selected by the selection operation accepted by the selection operation acceptance means to the server, and content data acquisition means (for example, the purchase process control section 315 of FIG. 6 which executes a process at step S404 of FIG. 26) for controlling the second communication section to acquire the content data supplied thereto in response to the request by the requesting means.

The information processing apparatus may be configured such that the management data include information (for example, a sound source purchase destination URL of FIG. 7) indicative of a connection destination of the server which provides the content data, and the requesting means accesses the connection destination based on the management data to issue the request for the content data.

The information processing apparatus may further include storage means (for example, a device memory 302 of FIG. 6) for storing the management data in advance, and management data supplying means (for example, a playlist exchange A control section 311 of FIG. 6 which executes processes at steps S274 to S276 of FIG. 22) for reading out the management data stored in the storage means and controlling the first communication section to supply the read out management data by the proximity radio communication to the different terminal apparatus positioned in the proximity of the information processing apparatus.

The information processing apparatus may further include notification means (for example, a purchase process control section 315 of FIG. 6 which executes a process at step S495 of FIG. 33) for issuing a notification that content data corresponding to the management data acquired by the management data acquisition means are acquired from the server by the content data acquisition means to the different terminal apparatus which is a providing source of the management data.

The information processing apparatus may be configured such that the management data include information (for example, an introducer affiliate ID included in a sound source purchase destination URL 414 of FIG. 37) of the different terminal apparatus which is a providing source of the management data, and the requesting means issues the request for the content data and provides information of the different terminal apparatus which is a providing source of the management data to the server.

The information processing apparatus may further include a third communication section (for example, a Bluetooth communication section 217 of FIG. 2) for carrying out proximity radio communication by a communication method different from that of the proximity radio communication, requesting means (for example, a reception side reproduction processing control section 318 of FIG. 8) for controlling the third communication section to issue a request for content data selected by the selection operation accepted by the selection operation acceptance means to the different apparatus, content data acquisition means (for example, the reception side reproduction processing control section 318 of FIG. 8) for controlling the third communication section to acquire the content data supplied in response to the request by the requesting means, and decision means (for example, a Bluetooth control section 331 of FIG. 6) for deciding whether or not the different apparatus exists in a communication range of the radio communication by the third communication section, the requesting means issuing, when it is decided by the decision means that the different apparatus does not exists in the communication range and the selection operation of content data is accepted by the selection operation acceptance means, a request for the selected content data to the server.

Figure 26:
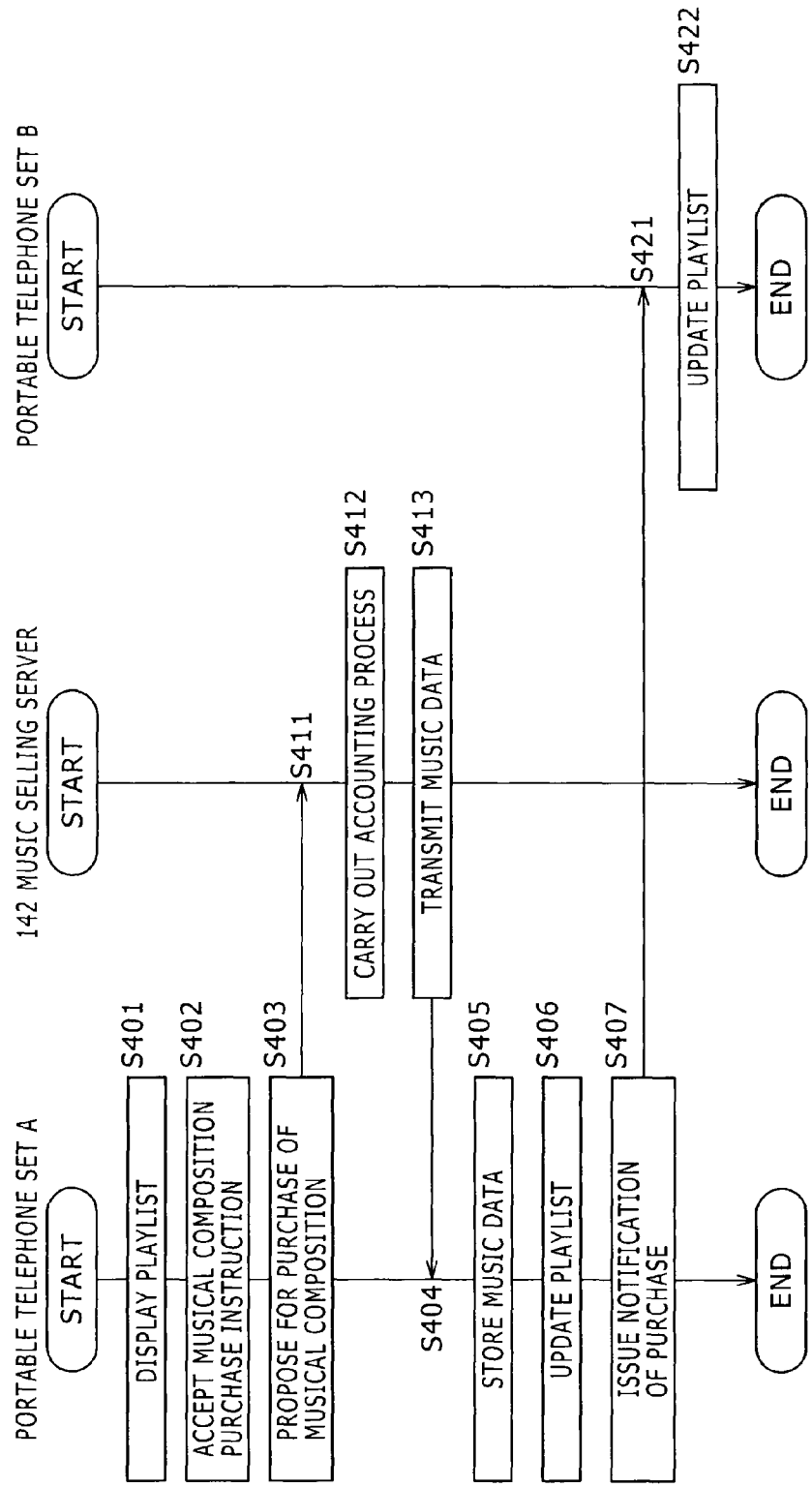
FIG. 26 is a flow chart illustrating an example of a detailed flow of processes regarding purchase of music data.

According to another embodiment of the present invention, there is provided an information processing method for an information processing apparatus as a terminal apparatus with respect to a server which provides content data, including the steps of controlling a first communication section, which carries out proximity radio communication by which the information processing apparatus transmits and receives information to and from a different terminal apparatus positioned in the proximity of the information processing apparatus, to acquire management data to be utilized for management of the content data from the different terminal apparatus by the proximity radio communication (for example, step S279 of FIG. 22), the management data including at least identification information of the content data, controlling a display section to display the acquired management data as image information (for example, step S401 of FIG. 26), accepting a selection operation for selecting the content data by selecting the management data displayed on the display section (for example, step S402 of FIG. 26), controlling a second communication section, which communicates with the server through a public telephone network, to issue a request for the content data selected by the selection operation to the server (for example, step S403 of FIG. 26), and controlling the second communication section to acquire the content data supplied in response to the request (for example, step S404 of FIG. 26).

According to a further embodiment of the present invention, there is provided an information processing system (for example, a network system 100 of FIG. 1) including a server (for example, a music selling server 142 of FIG. 1), and first and second terminal apparatus (for example, a portable telephone set 101) to which content data are provided from the server, the first terminal apparatus (for example, a portable telephone set A of FIGS. 4A and 4B) including management data acquisition means (for example, a playlist exchange A control section 311 of FIG. 6 which executes a process at step S279 of FIG. 22) for controlling a first communication section (for example, an IC card section 218 of FIG. 2), which carries out proximity radio communication by which the first information processing apparatus transmits and receives information to and from the second terminal apparatus (for example, a portable telephone set B) which is a different terminal apparatus positioned in the proximity of the first terminal apparatus, to acquire management data (for example, a playlist B of FIGS. 4A and 4B) to be utilized for management of the content data from the different terminal apparatus by the proximity radio communication, the management data including at least identification information of the content data, display control means (for example, a display control section 313 of FIG. 6 which executes a process at step S401 of FIG. 26) for controlling a display section (for example, an outputting section 212 of FIG. 2) to display the management data acquired by the management data acquisition means as image information, selection operation acceptance means (for example, the display control section 313 of FIG. 6 which executes a process at step S402 of FIG. 26) for accepting a selection operation for selecting the content data by selecting the management data displayed on the display section under the control of the display control means, requesting means (for example, a purchase process control section 315 of FIG. 6 which executes a process at step S403 of FIG. 26) for controlling a second communication section (for example, a telephone network communication section 214 of FIG. 2), which communicates with the server through a public telephone network (for example, a network 131 of FIG. 1), to issue a request for the content data selected by the selection operation accepted by the selection operation acceptance means to the server, and content data acquisition means (for example, the purchase process control section 315 of FIG. 6 which executes a process at step S404 of FIG. 26) for controlling the second communication section to acquire the content data supplied thereto in response to the request by the requesting means, the second terminal apparatus including management data storage means (for example, a device memory 302 of FIG. 6) for storing the management data, and management data supplying means (for example, a playlist exchange B control section 312 of FIG. 6 which executes a process at step S379 of FIG. 24) for reading out the management data stored in the management data storage means and controlling a third communication section (for example, an IC card section 218 of FIG. 2), which carries out proximity radio communication by which the second terminal apparatus transmits and receives information to and from the first terminal apparatus which is positioned in the proximity of the second terminal apparatus, to supply the read out management data by the proximity radio communication to the first terminal apparatus positioned, the server including content data storage means (for example, a music data database 456 of FIG. 13) for storing the content data, request acceptance means (for example, a request acceptance control section 451 of FIG. 13) for controlling a fourth communication section (for example, a communication section 264 of FIG. 3), which communicates with the first terminal apparatus through the public telephone network, to accept a request for content data from the first terminal apparatus, and content data supplying means (for example, a music data supply processing section 453 of FIG. 13) for reading out the requested content data from the storage means based on the request accepted by the request acceptance means and controlling the fourth communication section to supply the read out content data to the first terminal apparatus which is a requesting source of the request.

In the following, a preferred embodiment of the present invention is described.

Figure 1:
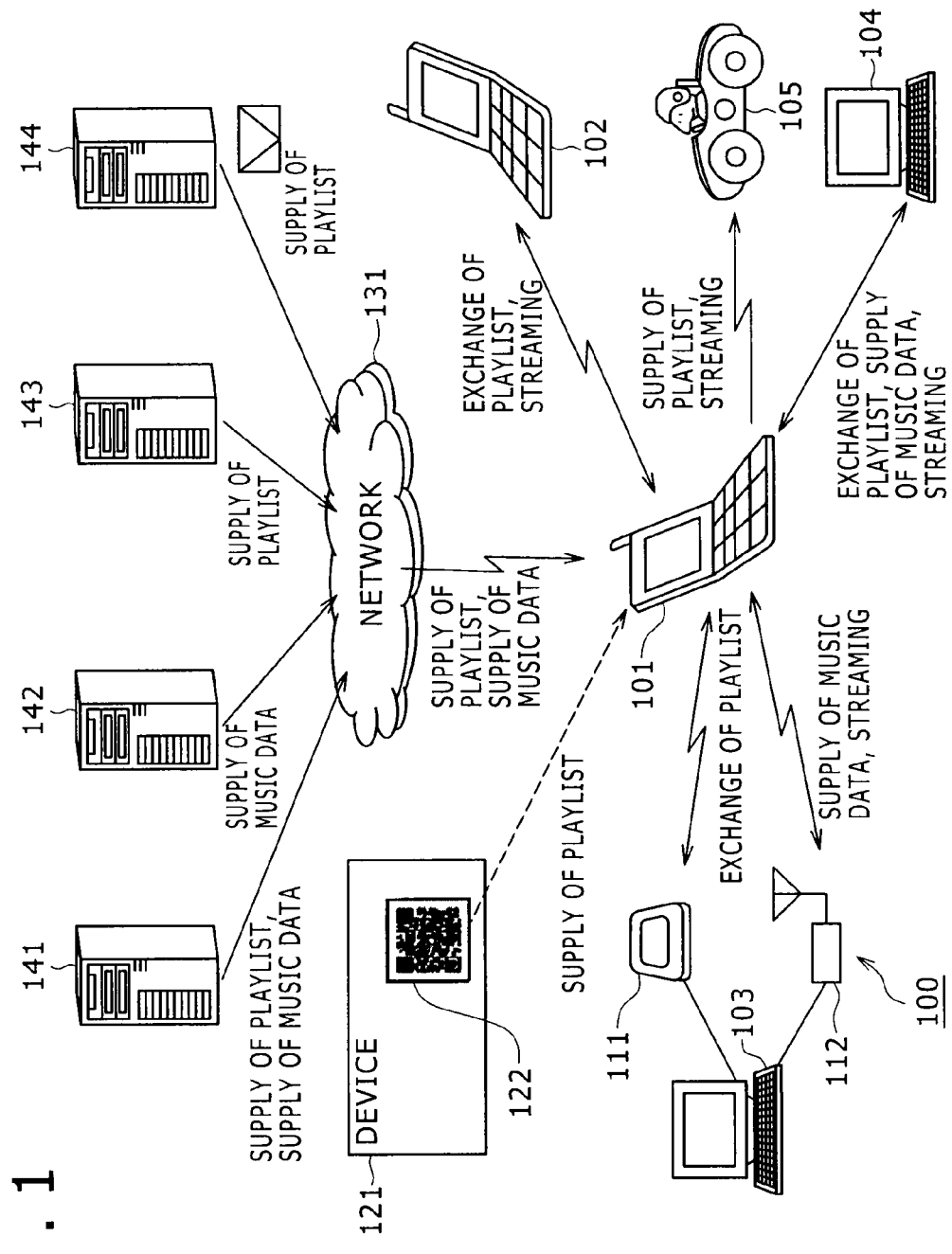
FIG. 1 is a schematic view showing an example of a configuration of a network system to which the present invention is applied.

FIG. 1 shows an example of a configuration of a network system to which the present invention is applied.

Referring to FIG. 1, the network system 100 shown is composed of a plurality of apparatus and allows information to be provided readily from a server to a terminal apparatus. In particular, a terminal apparatus of the network system 100 can exchange a playlist with a different apparatus to easily collect information of high reliability regarding music data and acquire music data from a server based on the playlist. In other words, according to the network system 100, a server appropriately provides music data to a terminal apparatus.

The music data is content data obtained by conversion of a sound signal of music which is a content. Naturally, the music data is not restricted in terms of the number, substance, time, sound volume, data amount and other features of musical compositions. The music data may have any substance. It is to be noted that a musical composition here may include not only play sound of a musical instrument but also any sound signal including voice of a human being, sound of the natural world and artificially created sound. Although music data is provided with or without consideration as hereinafter described, basically it is provided in a unit of a musical composition. It is to be noted that a plurality of musical compositions may be provided collectively as a package.

Components of the network system 100 transfer or exchange data called playlist as hereinafter described. A playlist is metadata or relating information including the substance or a musical composition of music data which is provided data provided from a server and information relating to the data itself and is management data utilized for management of content data. Although details are hereinafter described, the playlist includes identification information of a musical composition such as an ID or the title. In other words, by transfer of a playlist, a user of a terminal apparatus of the network system 100 can acquire information regarding a musical composition readily.

Although details are hereinafter described, a transferred playlist is displayed, for example, as a GUI (Graphical User Interface). If the user selects a musical composition to be reproduced from within the playlist, then it can carry out reproduction of streaming data of the selected musical composition on the terminal apparatus or purchase or acquisition of music data.

A portable telephone set 101 shown in FIG. 1 is an example of a terminal apparatus of the network system 100. The portable telephone set 101 has a communication function of establishing a connection to a public telephone network through a base station using a radio communication function thereof to carry out music communication with a different telephone set. The portable telephone set 101 further has a packet communication function of establishing a connection to the Internet through the public telephone network to carry out packet communication with a different communication apparatus. The portable telephone set 101 can utilize the packet communication function to establish a connection to and communicate with, for example, a WEB server 141, a music selling server 142, an SNS server 143, a mail distribution server 144 or the like through a network 131 formed from one or a plurality of networks such as a public telephone network or the Internet.

For example, the portable telephone set 101 can establish a connection to the WEB server 141 to acquire or receive supply of a playlist or music data from a WEB site provided by the WEB server 141. Further, the portable telephone set 101 can establish a connection, for example, to the music selling server 142 to purchase and acquire music data of a music selling site provided by the music selling server 142. Furthermore, the portable telephone set 101 can log in an SNS (Social Network Site) provided by the SNS server 143 to acquire a playlist provided by a different user or a manager from the SNS. Further, the portable telephone set 101 can acquire an electronic mail distributed from the mail distribution server 144 and having a playlist described therein or having a playlist annexed thereto.

Further, the portable telephone set 101 has a digital camera function of picking up an image of an image pickup object and obtain image data of the picked up image, and a QR code decoding function of decoding a QR (Quick Response) code, which is a two-dimensional code symbol picked up by the digital camera function to obtain information included in the QR code. The portable telephone set 101 can utilize the digital camera function to pick up an image of a QR code 122 printed or displayed on a device 121 shown in FIG. 1 and utilize the QR code decoding function to extract and retain a playlist included in the picked up QR code 122. For example, if a playlist is extracted by the QR code decoding function, then an application for sharing music data is started, and an extracted playlist is stored into and managed in a storage section.

It is to be noted that the device 121 may be any device only if it presents the QR code 122 and may be, for example, a wall of a building, a housing of an apparatus, a printed matter such as a poster or a magazine, a monitor such as an LCD (Liquid Crystal Display) apparatus or an organic EL (Electroluminescence) display apparatus.

The portable telephone set 101 further has a wire communication function of communicating with another apparatus connected thereto by a wire connection using predetermined wire communication standards represented, for example, by the USB (Universal Serial Bus) or the IEEE (Institute of Electrical and Electronic Engineers) 1394. The portable telephone set 101 can use the wire communication function to communicate with a personal computer 104 (hereinafter referred to as PC 104) connected to the portable telephone set 101 by a wire connection. For example, the portable telephone set 101 can acquire a playlist or music data from the PC 104 connected by a wire connection thereto through a communication cable.

Consequently, the portable telephone set 101 can readily acquire music data purchased through and accumulated in the PC 104 or music data produced using the PC 104, a playlist of such music data and so forth.

It is to be noted that the method of acquiring a playlist or music data may be any other than the method described above. For example, a playlist or music data may be transferred through a removable medium such as a flash memory. The portable telephone set 101 can also produce a playlist of music data retained therein in accordance with a user instruction or automatically in accordance with a predetermined condition.

The portable telephone set 101 stores a playlist or music data acquired in such a manner as described above as data belonging to the portable telephone set 101 itself. The portable telephone set 101 can reproduce music data stored therein and output sound of the musical composition of the music data. Further, the portable telephone set 101 can use the playlist stored therein to acquire music data of a musical composition included in the playlist from a different apparatus. Although details are hereinafter described, information regarding each of musical compositions of the playlist sometimes includes information of a providing source of the music data such as a URL (Uniform Resource Locator) of a site which provides music data. In this instance, the portable telephone set 101 can use the information of the providing source to acquire or receive provision of the music data. For example, the portable telephone set 101 can acquire or purchase, based on a playlist obtained by image pickup of a QR code 122, music data of a musical composition included in the playlist from the music selling server 142. In other words, the user of the portable telephone set 101 can recognize the presence of music data from a playlist and can acquire the music data readily if it is interested in the music data.

The playlist stored in the portable telephone set 101 in such a manner as described above may not be a playlist of musical compositions of music data stored in the portable telephone set 101. In other words, the music data and the playlist stored in the portable telephone set 101 need not correspond to each other. However, for sharing of music data, preferably the portable telephone set 101 stores all playlists regarding musical compositions of music stored therein as hereinafter described.

The portable telephone set 101 can share music data with a different apparatus using a playlist. For example, the portable telephone set 101 may supply a playlist stored therein, that is, a playlist belonging to the portable telephone set 101, to a different apparatus and acquire a playlist stored in the different apparatus, that is, a playlist belonging to the different apparatus. In other words, the portable telephone set 101 and the different apparatus may exchange their playlists therebetween. By the exchange of the playlists, the portable telephone set 101 has both of the playlist belonging to the portable telephone set 101 itself and the playlist belonging to the different apparatus which is the opposite party of the exchange. At this time, the portable telephone set 101 manages the playlist acquired from the different apparatus in an associated relationship with the different apparatus.

By such exchange of playlists as described above, the portable telephone set 101 can cause the different apparatus to carry out streaming reproduction of music data stored in the different apparatus and acquire the music data as streaming data. For example, if the user of the portable telephone set 101 selects a musical composition in the playlist acquired from the different apparatus, then the portable telephone set 101 issues a request for reproduction of the selected musical composition to the different apparatus to which the playlist corresponds. The different apparatus receives the reproduction request and transmits music data of the request musical composition as streaming data to the portable telephone set 101. The portable telephone set 101 sequentially reproduces the streaming data supplied thereto from the different apparatus to output sound of the streaming data.

It is to be noted that, if the different apparatus has similar functions to those of the portable telephone set 101, then it can acquire music data stored in the portable telephone set 101 and reproduce and output the music data in a similar manner as in the method described above. The portable telephone set 101 and the different apparatus between which the playlists are exchanged as described above can substantially share music data by streaming reproduction.

It is to be noted that the portable telephone set 101 is basically in a state wherein it does not store musical compositions or music data corresponding to the playlist acquired from the opposite party of the exchange of playlists, that is, it is in a state wherein the opposite party apparatus has stored therein or is capable of acquiring the musical compositions or music data. The portable telephone set 101 inhibits exchange of the playlist acquired by the exchange with the different apparatus with a further apparatus. In other words, the portable telephone set 101 does not set a play apparatus acquired by exchange and belonging to another apparatus as an object of exchange. To this end, the portable telephone set 101 manages a playlist acquired by exchange in an associated relationship with the opposite party of the exchange and distinguishes the playlist from a playlist acquired from any other apparatus by exchange as well as from the playlist belonging to the portable telephone set 101 itself.

Incidentally, the portable telephone set 101 has an IC card function of the contactless type, a reader/writer function for an IC card, and a Bluetooth communication function.

The IC card is a device of the card type which includes a built-in IC chip or semiconductor integrated circuit for storage of information and mathematical operation and can record information into the IC chip. Usually, the IC card can record data of a greater amount than a magnetic card and is higher in security against falsification of data and forgery of the card, and is applied, for example, to an electronic money and a telephone card. The IC card communicates with a compatible reader/writer to supply information stored in the IC chip to the reader/writer or store data supplied from the reader/writer into the IC chip. An IC card of the contactless type makes use of wireless or radio communication to carry out transfer or communication of such data without contacting with the device. Thus, the IC card of the contactless type (and the reader/writer) has an antenna for wireless communication in addition to the IC chip.

The IC card function signifies such functions of an IC card as described above, that is, the radio communication function, data retaining function, information processing function and so forth. In other words, the portable telephone set 101 has a built-in configuration of an IC card. Although details are hereinafter described, the portable telephone set 101 not only has a built-in IC card but also allows transfer of data between the IC card and the other components thereof and cooperation of the IC card and the other components to execute processing.

The communication distance of the radio communication of the IC card function does not have any particular limitation but may be any distance. For example, the IC card function may be not of the contactless type but of the contact type, or in other words, the communication distance may be 0 m. In the following, it is assumed that the communication distance is a very short distance of approximately 10 cm or less. A contactless IC card having a very short communication distance has been popularized most at present and can be developed readily. Further, since the contactless IC card can communicate in a contactless condition, it is easy to maintain the posture thereof during communication and stabilized communication can be implemented readily. Furthermore, since the communication distance is limited to the very short distance, it is easy to specify the opposite party of the communication, and besides since operation for execution of the communication is clear, occurrence of unintended communication can be reduced.

The reader/writer function for an IC card is one of functions which the reader/writer described above has and is a function of reading out information stored in the IC card and writing information into the IC card.

Generally, an IC card can communicate only with a reader/writer, but may not communicate with another IC card. In other words, in the very short distance radio communication, one of the parties of the communication has to have a reader/writer function. The portable telephone set 101 has both of the IC card function and the reader/writer function. In particular, the portable telephone set 101 can supply information retained by the IC card function to another reader/writer or another device having the reader/writer function. Further, the portable telephone set 101 can use the reader/writer function to read out information from another IC card or another device having the IC card function.

The Bluetooth function is a function of carrying out Bluetooth communication which is one of short distance radio communication techniques. It is to be noted that the short distance here signifies a distance equal to or shorter than approximately 10 m. Thus, the Bluetooth function has a communication distance longer than that of the very short distance radio communication by the IC card function or reader/writer function. Accordingly, the degree of freedom in the position and the posture of the portable telephone set 101 is enhanced in comparison with that based on communication by the IC card function. Further, the Bluetooth function is generally higher in communication speed than the IC card function and can transfer a large amount of data in a shorter period of time.

The portable telephone set 101 exchanges or transfers playlists to and from a different apparatus by the very short distance radio communication by the IC card function and the reader/writer function. Further, the portable telephone set 101 carries out sharing of music data with a different apparatus using the Bluetooth communication function, that is, transfer of streaming data to and from a different apparatus.

For example, the portable telephone set 101 can carry out exchange of playlists and sharing of music data with another portable telephone set 102 having similar functions. In the portable telephone set 102, a playlist and music data acquired by a similar method to that by the portable telephone set 101 described hereinabove are stored as data belonging to the portable telephone set 102. The portable telephone set 101 and the portable telephone set 102 can exchange their playlists by the very short distance radio communication using the IC card function (and the reader/writer function) and share music data by Bluetooth communication.

Further, for example, the portable telephone set 101 can carry out exchange of playlists and sharing of music data with a personal computer 103 (hereinafter referred to as PC 103) having a reader/writer 111 compatible with the IC card function which the portable telephone set 101 has and a Bluetooth communication section 112 (hereinafter referred to as BT communication section 112) having the Bluetooth function. The portable telephone set 101 can exchange playlists with the PC 103 through the reader/writer 111. Further, the portable telephone set 101 can share music data with the PC 103 by communicating streaming data through the BT communication section 112.

Further, for example, the portable telephone set 101 can supply a playlist to an audio device 105 for a car audio system or the like and can supply streaming data of music data stored in the portable telephone set 101 to the audio device 105 having a high output performance so that sound can be outputted from the audio device 105.

Though not shown, the audio device 105 has a reader/writer function compatible with the IC card function which the portable telephone set 101 has, and a Bluetooth communication function. The portable telephone set 101 uses the IC card function to supply the playlist thereof to the audio device 105 by the very short distance radio communication. If the user operates the audio device 105 to select music data stored in the portable telephone set 101 from within the playlist displayed as a GUI image, then streaming data of the music data is supplied from the portable telephone set 101 to the audio device 105 by the Bluetooth communication function. In this manner, when the portable telephone set 101 reproduces music data stored in the portable telephone set 101, sound of high quality can be outputted from the audio device 105 of a high performance.

While, in the foregoing description, exchange of playlists is carried out by the very short distance radio communication using the IC card and the reader/writer function and transfer of streaming data of music data is carried out by the short distance radio communication using the Bluetooth communication function, exchange of playlists or transfer of streaming data of music data may be carried out using any communication function. For example, the portable telephone set 101 may exchange playlists with a different device connected thereto by a wire connection by wire communication. In particular, the portable telephone set 101 can exchange playlists with the PC 104 connected thereto by wire connection and transfer streaming data of music data.

In the network system 100, enhancement of the utilization motivation of a music data sales service of the user of the portable telephone set 101 which is a terminal apparatus by the music selling server 142 can be anticipated by such sharing of music data and transfer or exchange of playlists. Details are hereinafter described.

FIG. 2 shows an example of an internal configuration of the portable telephone set 101.

Referring to FIG. 2, the portable telephone set 101 includes a central processing unit (hereinafter referred to as CPU) 201 which is a mathematical operation processing section and executes a software program to execute value processes. The CPU 201 is connected to a read only memory (hereinafter referred to as ROM) 202 and a random access memory (hereinafter referred to as RAM) 203 through a bus 204. The ROM 202 stores software programs and data beforehand. The software programs and data stored in the ROM 202 and a storage section 213 are loaded into the RAM 203. Also data and so forth necessary for the CPU 201 to execute various processes are suitably stored into the RAM 203.

The CPU 201, ROM 202 and RAM 203 are connected to each other by the bus 204. Also an input/output interface 210 is connected to the bus 204.

An inputting section 211 including a keyboard, a mouse and so forth, an outputting section 212 including a display unit such as a CRT (Cathode Ray Tube) display apparatus or an LCD (Liquid Crystal Display) apparatus, a speaker and so forth, and a storage section 213 formed from a hard disk and so forth are connected to the input/output interface 210. Further, a telephone network communication section 214 formed from a modem or the like and configured to carry out sound communication or packet communication with a different apparatus through a network 131 including a public telephone network is connected to the input/output interface 210.

In addition to the telephone network communication section 214, a camera section 215 having a digital camera function of picking up an image of an image pickup object to obtain image data of the image pickup object and a wire communication section 216 for carrying out wire communication with the opposite party connected thereto by a wire cable of predetermined standards such as the USB are connected to the input/output interface 210. Also a Bluetooth communication section 217 having the Bluetooth communication function and an IC card section 218 having the IC card function and the reader/writer function are connected to the input/output interface 210.

The Bluetooth communication section 217 can acquire data read out from the ROM 202, RAM 203 or storage section 213 through the input/output interface 210 and supply the data to the opposite party of the Bluetooth communication. Further, the Bluetooth communication section 217 can supply data acquired from the opposite party of communication to the RAM 203, storage section 213 or the like through the input/output interface 210 so as to be retained.

The IC card section 218 has the reader/writer function as well as the IC card function and can carry out the very short distance radio communication with an IC card or an apparatus having the IC card function as well as with a reader/writer or an apparatus having the reader/writer function. The IC card section 218 has an internal storage section formed from a semiconductor memory or the like and can retain data and supply information to the opposite party of communication by the very short distance radio communication. Further, the IC card section 218 can acquire data read out from the ROM 202, RAM 203 or storage section 213 through the input/output interface 210 and supply the data to the opposite party of communication. Furthermore, the IC card section 218 can supply data acquired from the opposite party of communication to the RAM 203, storage section 213 or the like through the input/output interface 210 so as to be retained.

The telephone network communication section 214, camera section 215, wire communication section 216, Bluetooth communication section 217 and IC card section 218 may be formed as a communication section 231 which transfers playlists, music data, device information, user information and so froth. For the transfer of such data, an arbitrary method, that is, an arbitrary communication method, may be used, and a method different from the method described above may be used. In other words, the IC card section 218 may be configured including an additional component to the components 214 to 218 described above, or some or all of the components 214 to 218 may be omitted if communication is possible by some method.

A drive 219 is connected to the input/output interface 210 as occasion demands, and a removable medium 221 such as a magnetic disk, an optical disk, a magneto-optical disk or a semiconductor memory is suitably loaded into the drive 219 such that a computer program read out from the removable medium 221 is installed into the storage section 213 as occasion demands.

FIG. 3 shows an example of an internal configuration of the music selling server 142.

Referring to FIG. 3, the music selling server 142 shown includes a CPU 251 which executes various processes such as a supplying control process of music data and an accounting process in accordance with a program stored in a ROM 252 or a program loaded from a storage section 263 into a RAM 253. Also data and so forth necessary for the CPU 251 to execute various processes are suitably stored into the RAM 253.

The CPU 251, ROM 252 and RAM 253 are connected to each other by a bus 254. Also an input/output interface 260 is connected to the bus 254.

An inputting section 261 including a keyboard, a mouse and so forth, an outputting section 262 including a display unit such as a CRT display apparatus or an LCD apparatus, a speaker and so forth, a storage section 263 formed from a hard disk and so forth and a communication section 264 formed from a modem or the like are connected to the input/output interface 260. The communication section 264 carries out a communication process with a different apparatus through the network 131 including the Internet. For example, user information and so forth of a terminal apparatus which provides music data to be sold or a service are stored in the storage section 263. The communication section 264 receives a sales request for music data through the network 131 or transmits music data read out from the storage section 263.

Further, a drive 265 is connected to the input/output interface 260 as occasion demands, and a removable medium 271 such as a magnetic disk, an optical disk, a magneto-optical disk or a semiconductor memory is suitably loaded into the drive 265 such that a computer program read out from the removable medium 271 is installed into the storage section 263 as occasion demands.

Now, an outline of processes carried out by the portable telephone set 101 in the network system 100 shown in FIG. 1 is described. As described hereinabove, the portable telephone set 101 carries out exchange of playlists with a different apparatus. Exchange of playlists is described with reference to FIGS. 4A and 4B. In FIGS. 4A and 4B, music data are shared by two portable telephone sets having similar configurations and similar functions to each other like the portable telephone set 101 and the portable telephone set 102 described hereinabove.

As described hereinabove, exchange of playlists is carried out using the very short distance radio communication by the IC card function and the reader/writer function. In the following description, the portable telephone set on the side which uses the reader/writer function to establish a connection, that is, on the side which issues a request for exchange of playlists, is referred to as portable telephone set A. On the other hand, the portable telephone set on the side which uses the IC card function and to which the portable telephone set A is connected, that is, on the side which responds to the exchanging request of playlists, is hereinafter referred to as portable telephone set B.

Referring first to FIG. 4A, the portable telephone set A has stored therein in advance a playlist A belonging to the portable telephone set A itself and music data A of musical compositions corresponding to the playlist A. Similarly, the portable telephone set B has stored therein in advance a playlist B belonging to the portable telephone B itself and music data B of musical compositions corresponding to the playlist B.

The portable telephone set A on the side which requests for exchange of playlists is set to a polling mode in which it searches for a communication opposite party and is moved to approach the portable telephone set B as seen in FIG. 4B. When the portable telephone set A and the portable telephone set B approach each other into a region in which they can communicate with each other to establish a connection, exchange of playlists is carried out. In particular, the portable telephone set A supplies the playlist A to the portable telephone set B and acquires the playlist B from the portable telephone set B and stores and manages the playlist B in an associated relationship with the portable telephone set B. As a result, the portable telephone set A retains the playlist A retained from the beginning therein, the playlist B acquired newly, and the music data A corresponding to the playlist A.

On the contrary, the portable telephone set B supplies the playlist B to the portable telephone set A and acquires the playlist A from the portable telephone set A and then stores and manages the playlist A in an associated relationship with the portable telephone set A. As a result, the portable telephone set B retains the playlist B retained from the beginning therein, the playlist A acquired newly and the music data B corresponding to the playlist B.

In this manner, when a playlist which is information representative of characteristics of an individual user is to be exchanged, in order to avoid unintended exchange, such a communication method that the opposite party of communication can be indicated clearly such that apparatus which are to be communicated with each other are approached sufficiently as in the case of the very short distance radio communication described hereinabove is preferably used.

It is to be noted that usually the antenna of the IC card section 218 utilized for the very short distance radio communication is provided in the inside of a housing of the portable telephone set but is not exposed to the outer face of the housing. Accordingly, since such IC card sections 218 of different apparatus do not contact with each other at all, upon exchange of playlists, the apparatus may be contacted with each other, which is similar to making the apparatus approach each other.

After the playlists are exchanged as seen in FIG. 4B, the portable telephone set 101 can use the playlist of the opposite party of the exchange to carry out streaming reproduction of the music data stored in the apparatus of the opposite party of the exchange or purchase music data form the music selling server 142.

FIG. 5 illustrates an outline of processes executed by the portable telephone sets between which the playlists have been exchanged. Referring to FIG. 5, the portable telephone set A having exchanged the playlists with the portable telephone set B can make use of the Bluetooth communication function to carry out Bluetooth communication with the portable telephone set B to streaming reproduce the music data stored by the portable telephone set A and the portable telephone set B. In particular, the portable telephone set A selects an arbitrary musical composition from within the music data stored in the portable telephone set B and issues a request for reproduction of the musical composition. The portable telephone set B transmits the music data of the requested musical composition as streaming data to the portable telephone set A. The portable telephone set A acquires the streaming data and carries out a reproduction process sequentially to output sound of the streaming data from the speaker. In this manner, where the portable telephone set B is positioned within the range within which Bluetooth communication is possible, the portable telephone set A can use the playlist acquired from the portable telephone set B to issue a request for streaming reproduction to the portable telephone set B.

It is to be noted that also it is possible conversely for the portable telephone set B to acquire a musical composition stored in the portable telephone set A as streaming data and sequentially carry out a reproduction process to output sound of the musical composition from the speaker.

For such sharing of music data as described above, each of the users of the portable telephone set A and the portable telephone set B would carry out selection of a musical composition to be reproduced using the playlist acquired from the opposite party and displayed on a GUI. It is to be noted that the sharing of musical data by different apparatus is restricted within the range within which Bluetooth communication is possible in order that such sharing may not be carried out among an unspecified large number of apparatus. In other words, the sharing is restricted based on a distance condition. Where the portable telephone set A and the portable telephone set B are not positioned within the range within which Bluetooth communication is possible, since the Bluetooth communication between the apparatus is impossible, the playlist of the opposite party of exchange is displayed in gray, and the musical compositions of the playlist are set to inhibition of reproduction.

However, since a playlist is used also for purchase of a musical composition or music data, also selection of the musical compositions in the gray display is permitted. For example, the user of the portable telephone set A would use the playlist B acquired from the portable telephone set B to select a desired musical composition from among the musical compositions included in the playlist B and issue a request to sell music data of the musical composition, that is, the music data included in the music data B, to the music selling server 142, that is, issue a purchase proposal. The music selling server 142 carries out an accounting process based on the purchase proposal and transmits music data of the requested musical composition to the portable telephone set A. The portable telephone set A receives the music data and stores the music data as music data belonging to the portable telephone set A itself. Further, the portable telephone set A updates the playlist A belonging to the portable telephone set A itself and issues a notification to the portable telephone set B that the music data is purchased. The portable telephone set B carries out, based on the notification, a process of updating the playlist A acquired from the portable telephone set A and so forth.

It is to be noted that also the portable telephone set B can acquire or purchase a musical composition whose music data is stored in the portable telephone set A from the music selling server 142.

It is to be noted that purchase of a musical composition from the music selling server 142 is carried out using the telephone network communication section 214, that is, by packet communication through the network 131. Although actually the packet communication may possibly be disabled, since there is no reason to intentionally limit communication between the portable telephone set 101 and the music selling server 142, the following description is given on the assumption that a state wherein communication is impossible does not occur, or in other words, the portable telephone set 101 can always communicate with the music selling server 142.

In this manner, the portable telephone set 101 as a terminal apparatus can exchange playlists in which information of musical compositions is included with a different apparatus. In other words, the portable telephone set 101 can readily collect information collected or produced by a different apparatus by such exchange of playlists. Generally, there is a limit to the information gathering capacity of an individual, and even if one user collects data or produces a playlist, the information amount does not increase readily. However, by exchanging playlists with a different user as described above, the information amount can be increased readily. In other words, the user of each terminal apparatus can readily acquire information of musical compositions provided by the music selling server 142. Consequently, the user of each terminal apparatus increases knowledge thereof regarding musical compositions provided by the music selling server 142, and such decline in the desire for utilization arising from obscurity regarding services provided by the music selling server 142 that the services are not utilized because it is not known what is provided can be suppressed.

It is to be noted that, although the music selling server 142 may not necessarily sell all music data of musical compositions included in the playlist, it is possible to motivate the user to be at least interested in music data through the playlist and confirm from the music selling server 142 whether or not some music data is actually sold. In other words, increase of opportunities of service utilization can be anticipated.

Further, when a user collects or produces a playlist, the liking of the user is reflected on the playlist. Further, since also information sources are restrictive, usually the possibility is high that one-sidedness may appear with the genre and so forth of the substance, that is, musical compositions, of the playlist. By exchanging playlists in such a manner as described above, the one-sidedness of the liking or information sources is reduced and the possibility increases that the user can acquire information which has not been known to the user and could not have been obtained. In other words, it becomes possible for the user to obtain more various information, and the user may become interested newly in various musical compositions and it can be anticipated that the desire for utilization of a service of the music selling server 142 is enhanced.

It is to be noted that, at this time, since the exchange of playlists is restricted by a distance condition (the very short distance radio communication), the opposite party of the exchange is not an unspecified large number of other users but is limited to known people such as friends or families. Usually, the liking of a known person is known frequently. Accordingly, by taking the liking into consideration, the playlist of the friend can be obtained as more certain and useful information.

For example, even if a user exchanges playlists with a strange user, since the user does not known the liking of the strange user, it is not sure whether or not the playlist of the strange user includes those musical compositions which are valuable to the user itself, and there is the possibility that the exchanging operation may possibly become wasteful. From such a feeling of reluctance, there is the possibility also that the desire for exchange of playlists may decline.

Further, where the liking of the opposite party of exchange is unknown, there is the possibility also that it may be obscure what is meant by musical compositions included in the playlist of the opposite party of exchange. For example, although musical compositions are included in the same playlist, the reason of acquisition or the value to the user is different like musical compositions acquired due to their popularity, musical compositions acquired because they are actually favorite to the user, musical compositions which were acquired but do not interest the user very much, musical compositions in which the user was interested in the past or musical compositions in which the user is interested at present. Although information which is not included in the playlist in this manner may be used as a reference for the decision of whether or not a music composition is useful to the user, where the opposite party of exchange is a strange user, it is difficult to acquire such reference information.

In contrast, where the opposite party of exchange is a known person, then since the user in most cases knows the liking of the opposite party of exchange and can confirm necessary information, the user can easily grasp such information which is not included in the playlist as described above. Consequently, the user can easily grasp whether or not musical compositions included in the playlist acquired by exchange are useful to the user itself.

Further, since music data can be shared readily using exchanged playlists, the user can easily confirm what musical compositions the musical compositions included in the playlist acquired by the exchange actually are. In other words, sharing of music data provides an effect similar to that of an audition service. Consequently, the user can select a new musical composition readily and can utilize a service provided by the music selling server 142 readily and more usefully.

Exchange of playlists makes propagation of information between users possible as described above. Consequently, an advertising effect similar to that by word-of-mouth communication can be obtained, and the desire for utilization of a service provided by the music selling server 142 can be enhanced.

Further, the user can purchase a musical composition readily using the playlist acquired by exchange. Consequently, the user can acquire an object musical composition readily without carrying out such complicated operation as to select the object musical composition from among a very great number of musical compositions provided by the music selling server 142. In other words, the music selling server 142 can provide appropriate information readily.

A more particular configuration for implementing such processes as described above is described below.

Figure 6:
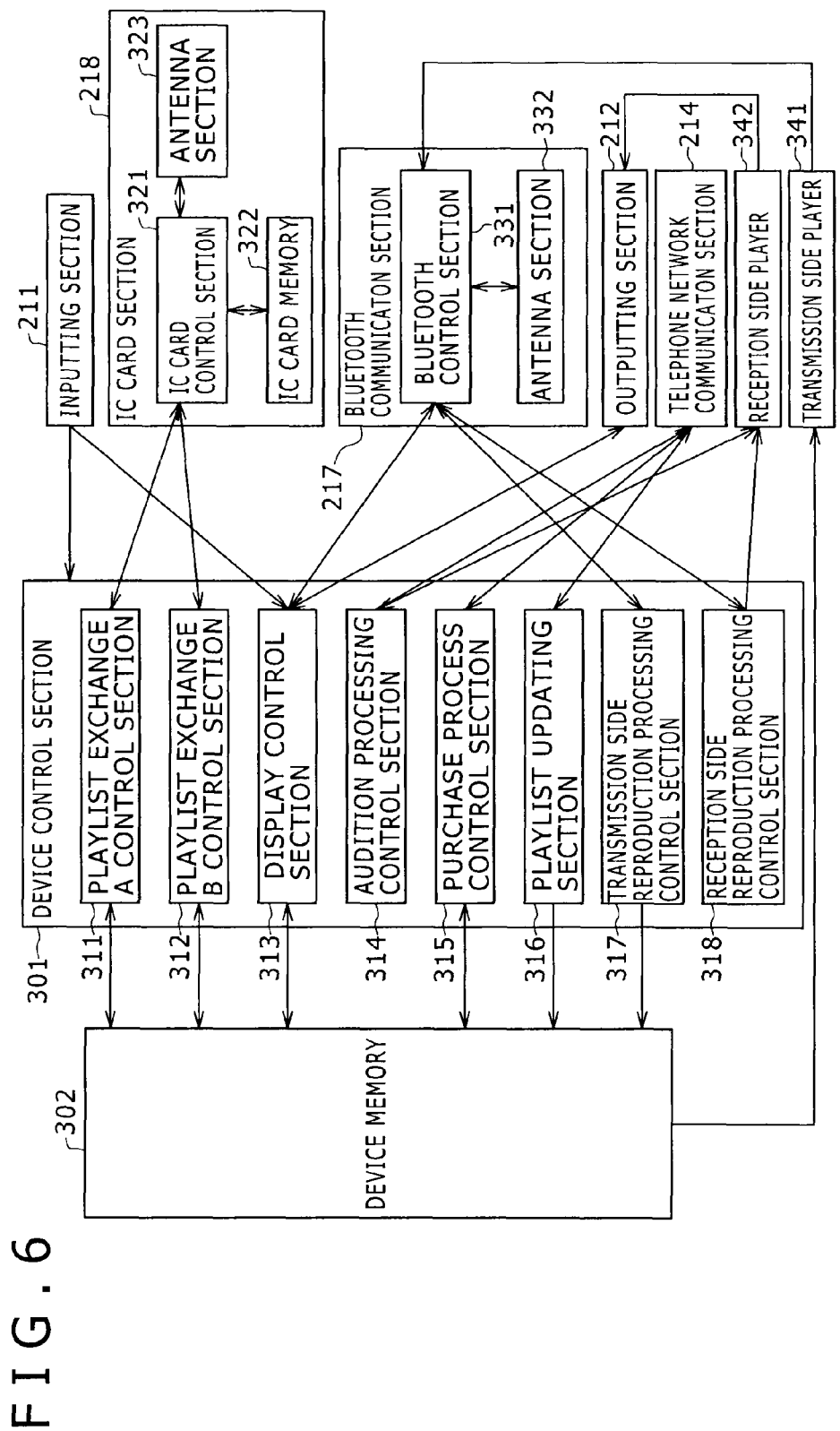
FIG. 6 is a functional block diagram showing an example of functional blocks which the portable telephone set has.

FIG. 6 shows an example of a configuration of functional blocks provided in the portable telephone set 101 for implementing such exchange of playlists and sharing of music data as described above.

Referring to FIG. 6, the portable telephone set 101 includes a device control section 301 for controlling the entire portable telephone set 101. The device control section 301 is a block implemented by the CPU 201, ROM 202, RAM 203, bus 204 and so forth shown in FIG. 2. The device control section 301 includes a playlist exchange A control section 311, a playlist exchange B control section 312, a display control section 313, and an audition processing control section 314. The device control section 301 further includes a purchase processing control section 315, a playlist updating section 316, a transmission side reproduction processing control section 317, and a reception side reproduction processing control section 318.

The playlist exchange A control section 311 is a control section on the side which issues a request for exchange of playlists, that is, which controls processes relating to playlist exchange of the portable telephone set A in the example of FIGS. 4A and 4B. The playlist exchange B control section 312 is a control section on the side which receives a request for exchange of playlists, that is, which controls processes relating to playlist exchange of the portable telephone set B in the example of FIGS. 4A and 4B. The display control section 313 is a control section which controls display of, for example, playlists and so forth. The audition processing control section 314 is a control section for controlling processes for receiving an audition service provided by the music selling server 142. The purchase processing control section 315 is a control section which controls processes for purchasing music data provided by the music selling server 142. The playlist updating section 316 is a processing section which carries out processes of reflecting, when a different apparatus by which a playlist has been exchanged purchases music data from the music selling server 142, this fact on the playlist. The transmission side reproduction processing control section 317 is a processing section which controls a transmission side reproduction process of streaming reproducing music data in accordance with a request from a different apparatus. The reception side reproduction processing control section 318 is a control section which controls a reception side reproduction process of receiving and reproducing streaming data transmitted thereto from a different apparatus to output sound.

Further, the portable telephone set 101 has a device memory 302 as a storage area thereof. The device memory 302 is a functional block implemented by the RAM 203 and/or the storage section 213 described hereinabove with reference to FIG. 2. The device memory 302 has a storage area separate from the storage area of the IC card function and having a storage capacity greater than the memory capacity of the IC card section 218. The device memory 302 stores a large amount of data including a playlist, music data and so forth.

Further, the portable telephone set 101 has, as the IC card section 218, an IC card control section 321, an IC card memory 322 and an antenna section 323. The IC card control section 321 carries out control processes for implementing the IC card function. The IC card memory 322 is a storage area for implementing the data retaining function by the IC card function. The antenna section 323 is an antenna for transmitting and receiving a signal in the very short distance radio communication by the IC card function. The antenna section 323 transmits information supplied from the IC card control section 321, and receives information supplied thereto from the outside by the very short distance radio communication and supplies the received information to the IC card control section 321.

Further, the portable telephone set 101 has, as the Bluetooth communication section 217, a Bluetooth control section 331 and an antenna section 332. The Bluetooth control section 331 carries out control processes relating to Bluetooth communication. The antenna section 332 is an antenna for transmitting and receiving a signal in the Bluetooth communication.

The portable telephone set 101 further has a transmission side player 341 and a reception side player 342. The transmission side player 341 streaming reproduces music data and outputs streaming data. The reception side player 342 reproduces streaming data and outputs a sound signal.

The device control section 301 executes various processes in accordance with a user instruction inputted from the inputting section 211. The playlist exchange A control section 311 of the device control section 301 controls the IC card control section 321 to execute the very short distance radio communication so that processes of the portable telephone set A relating to playlist exchange are executed. Meanwhile, the playlist exchange A control section 311 reads out data stored in the device memory 302 and supplies the data to the IC card control section 321 such that the data is transmitted by the very short distance radio communication. Further, the playlist exchange A control section 311 acquires data received by the very short distance radio communication by the IC card control section 321 and stores the data into the device memory 302.

The playlist exchange B control section 312 controls the IC card control section 321 to execute the very short distance radio communication to execute processes as those of the portable telephone set B relating to playlist exchange. Further, the playlist exchange B control section 312 reads out data stored in the device memory 302 and supplies the data to the IC card control section 321 such that the data is transmitted by the very short distance radio communication. Further, the playlist exchange B control section 312 acquires data received by the very short distance radio communication by the IC card control section 321 and stores the data into the device memory 302.

The display control section 313 controls image display by a monitor included in the outputting section 212. For example, the display control section 313 reads out a playlist stored in the device memory 302 and supplies the playlist to the outputting section 212 such that an image of the playlist is displayed as a GUI on the monitor. Further, the display control section 313 controls the inputting section 211 to accept a user instruction inputted in response to the display on the monitor.

The audition processing control section 314 controls the telephone network communication section 214 to acquire streaming data for audition from the music selling server 142 through the network 131 and controls the reception side player 342 to reproduce the streaming data for audition so as to be outputted from the outputting section 212.

The purchase processing control section 315 controls the telephone network communication section 214 to issue a proposal for purchase of a music composition to the music selling server 142 through the network 131 and receive music data of the requested music composition and controls the device memory 302 to store the received music data. Further, the purchase processing control section 315 updates the playlist stored in the device memory 302 and belonging to the purchase processing control section 315 itself so that the purchase of the musical composition is reflected on the playlist. Furthermore, the purchase processing control section 315 controls the telephone network communication section 214 to issue a notification of the purchase of the musical composition to an apparatus of the opposite party of exchange of playlists through the network 131.

The playlist updating section 316 controls the telephone network communication section 214 to receive a notification of purchase of a musical composition supplied thereto from a different apparatus through the network 131 and causes the purchase of the musical composition to be reflected on the playlist stored in the device memory 302 and belonging to the different apparatus based on the notification.

The transmission side reproduction processing control section 317 reads out, in accordance with a request for reproduction received through the Bluetooth control section 331, requested music data or musical composition from the device memory 302 and controls the transmission side player 341 to produce streaming data. The transmission side reproduction processing control section 317 supplies the streaming data to the Bluetooth control section 331 so as to be transmitted to the source of the request.

If the user selects a musical composition belonging to a different device from within a playlist of the different device, then the reception side reproduction processing control section 318 controls the Bluetooth control section 331 to transmit a reproduction request. When the Bluetooth communication section 217 receives streaming data transmitted in response to the reproduction request, the reception side reproduction processing control section 318 acquires the streaming data from the Bluetooth control section 331 and controls the reception side player 342 to reproduce the streaming data so that sound is outputted from the speaker of the outputting section 212.

Now, data to be stored in the portable telephone set 101 are described. FIG. 7 illustrates an example of a configuration of data to be stored in the portable telephone set 101.

The portable telephone set 101 stores various data into two storage regions of the IC card memory 322 and the device memory 302. The device control section 301 accesses a common region of the IC card memory 322 through IC card software 351 to carry out reading out or writing of data from or into the common region of the IC card memory 322. Further, the device control section 301 accesses the device memory 302 through a device application program interface (API) 352 to carry out reading out or writing of data from or into the device memory 302. The IC card software 351 and the device API 352 individually function as interfaces of the IC card memory 322 and the device memory 302, respectively. By utilizing such IC card software 351 or device API 352 to access the IC card memory 322 or device memory 302, development of the device control section 301 is facilitated.

In the following description, description of the IC card software 351 and the device API 352 is omitted for the convenience of description.

The IC card memory 322 can store only a small amount of data therein. In the common region of the IC card memory 322, for example, IC card production information 361, device setting information 362 and log information 363 are stored. The IC card production information 361 is identification information for identification of the IC card control section 321 allocated upon production to the IC card control section 321. Where the portable telephone set 101 has one IC card function (IC card section 218), the IC card production information 361 can be utilized also as information for identification of the portable telephone set 101.

The device setting information 362 is information regarding the portable telephone set 101 as a device in which the IC card section 218 is provided. The device setting information 362 includes apparatus information 371 which relates to the portable telephone set 101 such as a function, a performance and so forth which the portable telephone set 101 has, and user information 372 which is basic information regarding the user of the portable telephone set 101.

The log information 363 is history information of the communication process or the reproduction process. The log information 363 includes a high touch log 373 which is history information of the very short distance radio communication by the IC card section 218 and an immediately preceding reproduction log 374 which information relating to a preceding reproduction process.

The device memory 302 can store an amount of data greater than that of the IC card memory 322. The device memory 302 stores, for example, user addition information 381, playlist information 382 and a user list 383.

The user addition information 381 is further detailed information regarding the user of the portable telephone set 101. The user addition information 381 includes user information A 391 and user information B 392 classified in level so that the range of disclosure of information can be set stepwise.

The playlist information 382 is information relating to music data as described hereinabove. The playlist information 382 includes a device ID 393 which is information for specifying a device in which music data corresponding to the playlist are stored, and a product number list 394 which is a list of product numbers which are identification information of music data. The product numbers included in the product number list 394 are information by which at least music data can be identified in the device in which the music data are stored.

The user list 383 is a list of user information of users with whom playlists are exchanged. Accordingly, the user list 383 includes information for each user of a user ID 395, an icon number (icon No.) 396, a handle name 397, a greeting sentence 398 and so forth.

Further, the device memory 302 stores, for each product number, that is, for each musical composition, included in the product number list 394 of the playlist information 382, also music information 401 which is information regarding the musical composition. The music information 401 includes a product number 411 for the identification of the musical composition, a title 412 of the musical composition, a package ID 413 to which the musical composition belongs and a sound source purchase destination URL 414 indicative of the URL of a site (for example, the music selling server 142) from which music data or a sound source of the musical composition is sold. The product number 411 is same as the product number included in the product number list 394. In particular, the product numbers of the product number list 394 and the music information 401 are associated with each other by the product number 411. It is to be noted that the product numbers 411 and the product numbers included in the product number list 394 need not necessarily be same as each other only if a corresponding relationship between the product number list 394 and the music information 401 is indicated. The title 412 is information representative of the name of the musical composition, that is, the title of the musical composition. The package ID 413 is information for the identification of a package which is a unit of a work formed from one or a plurality of musical compositions. For example, a plurality of musical compositions are sold or transferred collectively. As a unit in management in this instance, a package which includes a plurality of musical compositions is used. The sound source purchase destination URL 414 is information indicative of the URL of a site from which the music data of the musical composition was acquired. For example, the URL of the connection destination or accessing destination of the music selling server 142 is indicated by the sound source purchase destination URL 414. It is to be noted that, while it is described here that the sound source purchase destination URL 414 indicates a URL, any information may be indicated by the sound source purchase destination URL 414 if it indicates the source of the music data including a site or the like, or in other words, any information corresponding to a URL may be indicated. In particular, information of the connection destination for acquiring music data, that is, access information, is indicated by the sound source purchase destination URL 414. Or, a plurality of URLs or information corresponding to URLs may be registered as the sound source purchase destination URL 414. Thereupon, the URLs or the information corresponding to the URLs may include not only a site or place from which music data can be acquired but also some other site or place relating to the music data such as a homepage of an artist or other music information providing site.

Further, the device memory 302 stores also package information 421 which is information relating to the package represented by the package ID 413 of the music information 401. The package information 421 includes a package product number 431, a package name 432, a package kana name 433, and a jacket URL 434. The package product number 431 is same as the package ID 413 and associates the package information 421 and the music information 401 with each other. It is to be noted that the package product number 431 need not necessarily be same as the package ID 413 only if it indicates a corresponding relationship with the package ID 413 to which the package information 421 corresponds.

The package name 432 and the package kana name 433 are information regarding the name allocated to the package for facilitating identification of the package by the user. The jacket URL 434 is information indicative of a data providing source of an image or jacket allocated to the jacket. It is to be noted that the jacket URL 434 may be any information only if it provides a providing source of the data of the jacket and may be information other than a URL.

The data are described in more detail with reference to FIGS. 8 to 12. FIG. 8 illustrates an example of data included in the device setting information 362.

Referring to FIG. 8, the apparatus information 371 is formed from information of 192 bytes in the maximum. The apparatus information 371 may be any information if it relates to a terminal apparatus, that is, relates to the portable telephone set 101, such as identification information or information relating to a function. The user information 372 is information regarding the user of the portable telephone set 101 and includes an information disclosure level, a disclosure icon, a handle name, a greeting sentence and so forth. The information disclosure level is setting information representative of to which degree information relating to the user or the portable telephone set 101 may be disclosed to a different user or device. For example, the information disclosure level designates whether or not a playlist should be exchanged or designates which information should be disclosed such as the apparatus information 371 or the user information 372. The information disclosure level is set, for example, in accordance with a user information inputted through a GUI or the like.

The disclosure icon is information for setting an image or an icon representative of the user. This icon may be determined selectively from among images prepared in advance, or an image prepared by the user or the like may be used as the icon. An image designated by the disclosure icon is disclosed as an icon representative of the user, that is, is provided to a different device upon playlist exchange. The handle name is a name representative of the user and can be set arbitrarily by the user. The greeting sentence is a message, for example, for the self introduction and can be set arbitrarily by the user itself.

Naturally, the device setting information 362 may include information different from the information described hereinabove.

FIG. 9 illustrates an example of data included in the user addition information 381. Referring to FIG. 9, the user information A 391 of the user addition information 381 is information to be disclosed to a greater number of other users than those users to which user information B 392 may be disclosed from within the user addition information 381 or information which is to be disclosed to an arbitrary other user. The user information A 391 includes the sex, blood type, birthday, constellation and so forth of the user. The user information B 392 is information which may be disclosed only to a particular user or users from within the user addition information 381 or information which should not be disclosed to any other user. The user information B 392 includes information from which the individual user can be specified, that is, information of comparatively high personality, such as the name, kana name, telephone number, mail address, telephone number, URL, RSS (Rich Site Summary) and so forth of the user.

FIG. 10 illustrates an example of data included in the playlist information 382. Referring to FIG. 10, the device ID 393 is formed, for example, from 16 alphanumeric letters obtained by ASCII conversion of 8 bytes of an apparatus ID allocated to the device. The product number list 394 is formed from the product numbers of different musical compositions.

FIG. 11 illustrates an example of data included in the music information 401. Referring to FIG. 11, the music information 401 includes the product number 411, title 412, package ID 413 and sound source purchase destination URL 414 described hereinabove. The music information 401 may further include information of, for example, a kana title representing the title of the musical composition in kana, an artist name representative of the name of a player of the musical composition, an artist kana name representing the artist name in kana, a genre name representative of a type or genre of the musical composition, musical composition time representative of reproduction time of the musical composition, an expanded URL indicative of a URL such as an RSS by which detailed description of the musical component is presented, a reproduction time number representative of the number of times by which the musical composition has been reproduced and so forth. Naturally, the music information 401 may further include any other information.

FIG. 12 illustrates an example of data included in the package information 421. Referring to FIG. 12, the package information 421 may include information of the sales starting day of the package in addition to the package ID 431 (package product number 431), package name 432, package kana name 433 and jacket URL 434. Naturally, the package information 421 may further include any other information.

Figure 13:
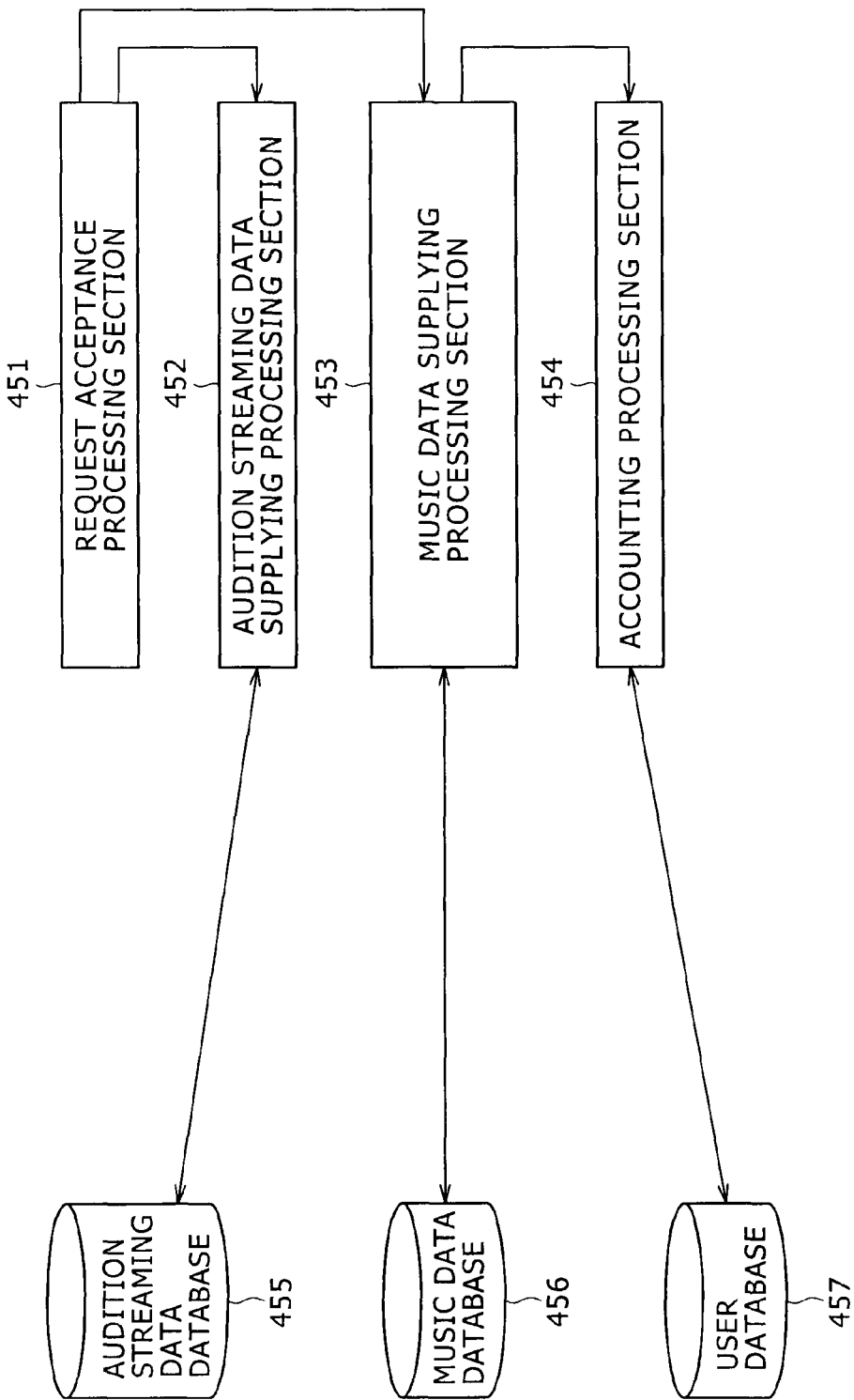
FIG. 13 is a functional block diagram showing an example of functional blocks which the music selling server has.

Now, the music selling server 142 is described. FIG. 13 illustrates functions of the music selling server 142. Referring to FIG. 13, the music selling server 142 includes a request acceptance processing section 451, a audition streaming data supplying processing section 452, a music data supplying processing section 453, an accounting processing section 454, an audition streaming data database 455, a music data database 456 and a user database 457.

The request acceptance processing section 451 is composed of several processing sections including, for example, the CPU 251 and the communication section 264 shown in FIG. 3. The request acceptance processing section 451 accepts a provision request, an audition request or the like for a musical composition or music data supplied thereto from a terminal apparatus such as the portable telephone set 101. The request acceptance processing section 451 causes, based on an accepted request, the audition streaming data supplying processing section 452 to execute processing if it is requested to allow the audition of a musical composition, but causes the music data supplying processing section 453 to execute processing if it is requested to provide a music composition for purchase.

The audition streaming data supplying processing section 452 is composed of, for example, the CPU 251, RAM 253, communication section 264 and so forth shown in FIG. 3. If the request acceptance processing section 451 accepts an audition request from a terminal apparatus, then the audition streaming data supplying processing section 452 accesses the audition streaming data database 455 to supply audition streaming data of the requested musical composition. The audition streaming data supplying processing section 452 acquires and supplies the audition streaming data to the terminal apparatus which is a source of the request.

The music data supplying processing section 453 is composed of, for example, the CPU 251, RAM 253, communication section 264 and so forth shown in FIG. 3. If the request acceptance processing section 451 accepts a request for provision of a musical piece from a terminal apparatus, then the music data supplying processing section 453 accesses the music data database 456 to supply music data of the requested musical composition. The music data supplying processing section 453 acquires and supplies the music data to the terminal apparatus of the source of the request for the music data. Further, the music data supplying processing section 453 controls the accounting processing section 454 to carry out an accounting process relating to the sales of the music data. The accounting processing section 454 is composed of, for example, the CPU 251, RAM 253, communication section 264 and so forth shown in FIG. 3. The accounting processing section 454 accesses the user database 457 to acquire user information registered in advance in the user database 457 and carries out an accounting process for the user of the terminal apparatus to which the music data is sold.

The audition streaming data database 455 is composed of, for example, the storage section 263 and so forth shown in FIG. 3. The audition streaming data database 455 is a database in which audition streaming data which are streaming data for audition corresponding to musical compositions of the music data for sales are registered in advance in the music data database 456.

The music data database 456 is composed of, for example, the storage section 263 and so forth shown in FIG. 3 and is a database in which music data for sales are registered in advance. The user database 457 is composed of, for example, the storage section 263 and so forth shown in FIG. 3 and is a database in which user information which is information regarding the users of the terminal apparatus to which the sales service is to be provided is registered in advance.

Figure 14:
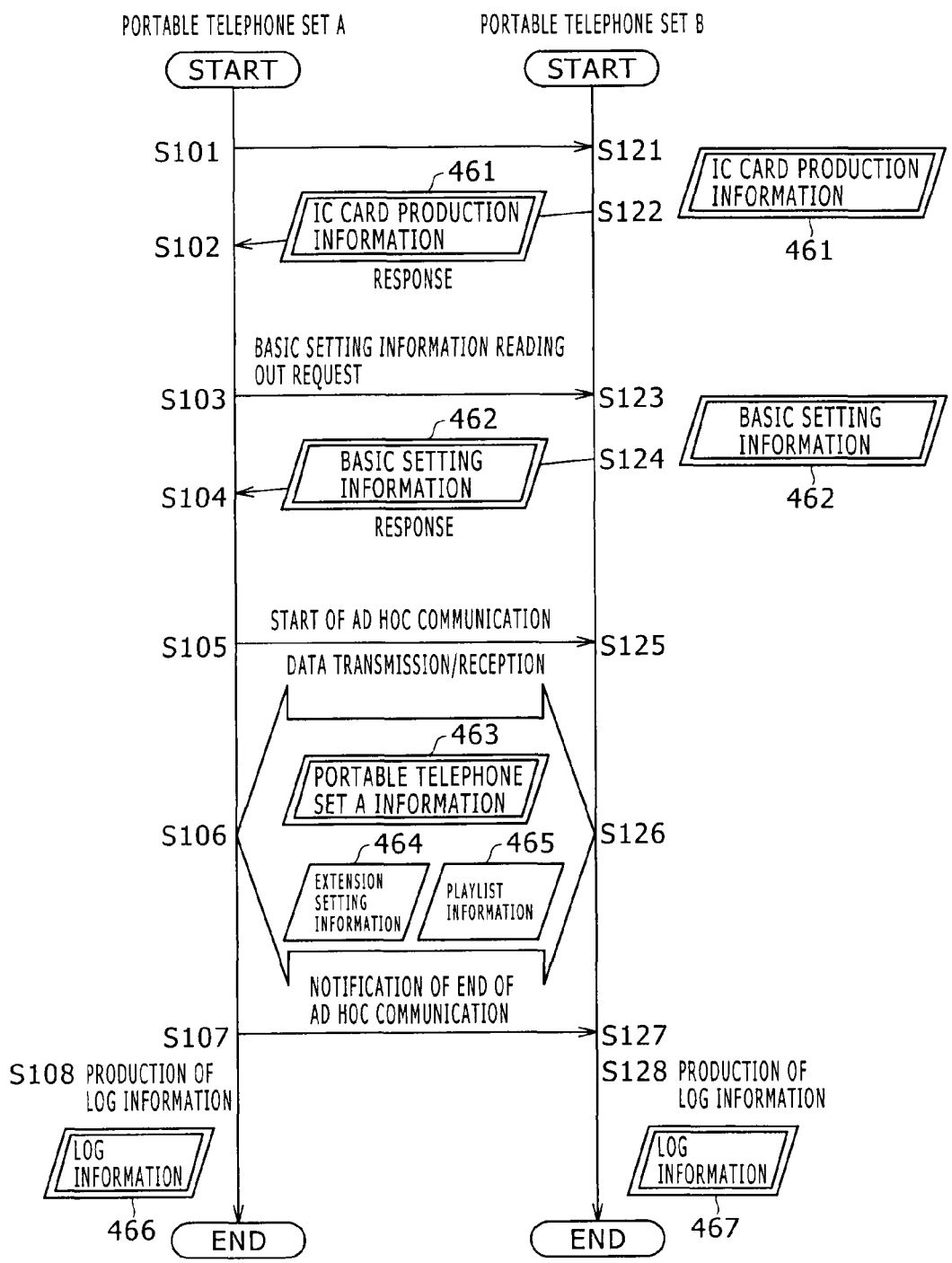
FIG. 14 is a flow chart illustrating an outline of playlist exchange.

Now, a flow of processes relating to exchange of playlists and sales of music data by the portable telephone set 101 having such a configuration as described above is described. First, an outline of exchange of playlists is described with reference to a flow chart of FIG. 14. FIG. 14 illustrates an outline of exchange of playlists carried out by the portable telephone set A and the portable telephone set B as in the example described hereinabove with reference to FIGS. 4A and 4B.

Figure 15:
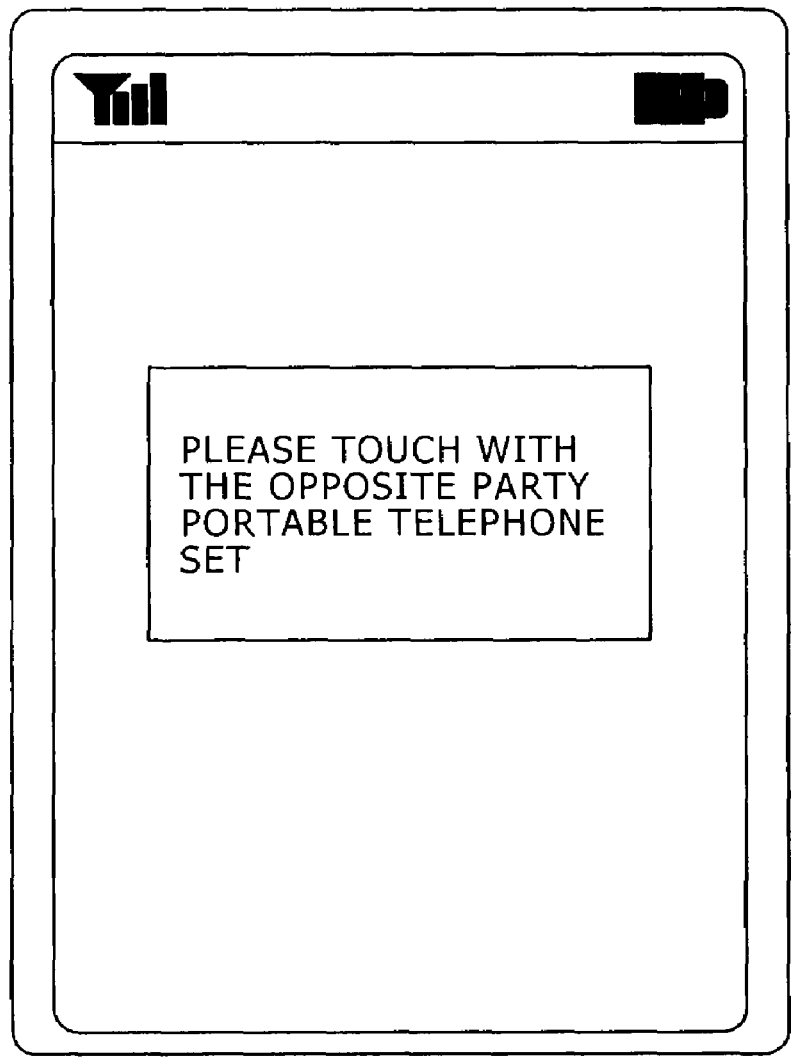
FIGS. 15, 16, 17 and 18 are schematic views illustrating different examples of a display screen.

If the user carries out an operation for instruction to carry out exchange of playlists, then the portable telephone set A places, at step S101, the operation mode of the IC card section 218 into a polling mode so that a polling signal is outputted by the very short distance radio communication carried out by the IC card section 218 to pick up a different IC card which exists within a communication range. Simultaneously, the portable telephone set A causes the monitor thereof to display a message for urging the user to move the portable telephone set A itself toward the portable telephone set B, which will become the opposite party of exchange of playlist, such as "Please touch with the opposite party portable telephone set" as seen in FIG. 15.

If the portable telephone set A approaches the portable telephone set B sufficiently and the portable telephone set B receives the polling signal at step S121, then the portable telephone set B transmits, at step S122, IC card production information 461 for the identification of the IC card section 218 of the portable telephone set B, or the portable telephone set B itself which has the IC card function, to the portable telephone set A by the very short distance radio communication carried out by the IC card section 218 in response to the polling signal.

The IC card production information 461 is stored in the IC card memory 322. In short, the IC card production information 461 is equivalent to the IC card production information 361 illustrated in FIG. 7.

The portable telephone set A receives the response from the portable telephone set B, that is, the IC card production information 461 of the portable telephone set B at step S102. After the IC card production information 461 is received, the portable telephone set A transmits, at step S103, a basic setting information reading out request to the portable telephone set B by the very short distance radio communication carried out by the IC card section 218. The portable telephone set B receives the request at step S123 and transmits basic setting information 462 of the portable telephone set B to the portable telephone set A by the very short distance radio communication carried out by the IC card section 218 at step S124.

The basic setting information 462 is basic setting information stored in the IC card memory 322 and necessary for communication by a connection system called ad hoc connection of the very short distance radio communication (such communication is hereinafter referred to as ad hoc communication) and exchange of playlists. In short, the basic setting information 462 is equivalent to the device setting information 362 illustrated in FIG. 7 and includes the apparatus information 371, user information 372 and so forth as seen in FIG. 8.

The portable telephone set A receives the response from the portable telephone set B, that is, the basic setting information 462 of the portable telephone set B at step S104. After the basic setting information 462 is received, the portable telephone set A issues a request to start ad hoc communication to the portable telephone set B at step S105. When the portable telephone set B receives the request and acknowledges the connection at step S125, ad hoc communication is established and transfer of data is started. The portable telephone set A and the portable telephone set B carry out transmission and reception of data to and from the other parties at steps S106 and S126, respectively.

For example, the portable telephone set A transmits portable telephone set A information 463 including the IC card production information 461 and the basic setting information 462 of the portable telephone set A to the portable telephone set B. Further, the portable telephone set A and the portable telephone set B exchange, for example, extension setting information 464 and playlist information 465 thereof with each other. The extension setting information 464 is setting information stored in the device memory 302 and extended as occasion demands. In short, the extension setting information 464 is equivalent to the user addition information 381 illustrated in FIG. 7. Meanwhile, the playlist information 465 is information stored in the device memory 302 for designating a musical composition. In short, the playlist information 465 is equivalent to the playlist information 382 illustrated in FIG. 7.

Figure 16:
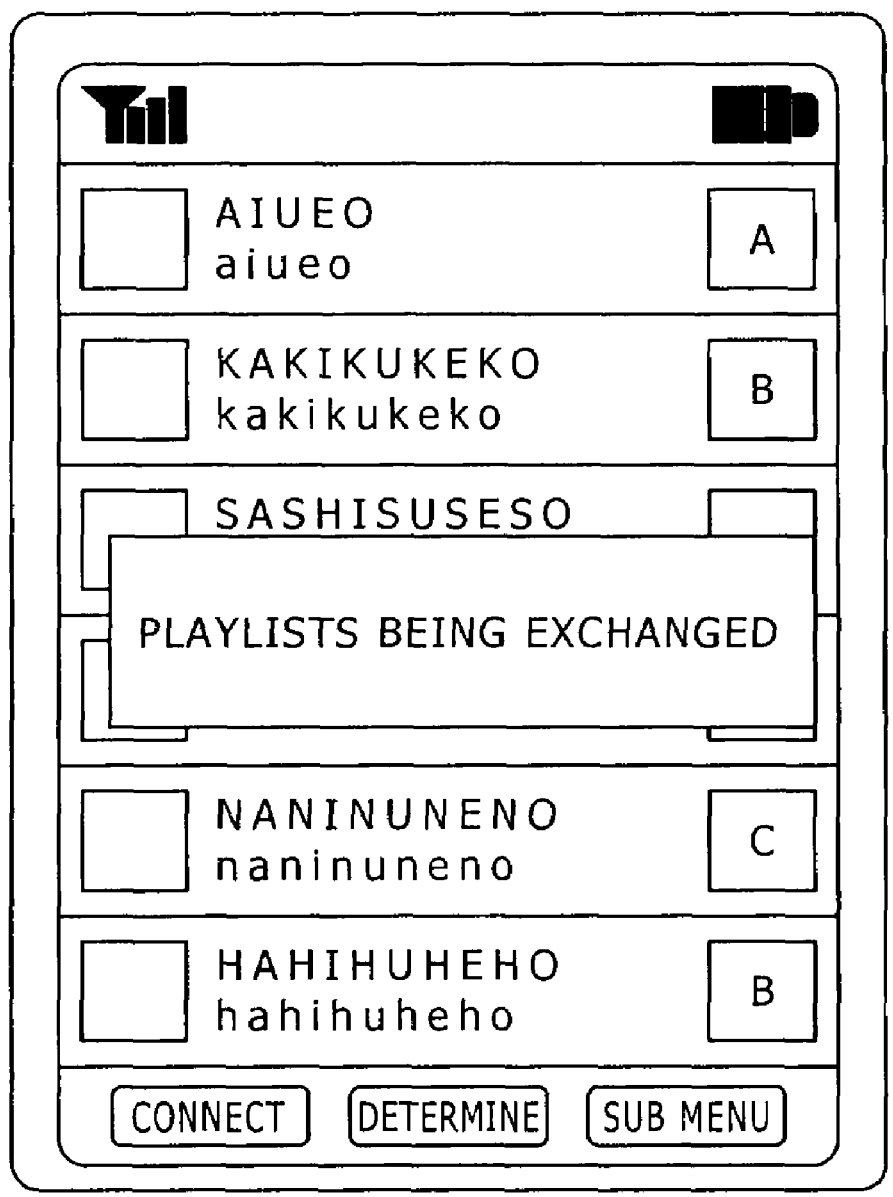
Figure 17:
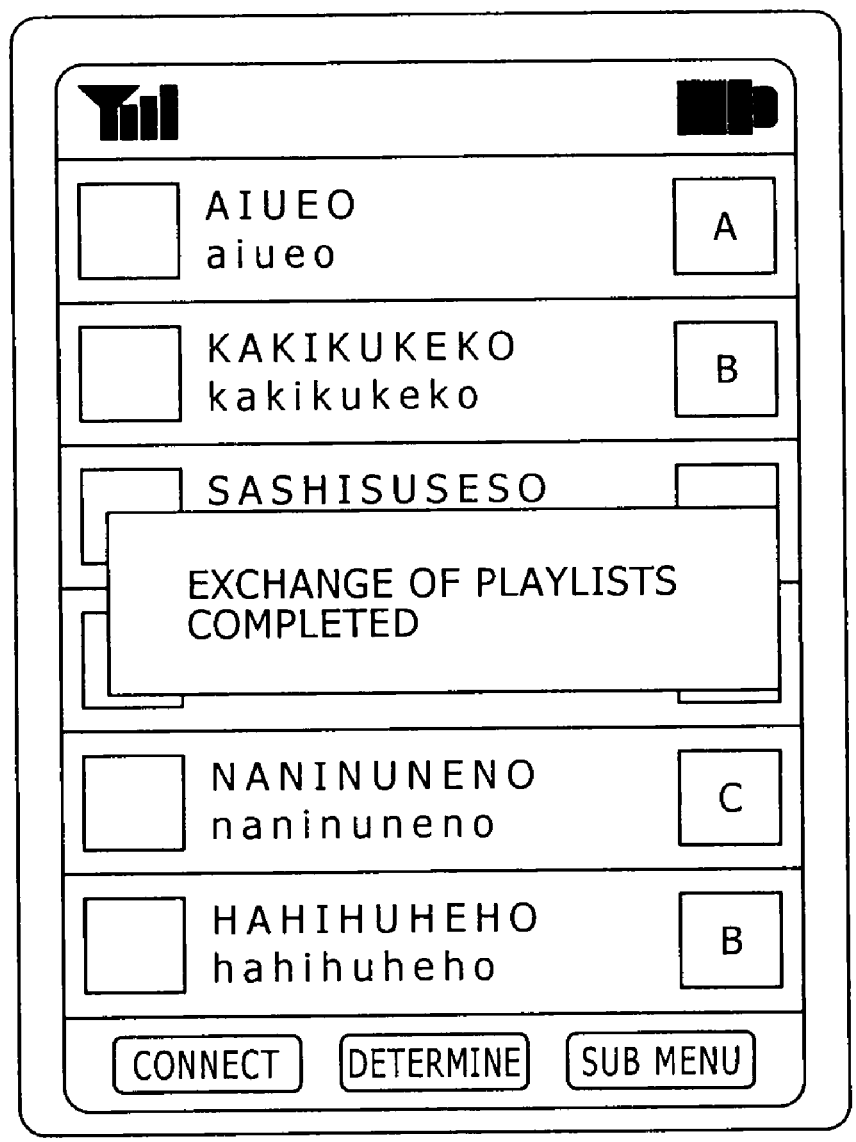

While the ad hoc communication is being carried out, such a message "Playlists being exchanged" representing that the communication is proceeding as seen in FIG. 16 is displayed on the monitor of the portable telephone set A. Then, when the exchange of playlists is completed, such a message "Exchange of playlists completed" representing that the exchange of playlists is completed as seen in FIG. 17 is displayed on the monitor of the portable telephone set A.

After the exchange of playlists is completed as described above, the portable telephone set A issues a notification of the completion of ad hoc information to the portable telephone set B at step S107. The portable telephone set B receives the notification at step S127. The ad hoc communication is ended therewith.

Figure 18:
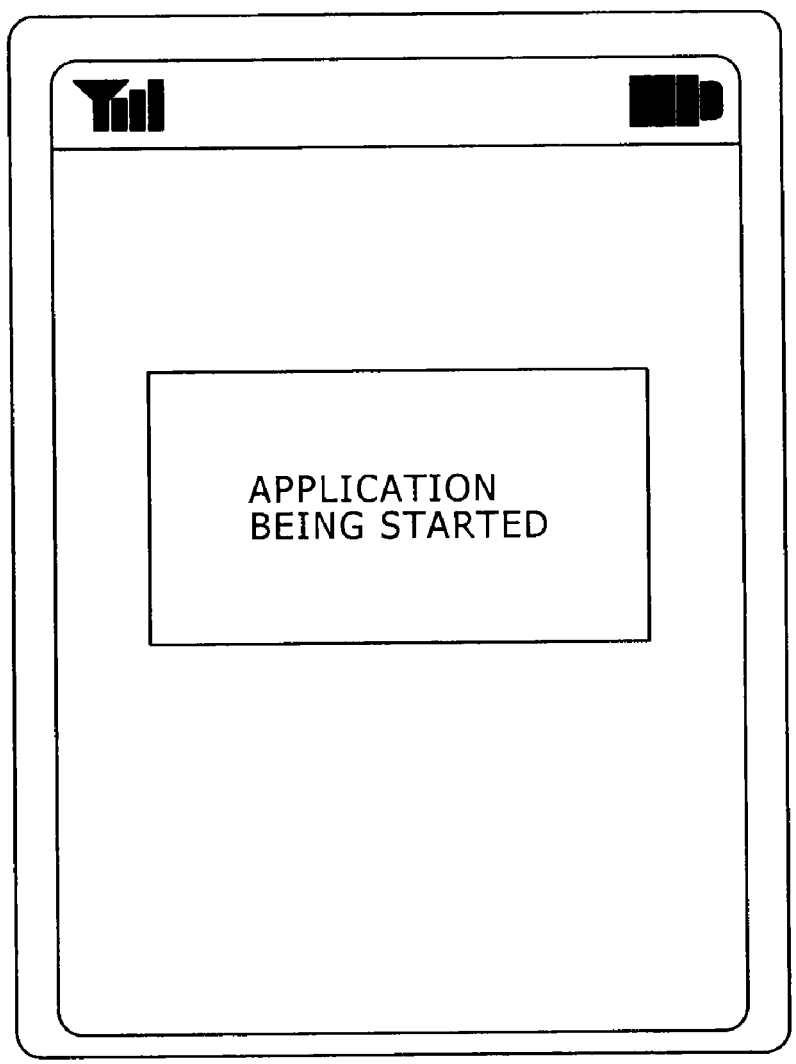

It is to be noted that, when the portable telephone set B receives the request to start ad hoc communication at step S125, an application for implementing the functions of the device control section 301 for exchanging playlists and reproducing music data based on a playlist is started. While the application is operating, such a message "Application being started" as seen in FIG. 18 is displayed on the monitor of the portable telephone set B. Further, when the application is started, the ad hoc communication is started to start transmission and reception of data (step S126). At this time, such a message as seen in FIG. 16 is displayed on the monitor of the portable telephone set B similarly as in the case of the portable telephone set A. Further, when the exchange of playlists is completed, such a message as seen in FIG. 17 is displayed on the monitor of the portable telephone set B similarly as in the case of the portable telephone set A.

After the ad hoc communication is completed, the portable telephone set A produces log information 466 of the ad hoc communication and stores the log information 466 into the IC card memory 322 at step S108. In short, the log information 466 is equivalent to the high touch log 373 illustrated in FIG. 7. Similarly, the portable telephone set B produces log information 467 of the ad hoc communication and stores the log information 467 into the IC card memory 322 at step S128. In short, the log information 467 is equivalent to the high touch log 373 illustrated in FIG. 7.

Figure 19:
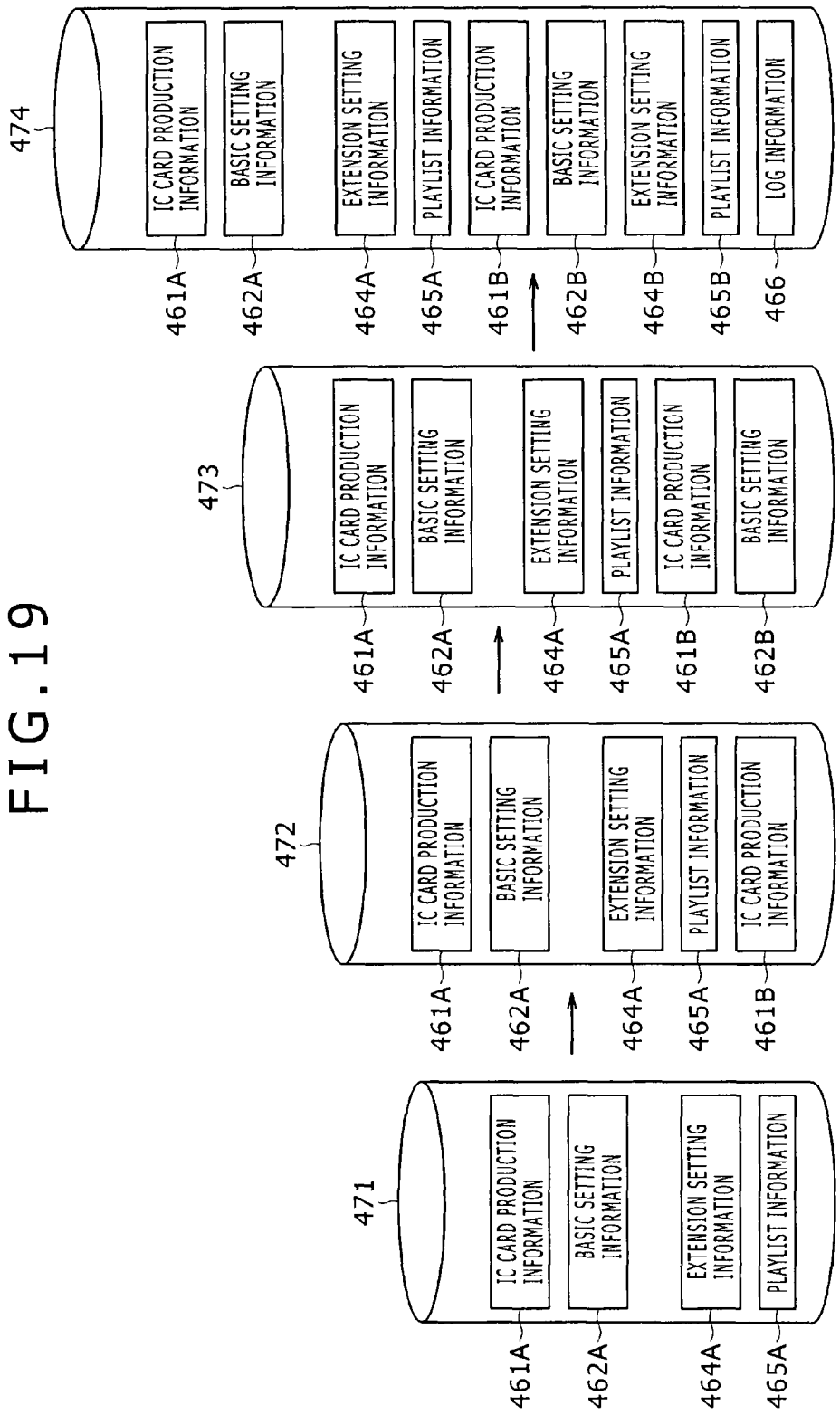

FIG. 19 illustrates an example of a manner of transition of information stored in the portable telephone set A during such exchange of playlists as described above.

In an initial state before the process at step S101 of FIG. 14 is started, the storage region of the portable telephone set A which includes both of the IC card memory 322 and the device memory 302 has storage region 471, which is illustrated at a leftmost portion of FIG. 19, stored therein. The storage region 471 includes IC card production information 461A which is the IC card production information 461 of the portable telephone set A, basic setting information 462A which is the basic setting information 462 of the portable telephone set A, extension setting information 464A which is extension setting information of the portable telephone set A, and playlist information 465A which is the playlist information 465 of music data or musical compositions stored in the portable telephone set A.

When the portable telephone set A receives the IC card production information 461 from the portable telephone set B at step S102, IC card production information 461B which is the IC card production information 461 of the portable telephone set B is additionally stored into the storage region of the portable telephone set A as seen from a storage region 472 illustrated at a second leftmost portion in FIG. 19.

When the portable telephone set A receives the basic setting information 462 from the portable telephone set B at step S104, basic setting information 462B which is the basic setting information 462 of the portable telephone set B is additionally stored into the storage region of the portable telephone set A as seen from a storage region 473 illustrated at a third leftmost portion in FIG. 19.

When the extension setting information 464 and the playlist information 465 are exchanged and then the log information 466 is produced at step S108, extension setting information 464B which is the extension setting information 464 of the portable telephone set B, playlist information 465B which is the playlist information 465 of the music data stored in the portable telephone set B and the log information 466 produced at step S108 are additionally stored into the storage region 474 of the portable telephone set A as illustrated at the rightmost portion of FIG. 19.

FIG. 20 is a view corresponding to FIG. 19 and illustrates an example of a manner of transition of information stored in the portable telephone set B in the exchange of playlists.

In an initial stage before the process at step S101 of FIG. 14 is started, the IC card production information 461B, basic setting information 462B, extension setting information 464B and playlist information 465B are stored in the storage region of the portable telephone set B including both of the IC card memory 322 and the device memory 302 as in the case of a storage region 481 illustrated at a left portion of FIG. 20.

When the processes at steps S121 to S128 are executed and information of the playlists and so forth is transferred and then the log information 467 is produced, the IC card production information 461A, basic setting information 462A, extension setting information 464A, playlist information 465A and log information 467 are additionally stored in the storage region of the portable telephone set B as in the case of a storage region 482 illustrated at a right portion of FIG. 20.

Now, a more detailed flow of the playlist exchanging process described hereinabove with reference to FIG. 14 is described with reference to FIGS. 21 to 24.

Figure 21:
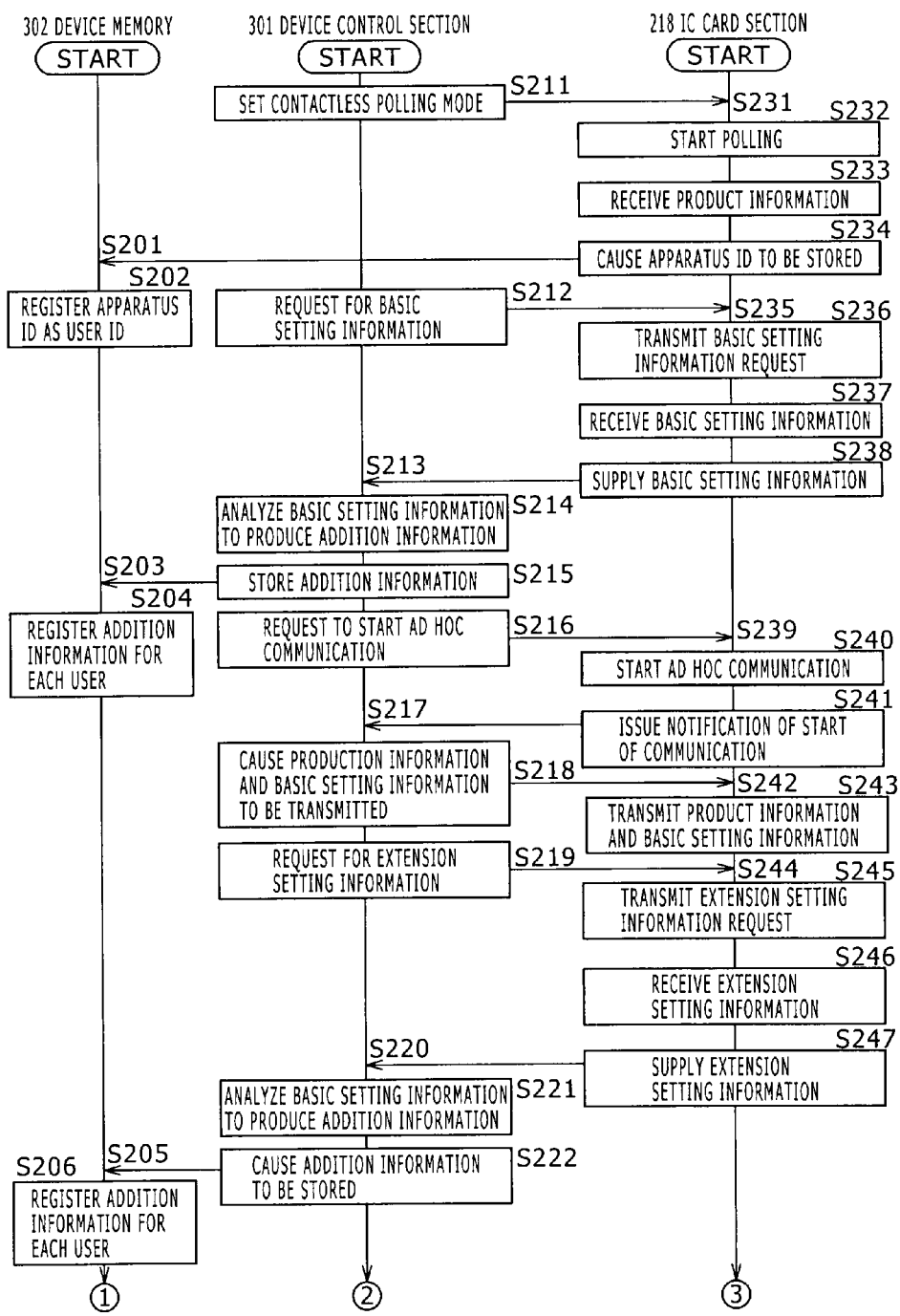
FIGS. 21 and 22 are flow charts illustrating an example of a detailed flow of a playlist exchanging process.
Figure 22:
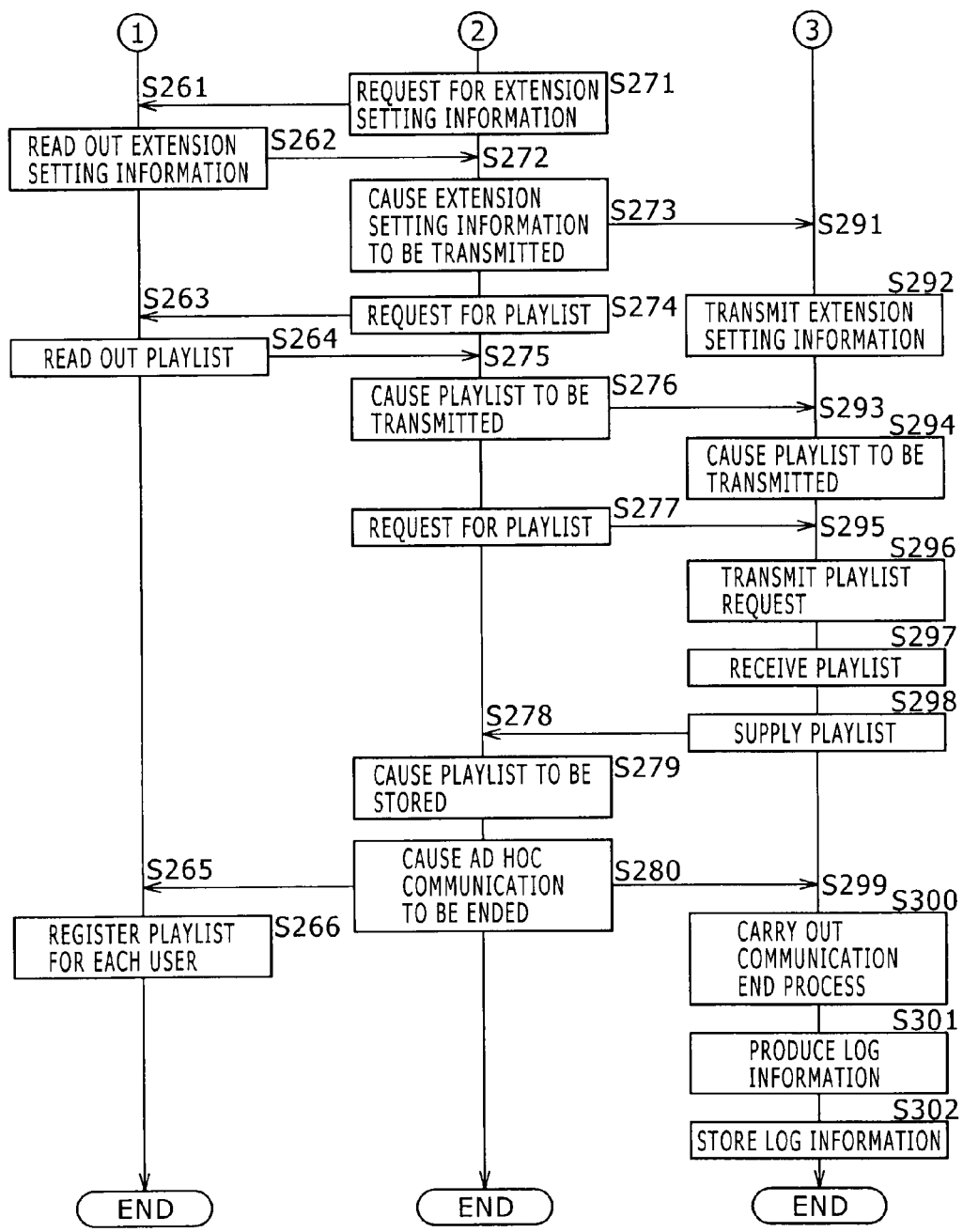

FIGS. 21 and 22 illustrate an example of a flow of processes of the components of the portable telephone set A including the device control section 301, device memory 302 and IC card section 218.

Referring first to FIG. 21, if an instruction to exchange of playlists is issued by the user, then the playlist exchange A control section 311 of the device control section 301 controls the IC card control section 321 to set the IC card section 218 to a contactless polling mode at step S211. The IC card control section 321 of the IC card section 218 acquires the instruction from the device control section 301 at step S231 and controls the antenna section 323 to output a polling signal to start polling at step S232.

After the portable telephone set A approaches the portable telephone set B sufficiently, the portable telephone set B transmits production information as a response to the polling signal. The IC card control section 321 of the IC card section 218 controls the antenna section 323 to receive the production information at step S233 and supplies an apparatus ID for the identification of the portable telephone set B included in the received production information to the device memory 302 so as to be stored at step S234.

The device memory 302 acquires the apparatus ID at step S201 and registers the acquired apparatus ID as the user ID of the user of the portable telephone set B at step S202.

The playlist exchange A control section 311 of the device control section 301 controls the IC card control section 321 to issue a request for the basic setting information 462B of the portable telephone set B at step S212. The IC card control section 321 of the IC card section 218 acquires the request at step S235 and transmits a basic setting information request for requesting for the basic setting information 462B through the antenna section 323 at step S236. The portable telephone set B transmits the basic setting information 462B in response to the request. The IC card control section 321 of the IC card section 218 receives the basic setting information 462B transmitted from the portable telephone set B through the antenna section 323 at step S237 and supplies the received basic setting information 462B to the playlist exchange A control section 311 of the device control section 301 at step S238.

The playlist exchange A control section 311 of the device control section 301 acquires the basic setting information 462B at step S213 and analyzes the acquired basic setting information 462B to extract necessary information from the basic setting information 462B and produce addition information to be added to the user ID at step S214. The playlist exchange A control section 311 supplies the produced addition information to the device memory 302 so as to be stored at step S215. The device memory 302 acquires the addition information at step S203, and stores, at step S204, the addition information in an associated relationship with the user ID registered at step S202 to register the addition information for the individual user.

After the addition information is stored, the playlist exchange A control section 311 of the device control section 301 controls the IC card control section 321 to issue a request to start ad hoc communication with the portable telephone set B at step S216. The IC card control section 321 of the IC card section 218 acquires the request at step S239 and carries out a communication connection process of issuing a request for connection for ad hoc communication to the portable telephone set B and receiving a response from the portable telephone set B through the antenna section 323 to start ad hoc communication with the portable telephone set B at step S240. After the communication is started, the IC card control section 321 of the IC card section 218 issues a notification of the starting of communication to the playlist exchange A control section 311 at step S241.

The playlist exchange A control section 311 of the device control section 301 acquires the notification at step S217 and controls the IC card control section 321 to transmit the IC card production information 461A and the basic setting information 462A of the portable telephone set A at step S218. The IC card control section 321 of the IC card section 218 acquires the request at step S242 and reads out the IC card production information 461A and the basic setting information 462A from the IC card memory 322 and transmits them to the portable telephone set B through the antenna section 323 at step S243.

Further, the playlist exchange A control section 311 of the device control section 301 controls the IC card control section 321 to issue a request for the extension setting information 464B of the portable telephone set B at step S219. The IC card control section 321 of the IC card section 218 acquires the request at step S244 and transmits an extension setting information request for requesting for the extension setting information 464B to the portable telephone set B through the antenna section 323 at step S245. The portable telephone set B transmits the extension setting information 464B in response to the request. The IC card control section 321 of the IC card section 218 receives the extension setting information 464B at step S246 and supplies the received extension setting information 464B to the playlist exchange A control section 311 at step S247.

The playlist exchange A control section 311 of the device control section 301 acquires the extension setting information 464B at step S220 and analyzes the acquired extension setting information 464B to extract necessary information and produce addition information to be added to the user ID at step S221. The playlist exchange A control section 311 supplies the produced addition information to the device memory 302 so as to be stored at step S222. The device memory 302 acquires the addition information at step S205 and stores the addition information in an associated relationship with the user ID registered at step S202 to register the addition information for the individual user at step S206.

Further, the playlist exchange A control section 311 of the device control section 301 issues a request for the extension setting information 464A of the portable telephone set A stored in the device memory 302 at step S271 of FIG. 22. Referring now to FIG. 22, the device memory 302 acquires the request at step S261 and reads out the extension setting information 464A from the storage region and then supplies the extension setting information 464A to the playlist exchange A control section 311 at step S262. The playlist exchange A control section 311 of the device control section 301 acquires the extension setting information 464A at step S272 and supplies the acquired extension setting information 464A to the IC card control section 321 so as to be transmitted to the portable telephone set B at step S273. The IC card control section 321 of the IC card section 218 acquires the extension setting information 464A at step S291 and transmits the acquired extension setting information 464A to the portable telephone set B through the antenna section 323 at step S292.

Further, the playlist exchange A control section 311 of the device control section 301 issues a request for the playlist information 465A corresponding to music data stored in the device memory 302 to the device memory 302 at step S274. The device memory 302 acquires the request at step S363 and reads out the playlist information 465A from the storage region and supplies the playlist information 465A to the playlist exchange A control section 311 at step S264. The playlist exchange A control section 311 of the device control section 301 acquires the playlist information 465A at step S275 and supplies the acquired playlist information 465A to the IC card control section 321 so as to be transmitted to the portable telephone set B at step S276. The IC card control section 321 of the IC card section 218 acquires the playlist information 465A at step S293 and transmits the acquired playlist information 465A to the portable telephone set B through the antenna section 323 at step S294.

Further, the playlist exchange A control section 311 of the device control section 301 controls the IC card control section 321 to issue a request for the playlist information 465B of the portable telephone set B at step S277. The IC card control section 321 of the IC card section 218 acquires the request at step S295 and transmits a playlist request for requesting for the playlist information 465B to the portable telephone set B through the antenna section 323 at step S296. The portable telephone set B transmits the playlist information 465B to the portable telephone set A in response to the request. The IC card control section 321 of the IC card section 218 receives the playlist information 465B at step S297 and supplies the received playlist information 465B to the playlist exchange A control section 311 at step S298.

The playlist exchange A control section 311 of the device control section 301 acquires the playlist information 465B at step S278 and supplies the acquired playlist information 465B to the device memory 302 so as to be stored at step S279. The device memory 302 acquires the playlist information 465B at step S265 and stores the playlist information 465B in an associated relationship with the user ID registered at step S202 to register the playlist information 465 for the individual user at step S266.

After the exchange of playlists is completed in such a manner as described above, the playlist exchange A control section 311 of the device control section 301 controls the IC card control section 321 to end the ad hoc communication at step S280. The IC card control section 321 of the IC card section 218 acquires the request at step S299 and carries out a communicating ending process of issuing a request to end the ad hoc information to the portable telephone set B through the antenna section 323 and receiving a response from the portable telephone set B at step S300. After the communication is ended, the IC card control section 321 of the IC card section 218 produces log information 466 of ad hoc communication at step S301 and stores the log information 466 into the IC card memory 322 at step S302.

Figure 23:
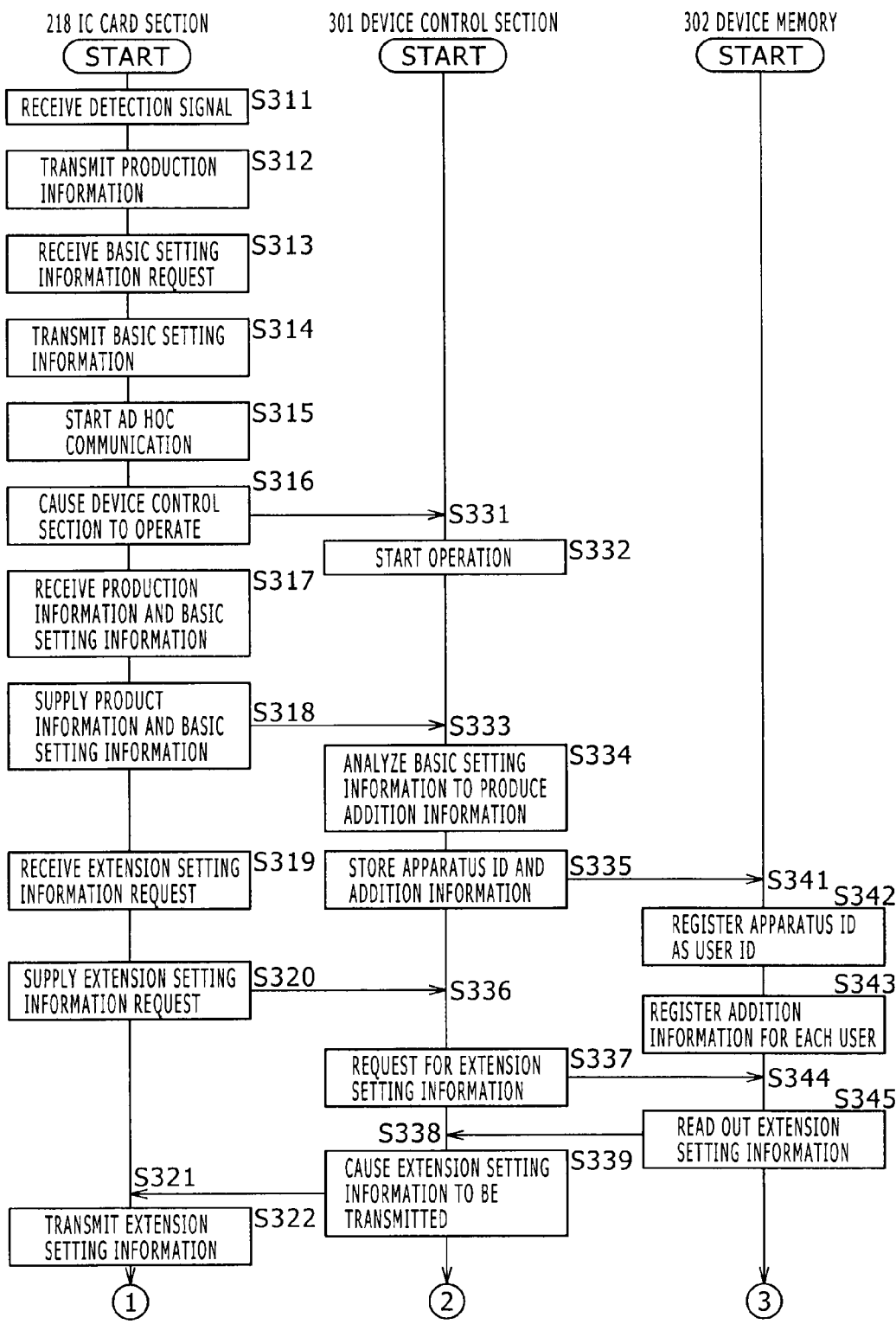
FIGS. 23 and 24 are flow charts illustrating another example of a detailed flow of the playlist exchanging process.
Figure 24:
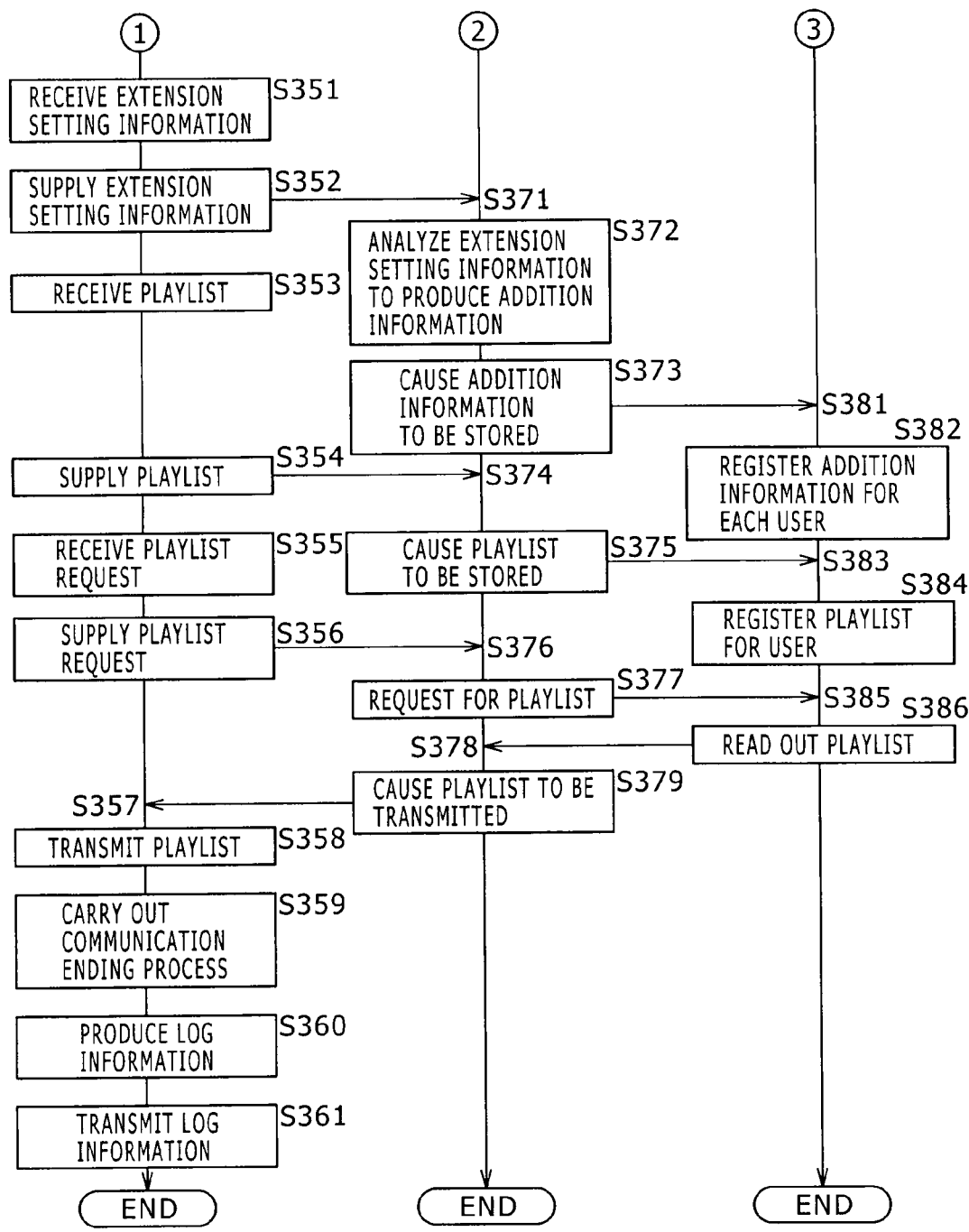

FIGS. 23 and 24 illustrate an example of processes of the components of the device control section 301, device memory 302 and IC card section 218. The flowcharts of FIGS. 23 and 24 correspond to those of FIGS. 21 and 22.

Referring first to FIG. 23, when the portable telephone set A in the polling mode approaches the IC card section 218 by the process at step S232 of FIG. 21, the IC card control section 321 of the IC card section 218 receives a detection signal or polling signal transmitted from the approaching portable telephone set A through the antenna section 323 at step S311. The IC card control section 321 of the IC card section 218 reads out the IC card production information 461B stored in the IC card memory 322 and transmits the IC card production information 461B as a response to the received detection signal to the portable telephone set A through the antenna section 323 at step S312. The IC card production information 461B is received by the portable telephone set A by the process at step S233 of FIG. 21.

When a basic setting information request is transmitted from the portable telephone set A by the process at step S236 of FIG. 21, the IC card control section 321 of the IC card section 218 receives the basic setting information request at step S313 of FIG. 23. The IC card control section 321 of the IC card section 218 reads out the basic setting information 462B stored in the IC card memory 322 and transmits the basic setting information 462B as a response to the received request to the portable telephone set A through the antenna section 323 at step S314. The basic setting information 462B is received by the portable telephone set A by the process at step S237 of FIG. 21.

If a request to start ad hoc communication is issued from the portable telephone set A by the process at step S240 of FIG. 21, then the IC card control section 321 of the IC card section 218 starts ad hoc communication in response to the request at step S315 of FIG. 23. Then, the IC card control section 321 of the IC card section 218 starts up an application for implementing the playlist exchange B control section 312 of the device control section 301 at step S316. The device control section 301 receives the starting request at step S331 and starts up the requested application to implement the playlist exchange B control section 312 at step S332.

When the IC card production information 461A and the basic setting information 462A are transmitted from the portable telephone set A by the process at step S243 of FIG. 21, the IC card control section 321 of the IC card section 218 receives them through the antenna section 323 at step S317 of FIG. 23. The IC card control section 321 of the IC card section 218 supplies the received IC card production information 461A and basic setting information 462A to the playlist exchange B control section 312 at step S318. The playlist exchange B control section 312 of the device control section 301 acquires the IC card production information 461A and the basic setting information 462A at step S333 and analyzes the basic setting information 462A to extract necessary information and produce addition information to be added to the apparatus ID extracted from the IC card production information 461A at step S334. Then, the playlist exchange B control section 312 of the device control section 301 supplies the apparatus ID extracted from the IC card production information 461A and the produced addition information to the device memory 302 so as to be stored at step S335. The device memory 302 acquires the apparatus ID and the addition information at step S341 and registers the apparatus ID as a user ID of the user of the portable telephone set A at step S342. Further at step S343, the device memory 302 stores the addition information in an associated relationship with the user ID registered at step S342 to register the addition information for the individual user.

If an extension setting information request is transmitted from the portable telephone set A by the process at step S245 of FIG. 21, then the IC card control section 321 of the IC card section 218 receives the extension setting information request through the antenna section 323 at step S319 of FIG. 23 and supplies the received extension setting information request to the playlist exchange B control section 312 at step S320.

The playlist exchange B control section 312 of the device control section 301 receives the request at step S336 and issues a request for the extension setting information 464B stored in the device memory 302 at step S337. The device memory 302 acquires the request at step S344 and reads out the extension setting information 464B from the storage region and supplies the extension setting information 464B to the playlist exchange B control section 312 at step S345. The playlist exchange B control section 312 of the device control section 301 acquires the extension setting information 464B at step S338 and supplies the extension setting information 464B to the IC card control section 321 so as to be transmitted to the portable telephone set A at step S339. The IC card control section 321 of the IC card section 218 acquires the extension setting information 464B at step S321 and transmits the extension setting information 464B to the portable telephone set A through the antenna section 323 at step S322. The extension setting information 464B is received by the portable telephone set A by the process at step S246 of FIG. 21.

When the extension setting information 464A is transmitted from the portable telephone set A by the process at step S292 of FIG. 22, the IC card control section 321 of the IC card section 218 receives the extension setting information 464A through the antenna section 323 at step S351 of FIG. 24 and supplies the received extension setting information 464A to the playlist exchange B control section 312 at step S352.

Referring to FIG. 24, the playlist exchange B control section 312 of the device control section 301 receives the extension setting information 464A at step S371 and analyzes the extension setting information 464A to extract necessary information and produce addition information to be added to the user ID at step S372. The playlist exchange B control section 312 supplies the produced addition information to the device memory 302 so as to be stored at step S373. The device memory 302 acquires the addition information at step S381 and stores the addition information in an associated relationship with the user ID registered at step S342 to register the addition information for the individual user at step S342.

When the playlist information 465A is transmitted from the portable telephone set A by the process at step S294 of FIG. 22, the IC card control section 321 of the IC card section 218 receives the playlist information 465A through the antenna section 323 at step S353 of FIG. 24. The IC card control section 321 of the IC card section 218 supplies the received playlist information 465A to the playlist exchange B control section 312 at step S354.

The playlist exchange B control section 312 of the device control section 301 acquires the playlist information 465A at step S374 and supplies the acquired playlist information 465A to the device memory 302 so as to be stored at step S375. The device memory 302 acquires the playlist information 465A at step S383 and stores the playlist information 465A in an associated relationship with the user ID registered at step S342 to register the playlist information 465A for the individual user at step S384.

When a playlist request is transmitted from the portable telephone set A by the process at step S296 of FIG. 22, the IC card control section 321 of the IC card section 218 receives the playlist request through the antenna section 323 at step S355 of FIG. 24. The IC card control section 321 of the IC card section 218 supplies the received playlist request to the playlist exchange B control section 312 at step S356.

The playlist exchange B control section 312 of the device control section 301 acquires the playlist request at step S376 and issues a request for playlist information to the device memory 302 at step S377. The device memory 302 acquires the request at step S385 and reads out the playlist information 465B from the storage region and supplies the playlist information 465B to the playlist exchange B control section 312 at step S386. The playlist exchange B control section 312 acquires the playlist information 465B at step S378 and supplies the acquired playlist information 465B to the IC card control section 321 so as to be transmitted to the portable telephone set A at step S379. The IC card control section 321 of the IC card section 218 acquires the playlist information 465B at step S357 and transmits the playlist information 465B to the portable telephone set A through the antenna section 323 at step S358. The playlist information 465B is received by the portable telephone set A by the process at step S297 of FIG. 22.

After the exchange of playlists is completed in such a manner as described above, the IC card control section 321 of the IC card section 218 carries out a communicating ending process corresponding to the process at step S300 of FIG. 22 to end the ad hoc communication. After the communication is ended, the IC card control section 321 of the IC card section 218 produces log information 467 of the ad hoc communication at step S360 and stores the log information 467 into the IC card memory 322 at step S361.

As described above, the portable telephone set 101 can exchange playlists readily with the portable telephone set 102 which is a different portable telephone set having similar functions to those of the portable telephone set 101.

FIG. 25 illustrates an example of information registered in the device memory 302.

Information acquired from the opposite party of exchange of playlists is described in such an XML format as illustrated in FIG. 25 in registration information 491. The registration information 491 is used for management of information regarding a playlist and a user for each user. Referring to FIG. 25, the registration information 491 includes a user ID described as a tag. Further, a user attribute formed from information regarding the user of the user ID, addition information of arbitrary substance, a playlist acquired from the user and information relating to the apparatus used by the user such as product information are described in the registration information 491 in such a manner as to belong to the tag of the user ID.

As described hereinabove, since the playlist information includes information of a device in which music data corresponding to a musical composition is stored, the device control section 301 can carry out it readily to specify, for example, when a musical composition is designated, the place of the music data. However, if only this information is utilized, there is the possibility that, for example, when display control of a playlist or the like is to be carried out as hereinafter described, where it is tried to specify to which user or apparatus each playlist belongs, the processing may be complicated because it is necessary to confirm data of all musical compositions.

Where the device memory 302 manages playlist information for each user as seen from FIG. 25, the device control section 301 can easily grasp to which user a certain playlist belongs, that is, where the music data of each musical composition exists.

The portable telephone set 101 which is a terminal apparatus can use a playlist acquired by such exchange as described above to purchase music data from the music selling server 142. Now, a flow of processes relating to such purchase of music data is described with reference to FIG. 26. FIG. 26 particularly illustrates an example of a flow of processes of purchasing, from the music selling server 142, music data of a musical composition included in a playlist belonging to the portable telephone set B obtained by exchange of playlists by the portable telephone set A, which is the portable telephone set 101, with the different portable telephone set B.

When the exchange of playlists comes to an end and the user of the portable telephone set A issues an instruction to display the playlist on the monitor, then the portable telephone set A displays the playlist as a GUI image on the monitor at step S401 in accordance with the instruction. The playlist displayed at this time at least includes the playlist belonging to the portable telephone set A and the playlist belonging to the portable telephone set B.

The playlists are displayed as a GUI image, and the user can operate the displayed GUI image, that is, the displayed playlists, to select a desired musical composition and cause a request for streaming reproduction of the selected musical composition to be sent to the portable telephone set B or cause a request for permission of audition or of purchase to be sent to the music selling server 142. The portable telephone set A accepts a music composition purchase instruction inputted by the user and instructive of purchase of the musical composition designated by the user at step S402. Then, the portable telephone set A transmits musical composition information of the playlist regarding the designated musical composition to the music selling server 142 at step S403 to request for provision of the musical composition. It is assumed that, at this time, a musical composition included in the playlist belonging to the portable telephone set B is designated.

The music selling server 142 receives the request from the portable telephone set A at step S411 and carries out an accounting process regarding the purchase of the musical composition at step S412. Then, the music selling server 142 transmits music data of the requested musical composition to the portable telephone set A at step S413. The portable telephone set A receives the music data at step S404 and stores the received music data at step S405.

After the music data is received, the portable telephone set A updates the playlist so that the purchase of the music data is reflected on the playlist at step S406. In particular, the portable telephone set A additionally places the musical composition information of the musical composition whose music data is purchased into the playlist belonging to the portable telephone set A itself.

Further, at step S407, the portable telephone set A issues a notification of the purchase of the music composition to the portable telephone set B to which the playlist used for the request for provision belongs at step S407. The portable telephone set B receives the notification at step S421 and updates the playlist belonging to the portable telephone set A based on the notification at step S422. In particular, the portable telephone set B additionally places the musical composition information of the musical composition purchased by the portable telephone set A into the playlist belonging to the portable telephone set A.

Figure 29:
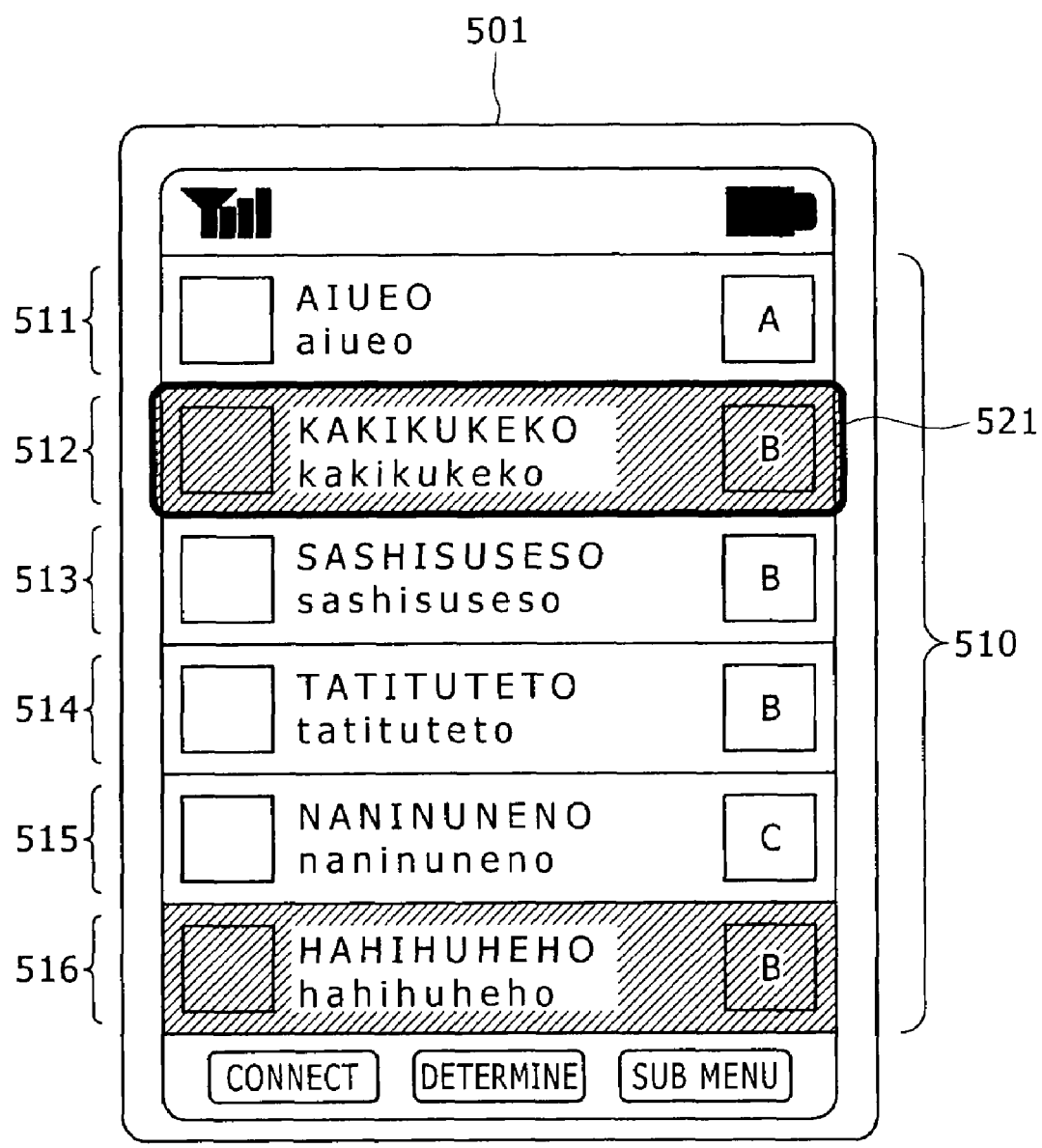
FIGS. 29, 30 and 31 are schematic views showing different examples of a display screen.
Figure 30:
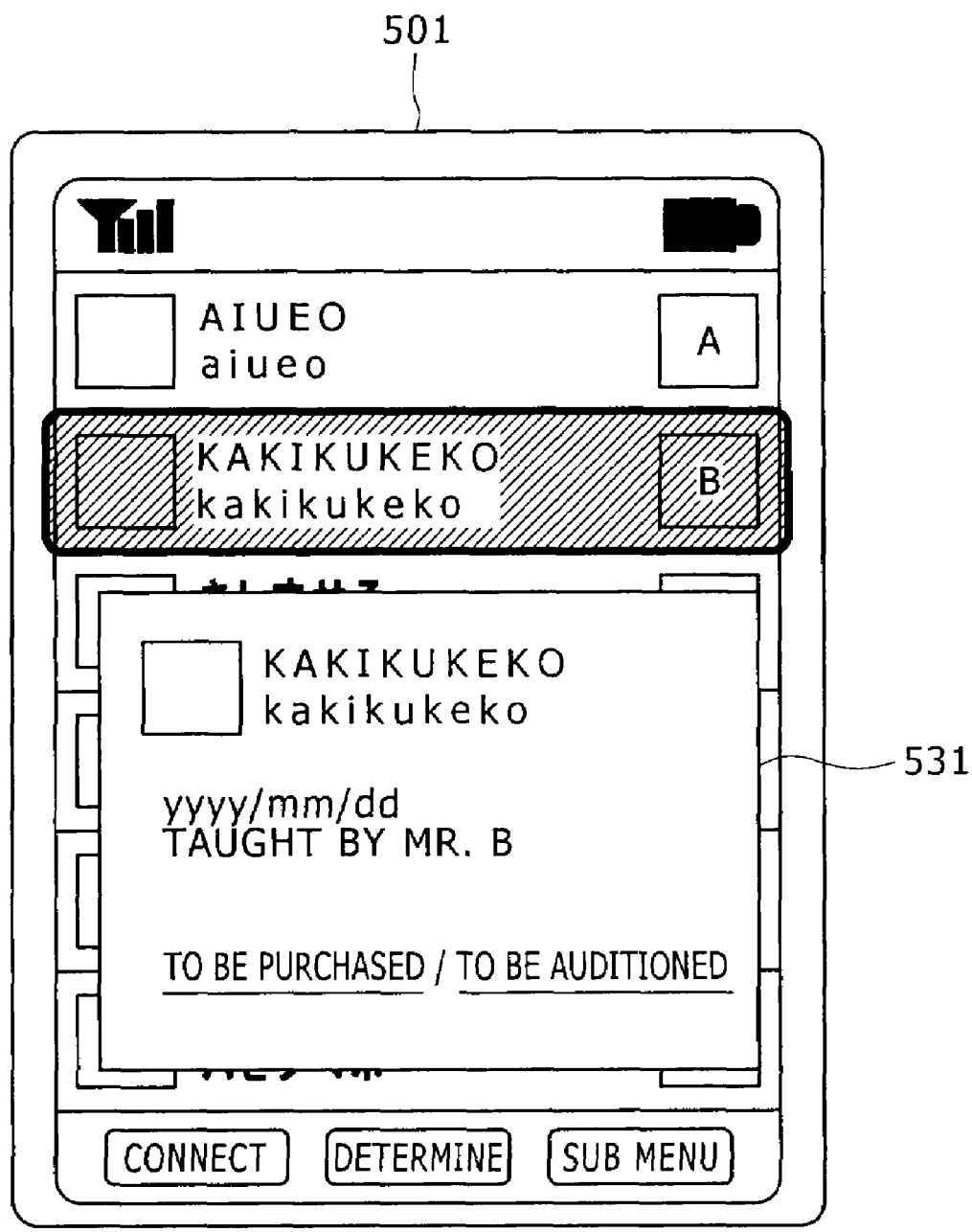
Figure 31:
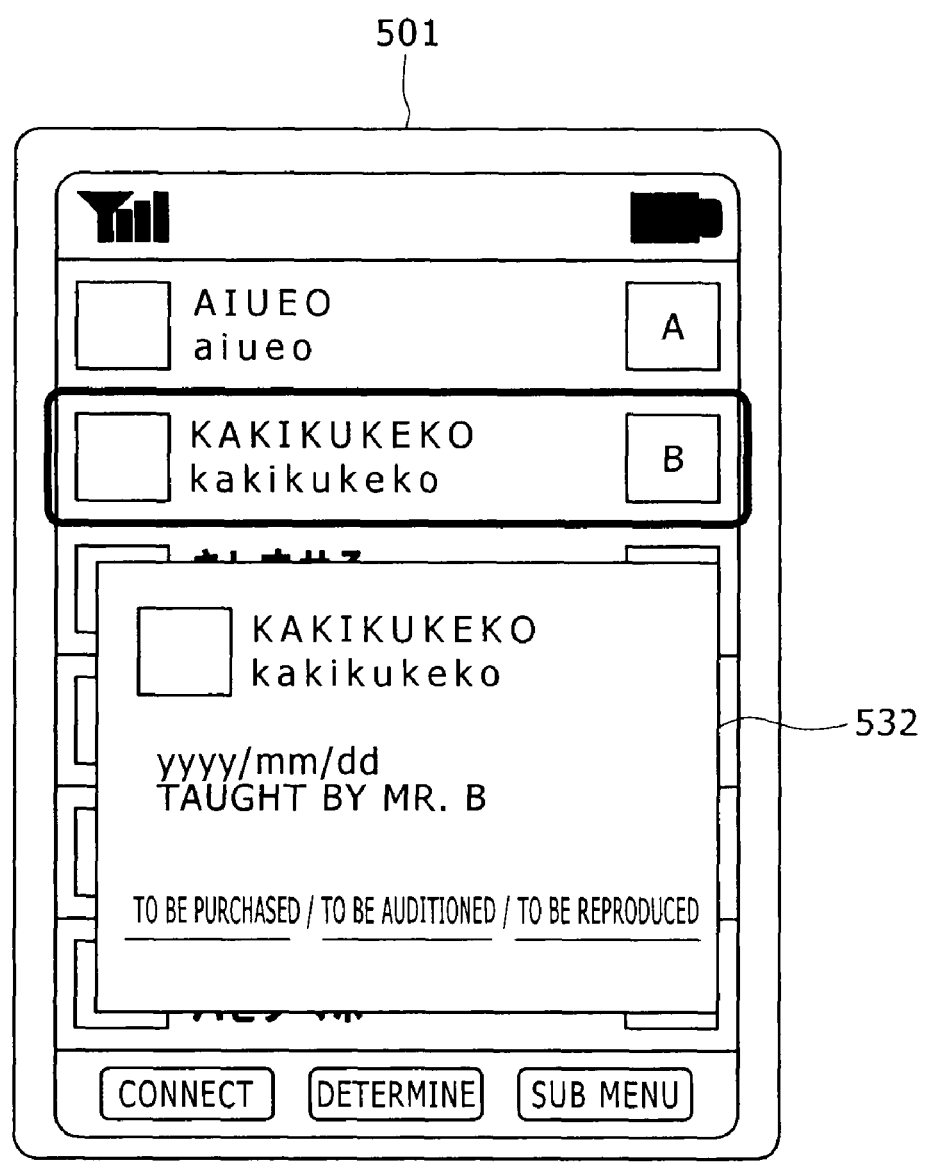

Now, details of a flow of control processes for a playlist executed by the portable telephone set 101 (portable telephone set A in the example of FIG. 26) upon such purchase of the musical composition as described above are described with reference to FIGS. 27 and 28. Also FIGS. 29 to 31 are referred to as occasion demands.

If the user issues an instruction to display the playlist, then the device control section 301 (FIG. 6) of the portable telephone set 101 starts a playlist control process. After the playlist control process is started, the display control section 313 of the device control section 301 reads out the playlists stored in the device memory 302 at step S441. The display control section 313 supplies the read out playlists to the outputting section 212 so that a GUI image of the playlists is displayed on the monitor at step S442. The display control section 313 controls the inputting section 211 to start musical composition selection acceptance for accepting a musical composition selection instruction for the instruction of selection of a musical composition to be used as a processing object inputted by the user based on the GUI screen of playlists at step S443.

Further, the display control section 313 issues, at step S444, an inquiry about whether or not some other Bluetooth device exists within the communication range to the Bluetooth control section 331 of the Bluetooth communication section 217. The Bluetooth control section 331 sets the operation mode to the polling mode and transmits a detection signal through the antenna section 332. Where some different Bluetooth device exists within the communication range, the different Bluetooth device receives the detection signal and transmits a response signal to the detection signal. The Bluetooth control section 331 receives the response signal to decide whether or not some other Bluetooth device exists within the communication range and supplies a result of the decision as a result of the inquiry to the display control section 313.

If the display control section 313 acquires the inquiry result, then it controls the outputting section 212 based on the inquiry result to cause a portion of the musical composition, which corresponds to each device with which communication is impossible, in the playlist to be displayed, to be displayed in gray at step S445. The display control section 313 controls the inputting section 211 to disable the musical pieces displayed in gray at step S446. In particular, since each musical composition displayed in gray exists outside the communication range of Bluetooth communication, sharing of the music data, that is, streaming reproduction, may not be carried out. Accordingly, the display control section 313 carries out setting so that a reproduction instruction may not be inputted with regard to the musical composition.

FIG. 29 shows an example of display of a playlist. Referring to FIG. 29, a playlist display region 510 is provided at part or in the entirety of a display region 501 of the monitor, and playlists are displayed in the playlist display region 510. Information is displayed as a list for each musical composition so that the playlists allow selection in a unit of a musical composition. In the example of FIG. 29, information for six musical compositions is displayed like musical compositions 511 to 516. Information of the musical compositions is configured basically similarly.

In the example of FIG. 29, for each of the musical compositions 511 to 516, an image added to a package to which the musical composition belongs, that is, a jacket image, is displayed on the left side, and a musical composition name and a player name are displayed at a central portion while the name of a device which stores musical data of the musical composition is displayed on the right side. A quadrangular shape indicated on the left side in each of the regions of the musical compositions 511 to 516 indicates the display region of the jacket image, and a character string of upper case characters such as "AIUEO" or "KAKIKUKEKO" indicated at a central portion indicates an example of the musical composition name, that is, the title of the musical composition. Meanwhile, a character string of lower case characters such as "aiueo" or "kakikukeko" below the character string of hiragana characters indicates an example of a player name, that is, an artist name. Further, an alphabetical letter such as A, B, C or the like surrounded by a square on the right side indicates an example of the device name of a device which stores the music data. For example, it is illustrated that, for the musical composition 511, the musical composition title is "AIUEO" and the artist name is "aiueo," and the music data is stored in the portable telephone set A.

It is to be noted that all musical compositions of the playlists may be displayed in the display region 501 or some of such musical compositions may be displayed. Naturally, a page changeover button, a scroll bar or the like may be provided.

In the example of FIG. 29, an anchor 521 for selecting a musical composition is displayed in an overlapping relationship with the playlist. The anchor 521 is displayed as a thick framework which surrounds an area for one musical composition of a playlist. A musical composition positioned in the inside of the thick framework of the anchor 521 is selected as a processing object. The user can operate the inputting section 211 to move the anchor 521. Selection of a desired musical composition is carried out by positioning the anchor 521 such that the thick framework may surround the musical composition.

In the example of FIG. 29, the musical composition 512 and the musical composition 516 are indicated by slanting lines. The slanting lines represent that the musical composition 512 and the musical composition 516 are displayed in gray. In particular, in the example of FIG. 29, the portable telephone set B to which the musical composition 512 and the musical composition 516 belong does not exist within the communication range, and the musical composition 512 and the musical composition 516 are displayed in gray and may not be reproduced.

It is to be noted that the display which indicates such impossibility of reproduction may be given by any method in addition to the gray display only if it allows easy distinction of such musical compositions from musical compositions which can be reproduced. For example, such a pattern as slanting lines as seen in FIG. 29 may be applied to a display portion of a musical composition which may not be reproduced, or such a display portion may be displayed in lower color density. Or else, the display portion of a musical composition which may not be reproduced may be displayed in a different color from the other portions, or a predetermined mark or design may be displayed at such a display portion. Naturally, any other display method may be used. In short, each musical composition which may not be selected is displayed in a different display method from the other musical compositions which can be selected.

At step S447, the display control section 313 decides whether or not the playlist control process is to be ended. If it is decided that the playlist control process is to be ended, then the display control section 313 ends the playlist control process. On the other hand, if it is decided that the playlist control process is not to be ended, then the display control section 313 advances the processing to step S448.

At step S448, the display control section 313 controls the inputting section 211 to decide whether or not a musical composition is selected by the user. If it is decided that a musical composition is not selected, then the display control section 313 returns the processing to step S447 so that the processes at the steps beginning with step S447 are repeated. On the other hand, if it is decided at step S448 that a musical composition is selected by the user, then the display control section 313 advances the processing to step S449.

At step S449, the display control section 313 decides whether or not reproduction of the selected music composition is impossible. If it is decided that the device which stores music data of the selected music composition exists outside the communication range and reproduction of the selected music composition is impossible, then the display control section 313 advances the processing to step S450. At step S450, the display control section 313 controls the outputting section 212 to display an instruction acceptance screen on the monitor.

FIG. 30 illustrates an example of display of the instruction acceptance screen displayed at step S450. Referring to FIG. 30, if the user selects a musical composition, then an instruction acceptance screen 531 is displayed in an overlapping relationship with the playlist currently displayed. Since the instruction acceptance screen 531 displayed at step S450 is an instruction acceptance screen for a musical composition whose reproduction is impossible, two choices of "to be purchased" and "to be auditioned" are provided in addition to the musical composition information. The "to be purchased" and "to be auditioned" are a GUI on which one of them can be selected. The user wound operate the inputting section 211 to select one of the two choices or end the display of the instruction acceptance screen 531 to cancel the selection of the musical composition.

It is to be noted that, as seen in FIG. 30, the instruction acceptance screen 531 displays, in addition to musical composition information such as the musical composition name and the artist name, the date (yyyy/mm/dd) on which playlists were exchanged, information representative of the opposite party of the exchange, that is, the providing source of the acquired playlist such as "taught by Mr. B" so that the understanding of the user can be further deepened in regard to the musical composition or playlist in terms of, for example, when and from which the playlist of the musical composition was acquired.

The display control section 313 decides at step S451 whether or not the audition is selected by the user on the instruction acceptance screen 531 which is a GUI image. If it is decided that the audition is selected, then the display control section 313 advances the processing to step S452. At step S452, the audition processing control section 314 carries out an audition process of receiving, reproducing and outputting streaming data of part or the entirety of the selected musical composition. Details of the audition process are hereinafter described. When the audition process comes to an end, the audition processing control section 314 ends the playlist control process.

On the other hand, if it is decided at step S451 that the audition is not selected on the instruction acceptance screen 531 by the user, then the display control section 313 advances the processing to step S453, at which it decides whether or not the purchase is selected on the instruction acceptance screen 531 by the user. If it is decided that the purchase is selected, then the display control section 313 advances the processing to step S454. At step S454, the purchase process control section 315 carries out a purchase process of purchasing music data of the selected musical composition. Details of the purchase process are hereinafter described. When the purchase process comes to an end, the purchase process control section 315 ends the playlist control process.

On the other hand, if it is decided at step S453 that the purchase is not selected on the instruction acceptance screen 531 by the user, then the display control section 313 advances the processing to step S455, at which it decides whether or not the selection of the musical composition is canceled. If it is decided that the selection of the musical composition is not canceled, then the display control section 313 returns the processing to step S451 so that the processes at the steps beginning with step S451 are repeated. On the other hand, if it is decided at step S455 that the selection of the musical composition is canceled, then the display control section 313 returns the processing to step S447 so that the processes at the steps beginning with step S447 are repeated.

Figure 28:
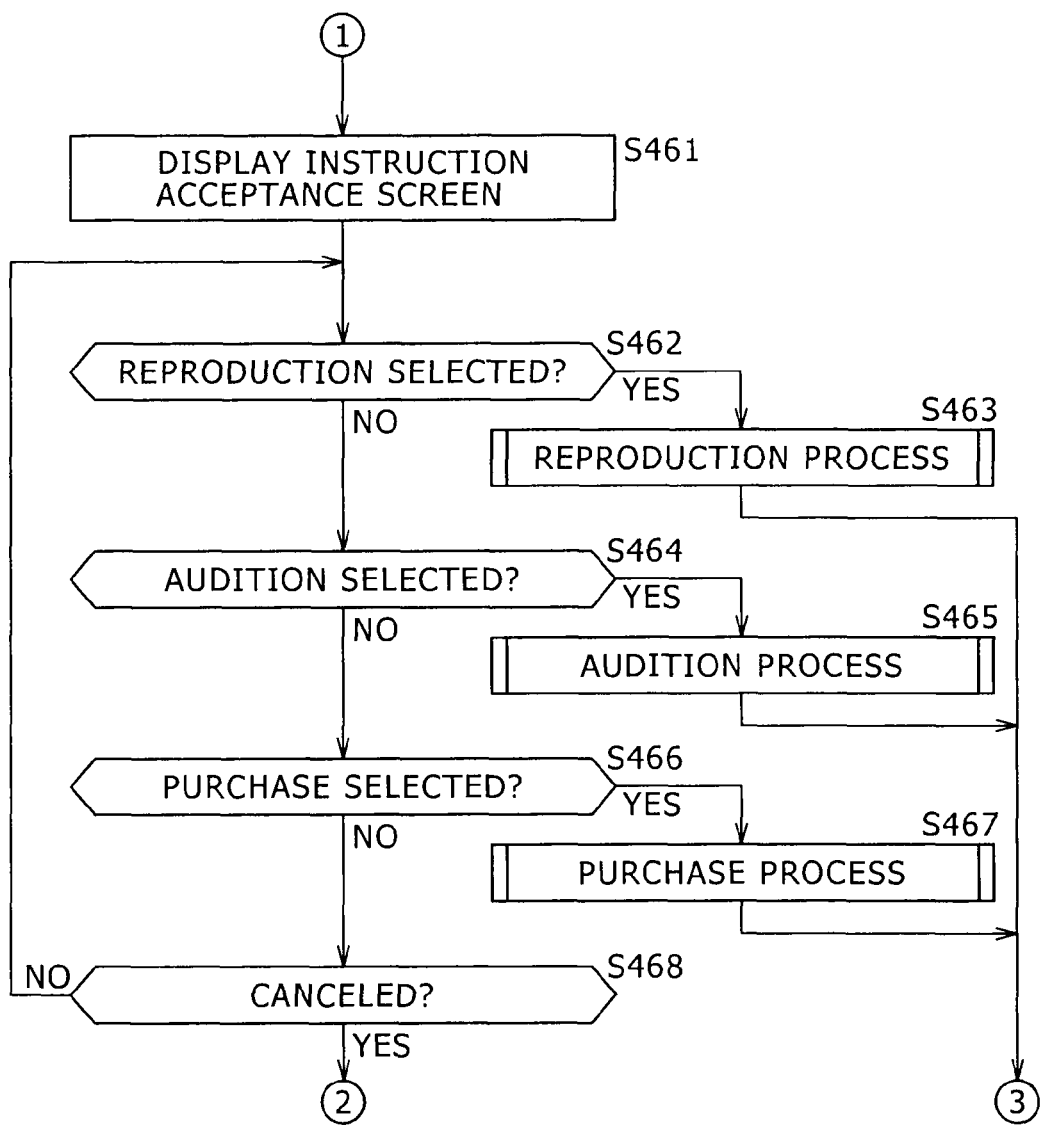

On the other hand, if it is decided at step S449 that a device which stores music data of the selected musical composition exists within the communication range and reproduction of the selected musical composition is possible, then the display control section 313 advances the processing to step S461 of FIG. 28.

Referring now to FIG. 28, the display control section 313 controls the outputting section 212 to display an instruction acceptance screen on the monitor at step S461.

FIG. 31 shows an example of display of the instruction acceptance screen displayed at step S461. As seen in FIG. 31, if the user selects a musical composition, then an instruction acceptance screen 532 is displayed in an overlapping relationship with the playlist currently displayed. Since the instruction acceptance screen 531 displayed at step S461 is an instruction acceptance screen for a musical composition whose reproduction is possible, it includes three choices of "to be purchased," "to be auditioned" and "to be reproduced" in addition to the musical composition information. The choices of "to be purchased," "to be auditioned" and "to be reproduced" are displayed as a GUI which allows selection of one of the choices. The user would operate the inputting section 211 to select one of the choices or end the display of the instruction acceptance screen 532 to cancel the selection of the musical composition.

It is to be noted that, as seen in FIG. 31, the instruction acceptance screen 531 displays, in addition to musical composition information such as the musical composition name and the artist name, the date (yyyy/mm/dd) on which playlists were exchanged, information representative of the opposite party of the exchange, that is, the providing source of the acquired playlist such as "taught by Mr. B" so that the understanding of the user can be further deepened in regard to the musical composition or playlist in terms of, for example, when and from which the playlist of the musical composition was acquired.

Then, the display control section 313 decides at step S462 whether or not the reproduction is selected on the instruction acceptance screen 532 which is a GUI image by the user. If it is decided that the reproduction is selected, then the display control section 313 advances the processing to step S463. At step S463, the reception side reproduction processing control section 318 causes the different device, in which music data of the musical composition is stored, to transmit streaming data of the musical composition and carries out a reproduction process of receiving the streaming data and sequentially reproducing the streaming data to output sound. When such a reproduction process as just described comes to an end, the reception side reproduction processing control section 318 ends the playlist control process.

On the other hand, if it is decided at step S462 that the reproduction is not selected on the instruction acceptance screen 532 by the user, then the display control section 313 advances the processing to step S464, at which it decides whether or not the audition is selected on the instruction acceptance screen 532 by the user.

If it is decided that the audition is selected, then the display control section 313 advances the processing to step S465. At step S465, the audition processing control section 314 carries out an audition process similar to that executed at step S452 of FIG. 27. Details of the audition process are hereinafter described. When the audition process comes to an end, the audition processing control section 314 ends the playlist control process.

On the other hand, if it is decided at step S464 that the audition is not selected on the instruction acceptance screen 532 by the user, then the display control section 313 advances the processing to step S466, at which it decides whether or not the purchase is selected on the instruction acceptance screen 532 by the user. If it is decided that the purchase is selected, then the display control section 313 advances the processing to step S467, at which it executes a purchase process similar to that executed at step S454 of FIG. 27. Details of the purchase process are hereinafter described. When the purchase process comes to an end, the purchase process control section 315 ends the playlist control process.

On the other hand, if it is decided at step S466 that the purchase is not selected on the instruction acceptance screen 532 by the user, then the display control section 313 advances the processing to step S468, at which it decides whether or not the selection of the musical composition is canceled. If it is decided that the selection of the musical composition is not canceled, then the display control section 313 returns the processing to step S462 to repeat the processes at the steps beginning with step S462. On the other hand, if it is decided at step S468 that the selection of the musical composition is canceled, then the display control section 313 returns the processing to step S447 of FIG. 27 to repeat the processes at the steps beginning with step S447.

The playlist control process is executed in such a manner as described above.

Figure 27:
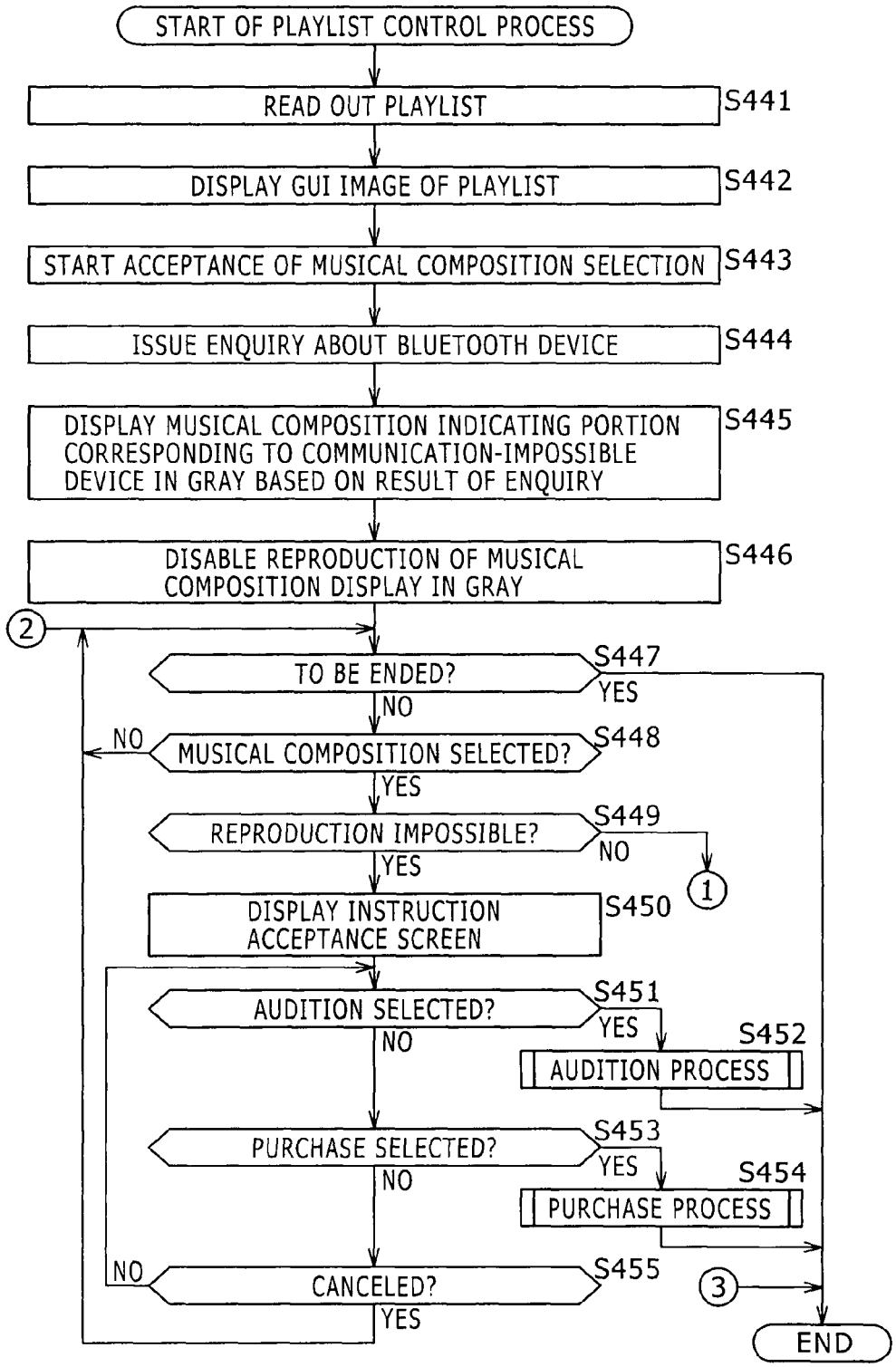
FIGS. 27 and 28 are flow charts illustrating an example of a flow of a playlist display control process.
Figure 32:
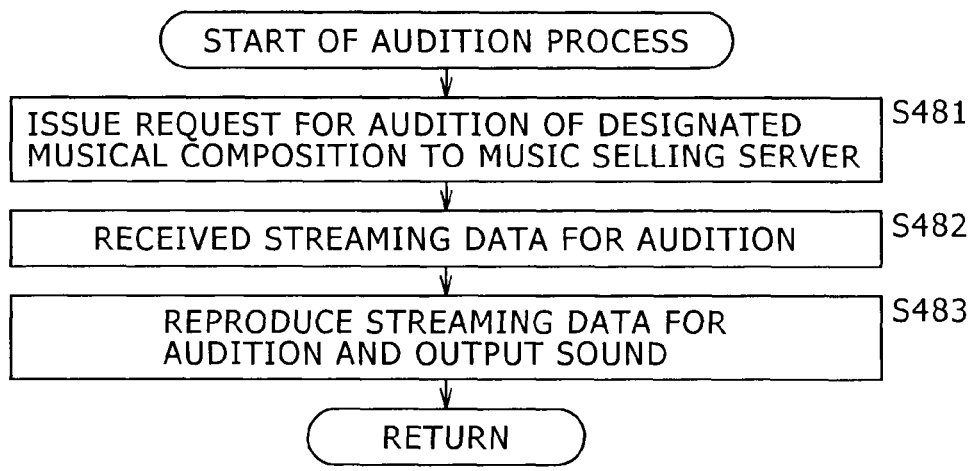
FIG. 32 is a flow chart illustrating an example of a flow of an audition process.

Now, a detailed example of a flow of the audition process executed at step S452 of FIG. 27 and step S465 of FIG. 28 is described with reference to FIG. 32.

After the audition process is started, the audition processing control section 314 controls the telephone network communication section 214 to access the music selling server 142 through the network 131 and issue a request for audition of a designated musical composition to the music selling server 142 at step S481. The request acceptance processing section 451 of the music selling server 142 accepts the request, and the audition streaming data supplying processing section 452 acquires audition streaming data of the requested musical composition from the audition streaming data database 455. Then, the audition streaming data supplying processing section 452 transmits the acquired audition streaming data to the portable telephone set 101 which is the source of the request through the network 131.

The audition processing control section 314 of the portable telephone set 101 controls the telephone network communication section 214 to receive the audition streaming data transmitted thereto at step S482. The audition processing control section 314 controls the reception side player 342 to sequentially reproduce the audition streaming data received thereby and output the reproduced sound from the speaker of the outputting section 212.

In particular, the process at step S482 and the process at step S483 are actually carried out simultaneously and concurrently. Then, when the acceptance and reproduction (sound outputting) of the audition streaming data come to an end, the audition processing control section 314 ends the audition process and returns the processing to the step having been executed just before the starting of the audition process, that is, to step S452 of FIG. 27 or step S465 of FIG. 28, thereby ending the playlist control process as described hereinabove.

Figure 33:
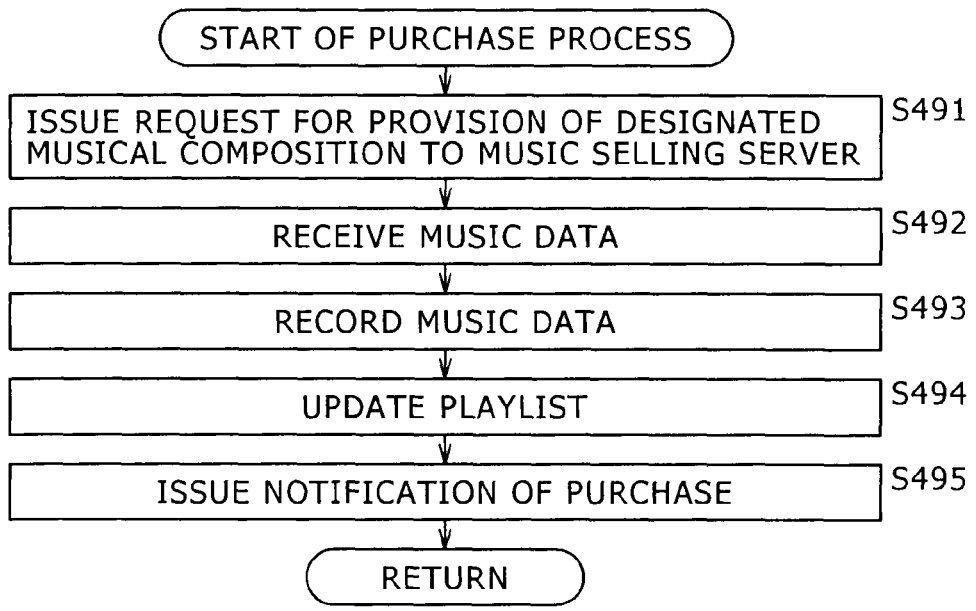
FIG. 33 is a flow chart illustrating an example of a flow of a purchase process.

Now, a detailed example of a flow of the purchase process carried out at step S454 of FIG. 27 or at step S467 of FIG. 28 is described with reference to FIG. 33.

After the purchase process is started, the purchase process control section 315 controls the telephone network communication section 214 to access the music selling server 142 through the network 131 and issue a request for provision of a designated musical composition to the music selling server 142 at step S491. The request acceptance processing section 451 of the music selling server 142 accepts the request, and the music data supplying processing section 453 acquires music data of the requested musical composition from the music data database 456. Then, the music data supplying processing section 453 carries out an accounting process regarding the sales of the music data and then transmits the acquired music data to the portable telephone set 101 of the source of the request through the network 131.

The purchase process control section 315 of the portable telephone set 101 controls the telephone network communication section 214 to receive the music data transmitted thereto at step S492. The purchase process control section 315 supplies the received music data to the device memory 302 so as to be stored at step S493.

The purchase process control section 315 accesses the device memory 302 to reflect the purchase of the music data on the playlist belonging to the portable telephone set 101 itself at step S494. In particular, the purchase process control section 315 additionally places the music information of the musical composition of the purchased music data into the playlist belonging to the portable telephone set 101 itself. Further, at step S495, the purchase process control section 315 issues a notification that the music data has been purchased to the different terminal apparatus from which the playlist corresponding to the musical composition of the purchased music data is provided, that is, in the example of FIG. 26, to the portable telephone set B.

The playlist updating section 316 of the portable telephone set which receives the notification of the purchase, that is, in the example of FIG. 26, the playlist updating section 316 of the portable telephone set B, controls the telephone network communication section 214 to receive the notification. Then, the playlist updating section 316 updates the playlist stored in the device memory 302 and belonging to the source of the notification, in the example of FIG. 26, to the portable telephone set A, in accordance with the notification, for example, by additionally placing the musical composition information of the musical composition whose music data has been purchased into the playlist.

After the process at step S495 comes to an end, the purchase process control section 315 ends the purchase process and returns the processing to the step having been executed just before the starting of the purchase process, that is, to step S454 of FIG. 27 or step S467 of FIG. 28, thereby ending the playlist control process as described hereinabove.

As described above, the user of the terminal apparatus such as the portable telephone set 101 can purchase music data readily from the music selling server 142 only by selecting a musical composition from within a playlist. Particularly where the terminal apparatus is a portable type apparatus like the portable telephone set 101, since the display section is small and the resolution is low, a GUI image is displayed but in a small size and principally presents text data. Also the operability of the operation section is low, and the inputting section often includes only ten keys. On such an apparatus whose operability is low as just described, it is not easy to select a desired musical composition from among a large number of musical compositions, and there is the possibility that cumbersome operations may be demanded. By making it possible to purchase music data using a playlist, the problem of such low operability can be eliminated.

Further, since a playlist can be exchanged with a device of a different user, the user of the terminal apparatus can easily access a greater number of musical compositions which conform to the liking of the user itself. Further, since the user can purchase a musical composition using the playlist acquired by the exchange, also the purchase process can be carried out readily. In other words, since the exchange of playlists makes it possible to introduce a greater number of musical compositions to the user of the terminal apparatus, the desire for purchase of the user can be enhanced.

Further, the user can exchange playlists readily only by contacting or moving the terminal apparatus of itself with or to approach the different terminal apparatus. Further, since a distance limit is provided, the exchange of playlists is permitted to be carried out between users who have a relationship of trust with each other, and information of the playlist to be exchanged is rendered more certain. Consequently, such influence as that of word-of-mouth communication can be provided.

Furthermore, where users or terminal apparatus whose playlists are exchanged exist within a predetermined range, they can share music data of musical compositions included in the exchange playlists by streaming reproduction. Consequently, introduction or appealing of musical compositions to the users of the terminal apparatus can be carried out or advertised more strongly, and the desire for purchase of the musical compositions can be enhanced. Further, to each user, a musical composition conforming to the liking of the user itself can be selected with a higher degree of certainty.

Further, each of the exchanged playlists can be referred to even if the users or terminal apparatus between which the playlists were exchanged move away from each other until they are positioned outside the predetermined range, and the playlist can be used to purchase music data from the music selling server 142. Accordingly, each user can purchase musical data readily at an arbitrary timing.

Further, when music data is purchased, a notification of such purchase is issued also to the source of the playlist such as the opposite party of exchange of playlists. Consequently, also it is possible to create a new service based on the information such as a service of updating the playlist.

For example, the notification mentioned may be issued not from the terminal apparatus by which the music data is purchased but from the music selling server 142. Further, at this time, the music selling server 142 may utilize the notification to provide a service of returning part of the profit of the musical composition sales to the introducer of the musical composition, that is, an affiliate service.

As described above, musical compositions are mutually introduced between users by exchanging playlists. In particular, an advertising effect can be expected with an exchanging action of playlists, and where such exchange of playlists is carried out more frequently, increase of the sales number of music data, that is, the number of utilization chances of services, can be anticipated. In other words, when music data is purchased, the user who provides music composition information of the musical composition or playlist to the purchaser contributes to the sales of the music data. Accordingly, the music selling server 142 provides, as an affiliate service, a service of returning part of the profit of the music composition sales to the introducer of the musical composition. Consequently, the exchanging action of playlists can be further promoted. In other words, a higher advertising effect can be anticipated.

An outline of the foregoing is illustrated in FIG. 34. If the portable telephone set A purchases music data of a musical composition included in the playlist B acquired by exchange of playlists with the portable telephone set B from the music selling server 142, then the music selling server 142 refers to information of an introducer included in musical composition information supplied from the portable telephone set A to issue a notification that the music data is purchased to the introducer, that is, to the portable telephone set B. Further, the music selling server 142 carries out an introducer returning process of returning part of the sales profit to the introducer and issues a notification of a result of the process as an introducer returning process result.

Figure 35:
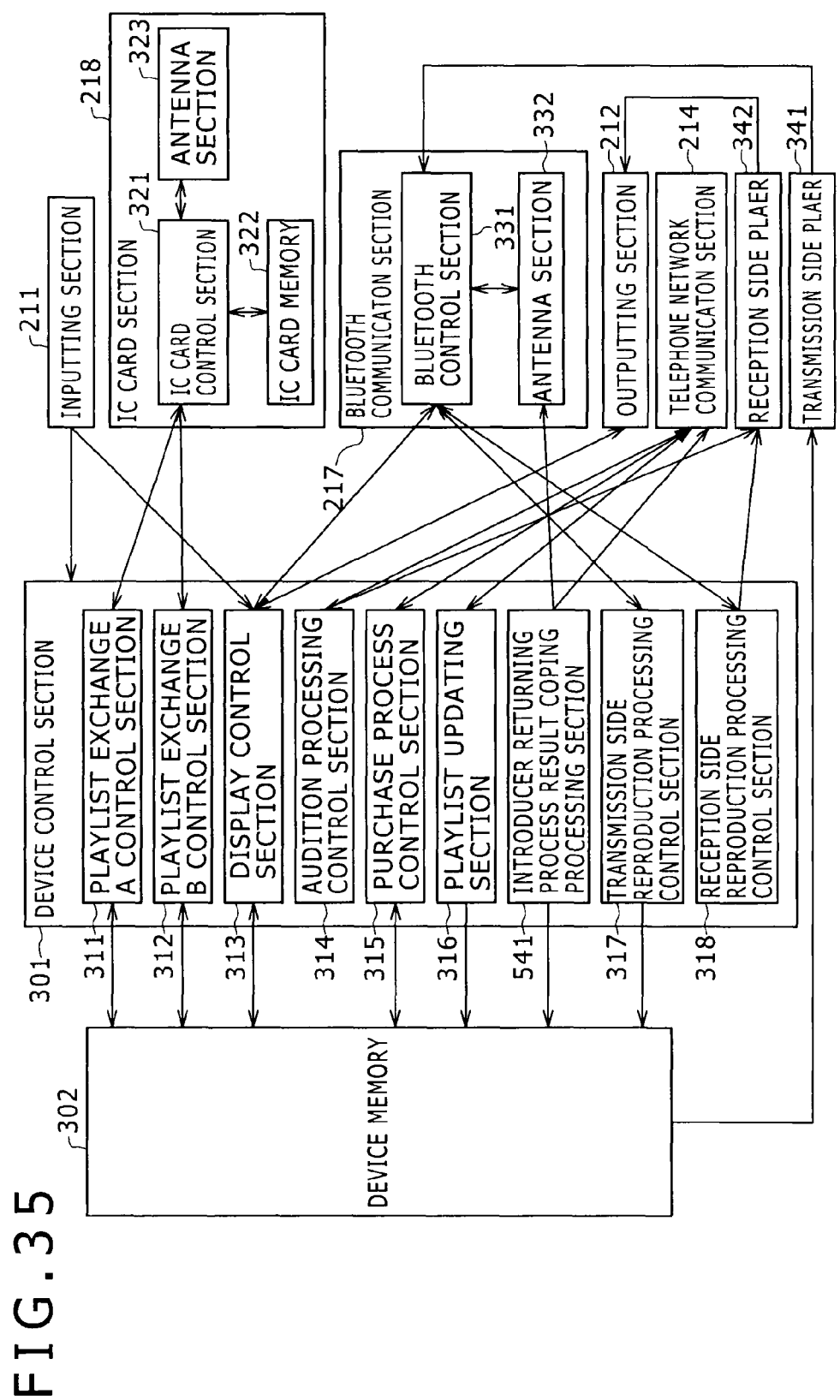
FIG. 35 is a functional block diagram showing another example of functional blocks which the portable telephone set has.

FIG. 35 shows an example of functions which the portable telephone set 101 which is the terminal apparatus in this instance has.

Referring to FIG. 35, the device control section 301 of the portable telephone set 101 includes, in addition to the components described hereinabove with reference to FIG. 6, an introducer returning process result coping processing section 541. The introducer returning process result coping processing section 541 controls the telephone network communication section 214 to receive an introducer returning process result transmitted from the music selling server 142 and then controls the outputting section 212 to carry out a predetermined coping process for the introducer returning process result such as to display the introducer returning process result on the monitor or to update the service point or the electronic money balance stored in the device memory 302.

FIG. 36 illustrates an example of a configuration of the user addition information 381 in this instance. Referring to FIG. 36, the user addition information 381 includes, in addition to the user information A 391 and the user information B 392, an affiliate 551 including information relating to an affiliate service of returning the profit to an introducer. The affiliate 551 includes an affiliate trader, an affiliate ID, a URL and so forth.

The affiliate trader includes information regarding a trader who provides an affiliate service. The affiliate trader may further include information representative of a service division representative of which kind of service is provided as an affiliate service such as a coupon, a point, a discount or present of a commodity.

The affiliate ID is identification information for the identification of a user as a user of the affiliate service. In order for a user to utilize the affiliate service, it is necessary for the user to be registered in advance. In the affiliate service, each user is identified using the affiliate ID when the service is to be provided. The URL is information including the URL of a site which provides the returning service. For example, where the point is accumulated by introduction of a musical composition and a service of exchanging the point for some article in accordance with the point number is provided as the affiliate service, the URL includes the URL of a site which carries out the exchange of the article or of a site which introduces the article to be exchanged. It is to be noted that the URL has to only include information relating to the place at which the service is provided and may not necessarily be a URL.

FIG. 37 illustrates an example of a configuration of the music information 401 in this instance. Referring to FIG. 37, the music information 401 includes basically similar types of information to those of the example described hereinabove with reference to FIG. 11. However, the URL includes an affiliate ID of an introducer by whom the musical composition is introduced as well as information relating to a site from which music data is sold.

When music data is to be purchased, a site from which the music data is to be purchased, for example, the music selling server 124, is determined based on information of the sound source purchase destination URL 414. Then, when a request for provision of music data is to be issued, the music information 401 of a desired musical composition is provided from the portable telephone set A to the music selling server 124. The music selling server 124 carries out a notification or returning process based on the affiliate ID of the introducer included in the sound source purchase destination URL 414 of the music information 401.

Figure 38:
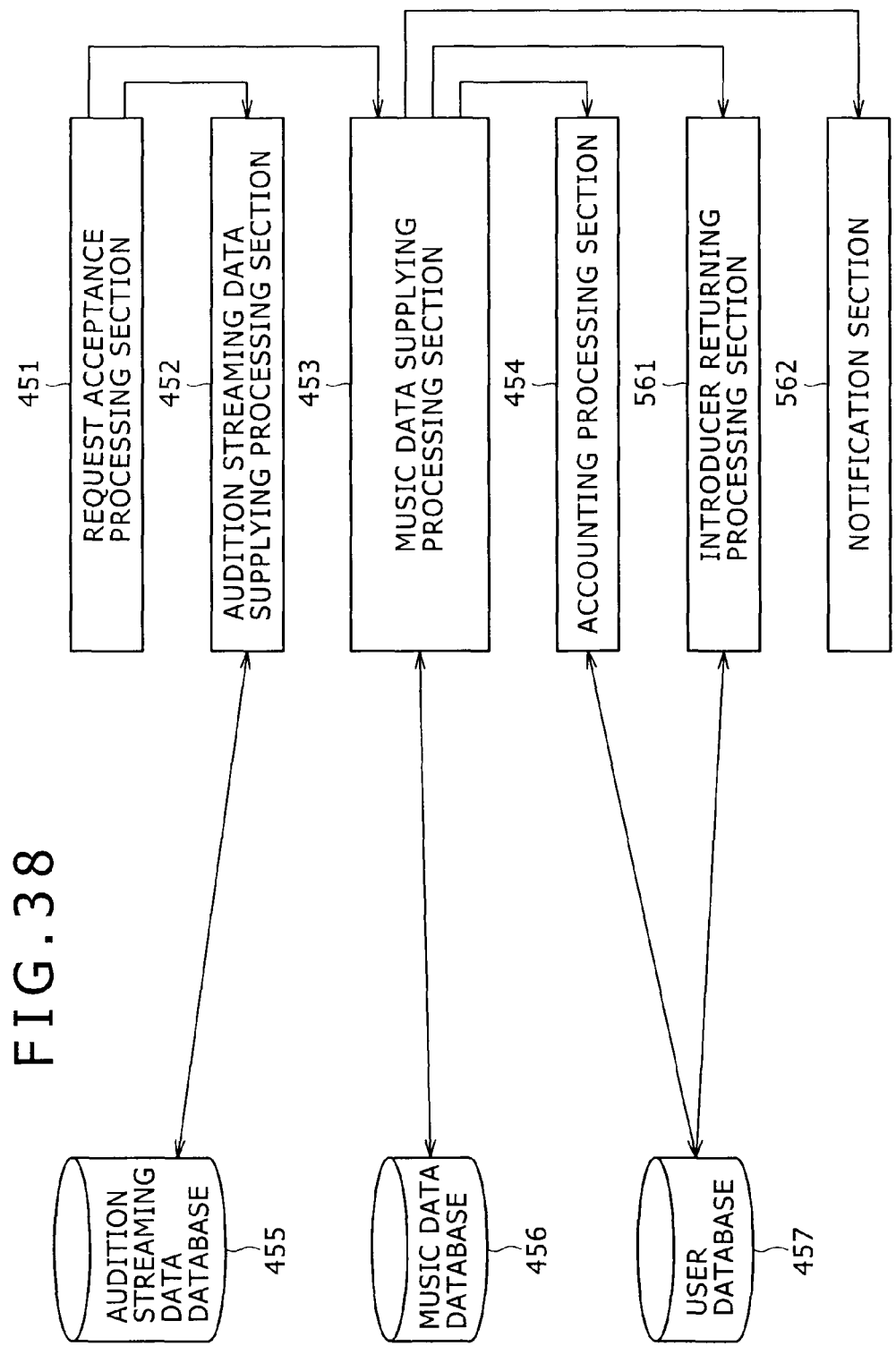
FIG. 38 is a functional block diagram showing another example of functional blocks which the music selling server has.

FIG. 38 shows an example of functions which the music selling server 124 in this instance has. Referring to FIG. 38, the music selling server 124 includes, in addition to the components described hereinabove with reference to FIG. 13, an introducer returning processing section 561 and a notification section 562.

The introducer returning processing section 561 carries out a process relating to the affiliate service of returning the profit to an introducer who has a contribution to the sales of music data. For example, where user information relating to an affiliate service is stored in the user database 457, the introducer returning processing section 561 accesses the user database 457 and carries out a predetermined profit returning process such as application of a service point. The notification section 562 issues a notification of information of a result of purchase and a result of profit returning to the introducer.

A flow of processes relating to the sales of music data at this time is described with reference to FIG. 39. It is to be noted that the flow chart of FIG. 39 corresponds to the flow chart of FIG. 26 and also FIG. 39 illustrates an example of a flow of processes when the portable telephone set A purchases music data of a musical composition included in a playlist acquired from the portable telephone set B similarly as in the case of FIG. 26.

In purchase of music data, the portable telephone set A executes processes at steps S511 to S516 similar to those at steps S401 to S406 of FIG. 26 to purchase and store the music data and then update the playlist.

Also the music selling server 142 executes processes at steps S521 to S523 similar to those at steps S411 to S413 of FIG. 26 to carry out an accounting process for the provision request and then transmit request music data to the portable telephone set A.

However, in the process of FIG. 39, the music selling server 142 carries out the introducer returning process and carries out a predetermined returning process such as to apply a service point to the producer at step S524. Then, the music selling server 142 supplies an introducer returning process result notification and a purchase notification to the portable telephone set B of the introducer at step S525.

The portable telephone set B receives the notifications at step S531, and the playlist updating section 316 of the portable telephone set B updates the playlist corresponding to the user by whom the music data is purchased based on the purchase notification at step S532. Then at step S533, the introducer returning process result coping processing section 541 of the portable telephone set B carries out a predetermined process such as to cause the monitor to display the returning process result based on the acquired returning process result notification.

As described above, by transmitting a purchase notification to the source of the playlist, that is, to the terminal apparatus of the introducer, it is possible to create a new service such as an affiliate service based on the notification. Consequently, it is possible to anticipate further utilization promotion of the music sales service.

It is to be noted that, while the foregoing description is directed to exchange of playlists between portable telephone sets, the portable telephone set 101 can exchange playlists with an apparatus other than portable telephone sets such as the PC 103, PC 104 and audio device 105 by a similar method as described hereinabove with reference to FIG. 1. In other words, it is also possible for an apparatus other than a portable telephone set to exchange playlists with a different apparatus.

In short, while the foregoing description is given of a portable telephone set, in place of a portable telephone set, an arbitrary information processing apparatus such as a PDA, a laptop type personal computer, an electronic dictionary or a portable music player can be used to exchange playlists with a different apparatus. For example, also the PC 103 of FIG. 1 can exchange playlists with a different apparatus similarly to the portable telephone set 101.

FIG. 40 is a block diagram showing an example of a configuration of the PC 103 and so forth.

Referring to FIG. 40, the PC 103 has a configuration basically similar to that of the portable telephone set 101 (FIG. 2) and includes a CPU 601, a ROM 602, a RAM 603 and a bus 604 corresponding to the CPU 201, ROM 202, RAM 203 and bus 204, respectively. Further, the PC 103 includes an input/output interface 610, an inputting section 611, an outputting section 612, a storage section 613, a communication section 614 and a drive 615 corresponding to the input/output interface 210, inputting section 211, outputting section 212, storage section 213, wire communication section 216 and drive 219, respectively.

The PC 103 is connected to a reader/writer 111 and a Bluetooth communication section 112 which correspond to the IC card section 218 and Bluetooth communication section 217, respectively. The reader/writer 111 has a configuration similar to that of the IC card section 218. In particular, the reader/writer 111 includes an IC card control section 631, an IC card memory 632 and an antenna section 633. The reader/writer 111 and the Bluetooth communication section 112 are connected to the input/output interface 610.

In short, the PC 103, reader/writer 111 and Bluetooth communication section 112 generally have a configuration similar to that of the portable telephone set 101 and can carry out similar processes. In this manner, some of the components may be formed as an external apparatus.

It is to be noted that, while the foregoing description is directed to sales and sharing of data using music data as an example of content data, the content data need not be music data but may be of any type such as image data or document data. Also the playlist may be any information only if it includes information relating to data of an object of sales and data to be shared.

It is to be noted that, while the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs or into an information processing apparatus or the like of an information processing system formed from a plurality of apparatus.

The recording medium is formed as such a removable medium 221 or 621 as shown in FIG. 2 or 40 which may be a magnetic disc (including a flexible disc), an optical disc (including a CD-ROM (Compact Disc-Read Only Memory) and a DVD (Digital Versatile Disc)), or a magneto-optical disc (including an MD (MiniDisc) (Registered Trademark of Sony Corporation), or a semiconductor memory which has the program recorded thereon or therein and is distributed to provide the program to a user separately from an apparatus body. Else, the recording medium is formed as the ROM 202 or 602, the storage section 213 or 613 or the like in which the program is recorded and which is provided to a user in a state wherein the program is incorporated in an apparatus body.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

It is to be noted that an element described as one apparatus in the foregoing description may be divided into a plurality of elements configured as different apparatus. On the contrary, a plurality of elements described as different apparatus in the foregoing description may be combined so as to be configured as a single apparatus. Furthermore, naturally it is possible to add some other element or elements than those described hereinabove to the elements of the apparatus described hereinabove. Further, if the configuration and operation of the entire system are substantially same, then some of the components of a certain apparatus may be included as a component or components of a different apparatus. In other words, the present invention is not limited to the embodiment described above, but the embodiment can be modified in various forms without departing from the spirit and scope of the present invention.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus, comprising:
    management data acquisition means for controlling a first communication section, which carries out a first proximity radio communication by a first communication method by which said information processing apparatus transmits and receives information to and from a different terminal apparatus positioned in the proximity of said information processing apparatus, to acquire management data to be utilized for a management of content data from the different terminal apparatus by the first communication method, the management data including at least identification information of the content data and a Uniform Resource Locator (URL) of a server, the first communication method having a first communication distance, which is shorter than a second communication distance of a second communication method;
    selection operation acceptance means for accepting a selection operation for selecting the content data by selecting the management data;
    decision means for deciding whether or not a second proximity radio communication by the second communication method with the different terminal apparatus is possible;
    requesting means for controlling a second communication section, which communicates with the server, to issue, in response to said decision means deciding that the second proximity radio communication is not possible, a request for the content data selected by the selection operation accepted by said selection operation acceptance means to the server; and
    content data acquisition means for controlling the second communication section to acquire the content data when supplied in response to the request by said requesting means, wherein the requesting means controls a third communication section to issue, in response to said decision means deciding that the second proximity radio communication is possible and the selection operation for selecting the content data by selecting the management data being accepted, a content request to the different terminal apparatus by carrying out the second proximity radio communication by the second communication method, and the content data acquisition means controls said third communication section to acquire the content data when supplied in response to the content request.

2. The information processing apparatus according to claim 1, further comprising:
    storage means for storing the management data in advance; and
    management data supplying means for reading out the management data stored in said storage means and for controlling the first communication section to supply the read out management data by the first proximity radio communication to the different terminal apparatus positioned in the proximity of said information processing apparatus.

3. The information processing apparatus according to claim 1, wherein the content data supplied in response to the request are music data which are sound data of a musical composition, and the management data include musical composition information which is information relating to the musical composition.

4. The information processing apparatus according to claim 1, further comprising:
    notification means for issuing a notification that the content data corresponding to the management data acquired by said management data acquisition means have been acquired from the server by said content data acquisition means to the different terminal apparatus which is a providing source of the management data.

5. The information processing apparatus according to claim 1, wherein the management data include information of the different terminal apparatus which is a providing source of the management data, and said requesting means provides the information of the different terminal apparatus which is the providing source of the management data to the server.

6. The information processing apparatus according to claim 1, further comprising:
    the third communication section, the decision means deciding whether or not the different terminal apparatus exists in the second communication distance of the second communication method, said requesting means issuing, when said decision means decides that the different terminal apparatus does not exist in the second communication distance of the second communication method and the selection operation is accepted by said selection operation acceptance means, the request.

7. The information processing apparatus according to claim 1, further comprising:
    display control means for controlling a display section to display the management data acquired by said management data acquisition means as image information.

8. The information processing apparatus according to claim 1, wherein the information received from the different terminal apparatus includes an information disclosure level of the different terminal apparatus.

9. An information processing method for an information processing apparatus, the method comprising:
    controlling a first communication section, which carries out a first proximity radio communication by a first communication method by which the information processing apparatus transmits and receives information to and from a different terminal apparatus positioned in the proximity of the information processing apparatus, to acquire management data to be utilized for a management of content data from the different terminal apparatus by the first communication method, the management data including at least identification information of the content data and a Uniform Resource Locator (URL) of a server, the first communication method having a first communication distance, which is shorter than a second communication distance of a second communication method;
    accepting a selection operation for selecting the content data by selecting the management data;
    deciding whether or not a second proximity radio communication by the second communication method with the different terminal apparatus is possible;
    controlling a second communication section, which communicates with the server, to issue a request for the content data selected by the selection operation to the server, if the deciding decides that the second proximity radio communication is not possible;

controlling the second communication section to acquire the content data when supplied in response to the request, if the deciding decides that the second proximity radio communication is not possible;

controlling a third communication section to issue a content request to the different terminal apparatus by carrying out the second proximity radio communication by the second communication method, if the deciding decides that the second proximity radio communication is possible and the selection operation for selecting the content data by selecting the management data is accepted; and controlling the third communication section to acquire the content data when supplied in response to the content request, if the deciding decides that the second proximity radio communication is possible.

10. An information processing system, comprising:

a server; and first and second terminal apparatuses to which content data can be provided from said server;

said first terminal apparatus including management data acquisition means for controlling a first communication section, which carries out a first proximity radio communication by a first communication method by which said first terminal apparatus transmits and receives information to and from said second terminal apparatus which is a different terminal apparatus positioned in the proximity of said first terminal apparatus, to acquire management data to be utilized for a management of the content data from the second terminal apparatus by the first communication method, the management data including at least identification information of the content data and a Uniform Resource Locator (URL) of the server, the first communication method having a first communication distance, which is shorter than a second communication distance of a second communication method, selection operation acceptance means for accepting a selection operation for selecting the content data by selecting the management data, decision means for deciding whether or not a second proximity radio communication by the second communication method with the second terminal apparatus is possible;

requesting means for controlling a second communication section, which communicates with the server, to issue, in response to said decision means deciding that the second proximity radio communication is not possible, a request for the content data selected by the selection operation accepted by said selection operation acceptance means to the server, and content data acquisition means for controlling the second communication section to acquire the content data when supplied in response to the request by said requesting means;

said second terminal apparatus including management data storage means for storing the management data, and management data supplying means for reading out the management data stored in said management data storage means and for controlling a third communication section, which carries out the first proximity radio communication by which said second terminal apparatus transmits and receives the information to and from said first terminal apparatus which is positioned in the proximity of said second terminal apparatus, to supply the read out management data by the first proximity radio communication to said first terminal apparatus; and said server including content data storage means for storing the content data, request acceptance means for controlling a fourth communication section, which communicates with said first terminal apparatus, to accept the request for the content data from said first terminal apparatus, and content data supplying means for reading out the requested content data from said content data storage means based on the request accepted by said request acceptance means and for controlling said fourth communication section to supply the read out content data to said first terminal apparatus which is a requesting source of the request, wherein the requesting means controls a fifth communication section to issue, in response to said decision means deciding that the second proximity radio communication is possible and the selection operation for selecting the content data by selecting the management data being accepted, a content request to the second terminal apparatus by carrying out the second proximity radio communication by a second communication method having a communication distance longer than a communication distance of the first communication method, and the content data acquisition means controls the fifth communication section to acquire the content data when supplied in response to the content request.

11. An information processing apparatus, comprising:

a management data acquisition section configured to control a first communication section, which carries out a first proximity radio communication by a first communication method by which said information processing apparatus transmits and receives information to and from a different terminal apparatus positioned in the proximity of said information processing apparatus, to acquire management data to be utilized for a management of content data from the different terminal apparatus by the first communication method, the management data including at least identification information of the content data and a Uniform Resource Locator (URL) of a server, the first communication method having a first communication distance, which is shorter than a second communication distance of a second communication method;

a selection operation acceptance section configured to accept a selection operation for selecting the content data by selecting the management data;

a decision section configured to decide whether or not a second proximity radio communication by the second communication method with the different terminal apparatus is possible;

a requesting section configured to control a second communication section, which communicates with the server, to issue, in response to said decision section deciding that the second proximity radio communication is not possible, a request for the content data selected by the selection operation accepted by said selection operation acceptance section to the server;

a content data acquisition section configured to control the second communication section to acquire the content data when supplied in response to the request by said requesting section; and a processing unit configured to control a third communication section to issue, in response to said decision section deciding that the second proximity radio communication is possible and the selection operation for selecting the content data by selecting the management data being accepted, a content request to the different terminal apparatus by carrying out the second proximity radio communication by the second communication method, wherein the content data acquisition section is further configured to control said third communication section to acquire the content data when supplied in response to the content request.

* * * * *